US012215554B2

(12) United States Patent
Carnegie et al.

(10) Patent No.: US 12,215,554 B2
(45) Date of Patent: Feb. 4, 2025

(54) END EFFECTORS FOR AUTOMATED PIPE HANDLING

(71) Applicant: NATIONAL OILWELL VARCO, L.P., Houston, TX (US)

(72) Inventors: Graham Alexander Carnegie, Cypress, TX (US); John Walker, Tomball, TX (US); Christopher J. Saunders, Conroe, TX (US); Dominick Mancuso, Tomball, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 747 days.

(21) Appl. No.: 17/250,548

(22) PCT Filed: Aug. 2, 2019

(86) PCT No.: PCT/US2019/044976
§ 371 (c)(1),
(2) Date: Feb. 2, 2021

(87) PCT Pub. No.: WO2020/028853
PCT Pub. Date: Feb. 6, 2020

(65) Prior Publication Data
US 2021/0293099 A1    Sep. 23, 2021

Related U.S. Application Data

(63) Continuation of application No. 16/431,533, filed on Jun. 4, 2019, now Pat. No. 11,613,940, and a
(Continued)

(30) Foreign Application Priority Data

Aug. 3, 2018  (CN) .......................... 201810880362.2
Nov. 28, 2018  (CN) .......................... 201811449262.0

(51) Int. Cl.
E21B 19/14    (2006.01)
B25J 9/16    (2006.01)
(Continued)

(52) U.S. Cl.
CPC ............. *E21B 19/14* (2013.01); *B25J 9/1628* (2013.01); *B25J 11/00* (2013.01); *E21B 3/022* (2020.05);
(Continued)

(58) Field of Classification Search
CPC ......... B25J 15/0033; E21B 19/24; F16L 3/02; F16L 3/1215; F16L 3/10; F16L 3/1091; F16L 3/16; F16L 3/18
(Continued)

(56) References Cited

U.S. PATENT DOCUMENTS 600,988 A    3/1898  Hayes
1,386,210 A    8/1921  Thomas
(Continued)

FOREIGN PATENT DOCUMENTS

CA    2911388 A1    11/2014
CA    2855105 A1    12/2015
(Continued)

OTHER PUBLICATIONS

"U.S. Appl. No. 16/098,160, Notice of Allowance mailed Feb. 3, 2022", 7 pgs.
(Continued)

*Primary Examiner* — Gregory W Adams
(74) *Attorney, Agent, or Firm* — Schwegman Lundberg & Woessner, P.A.

(57) ABSTRACT

An end effector (400) for a robotic arm, the end effector (400) comprising: two pipe engaging jaws (404), each jaw comprising an inner contour configured for engaging a pipe section, wherein at least one jaw (404) is a fixed jaw;
(Continued)

wherein the end effector (400) is configured to restrict radial movement of the pipe section while permitting axial movement.

19 Claims, 39 Drawing Sheets

Related U.S. Application Data continuation of application No. 16/431,540, filed on Jun. 4, 2019, now Pat. No. 11,035,183.

(60) Provisional application No. 62/797,042, filed on Jan. 25, 2019.

(51) Int. Cl.
  *B25J 11/00* (2006.01)
  *E21B 3/02* (2006.01)
  *E21B 15/00* (2006.01)
  *E21B 19/06* (2006.01)
  *E21B 19/084* (2006.01)
  *B25J 13/08* (2006.01)

(52) U.S. Cl.
  CPC .............. *E21B 15/00* (2013.01); *E21B 19/06* (2013.01); *E21B 19/084* (2013.01); *B25J 13/081* (2013.01); *B25J 13/086* (2013.01); *B25J 13/087* (2013.01)

(58) Field of Classification Search
  USPC ............... 144/4.1, 34.1; 239/741; 248/218.4, 248/188.2, 541, 74.1; 269/218, 31; 277/314; 294/198; 362/396; 408/69; 414/23; 43/21.2; 470/901
  See application file for complete search history.

(56) References Cited

U.S. PATENT DOCUMENTS

| | | | |
|---|---|---|---|
| 1,494,524 A | 5/1924 | Adamson | |
| 1,589,781 A | 6/1926 | Anderson | |
| 1,818,278 A | 8/1931 | Siler | |
| 2,109,344 A | 2/1938 | Selger | |
| 2,314,867 A | 3/1943 | Alexander | |
| 2,531,930 A | 11/1950 | Woolslayer et al. | |
| 2,613,051 A * | 10/1952 | Baum | G09F 13/26 |
| | | | 248/50 |
| 2,615,681 A | 10/1952 | True | |
| 2,616,646 A * | 11/1952 | Irving | F16L 3/1091 |
| | | | 248/65 |
| 2,735,556 A | 2/1956 | Stone | |
| 2,885,096 A | 5/1959 | De | |
| 2,946,464 A | 7/1960 | Guier | |
| 3,154,275 A * | 10/1964 | Stewart | F16L 3/1215 |
| | | | 248/65 |
| 3,225,949 A | 12/1965 | Erickson et al. | |
| 3,272,365 A | 9/1966 | Stevens | |
| 3,361,453 A | 1/1968 | Brown et al. | |
| 3,533,516 A | 10/1970 | Guier | |
| 3,615,027 A | 10/1971 | Ham | |
| 3,623,753 A | 11/1971 | Henry | |
| 3,651,845 A * | 3/1972 | Propst | A01G 23/093 |
| | | | 144/337 |
| 3,747,789 A | 7/1973 | Shipley et al. | |
| 3,768,663 A | 10/1973 | Turner et al. | |
| 3,840,128 A | 10/1974 | Swoboda et al. | |
| 3,877,583 A | 4/1975 | Bokenkamp | |
| 3,921,823 A | 11/1975 | Bourree et al. | |
| 3,976,207 A | 8/1976 | Schultz | |
| 3,994,350 A | 11/1976 | Smith et al. | |
| 4,039,744 A * | 8/1977 | Seaquist | H01B 17/18 |
| | | | 248/65 |
| 4,042,123 A | 8/1977 | Sheldon et al. | |
| 4,117,941 A | 10/1978 | Mccleskey, Jr. et al. | |
| 4,126,348 A | 11/1978 | Palmer | |
| 4,269,554 A | 5/1981 | Jackson | |
| 4,274,778 A | 6/1981 | Putnam et al. | |
| 4,289,442 A | 9/1981 | Stevens | |
| 4,345,864 A | 8/1982 | Smith, Jr. et al. | |
| 4,348,920 A | 9/1982 | Boyadjieff | |
| 4,397,605 A | 8/1983 | Cowgill et al. | |
| 4,531,875 A | 7/1985 | Krueger | |
| 4,591,006 A | 5/1986 | Hutchison et al. | |
| 4,621,974 A | 11/1986 | Krueger | |
| 4,680,519 A | 7/1987 | Chand et al. | |
| 4,715,761 A | 12/1987 | Berry et al. | |
| 4,738,321 A | 4/1988 | Olivier | |
| 4,846,357 A | 7/1989 | Sholl et al. | |
| 4,861,081 A * | 8/1989 | Satoh | E05B 79/12 |
| | | | 292/336.3 |
| 4,899,095 A | 2/1990 | Kishi et al. | |
| 5,038,871 A | 8/1991 | Dinsdale | |
| 5,211,251 A | 5/1993 | Woolslayer | |
| 5,494,320 A | 2/1996 | Cerruti | |
| 5,813,286 A | 9/1998 | Hansen | |
| 5,921,329 A | 7/1999 | Armstrong | |
| 6,047,771 A | 4/2000 | Roeynestad | |
| 6,260,646 B1 | 7/2001 | Fernandez et al. | |
| 6,412,576 B1 | 7/2002 | Meiners | |
| 6,460,900 B1 | 10/2002 | Bakke | |
| 7,137,616 B2 | 11/2006 | Kysely | |
| 7,219,744 B2 | 5/2007 | Pietras | |
| 7,249,639 B2 | 7/2007 | Belik | |
| 7,341,281 B2 | 3/2008 | Guesnon et al. | |
| 7,370,707 B2 | 5/2008 | Mcdaniel et al. | |
| 7,390,032 B2 | 6/2008 | Hughes | |
| 7,493,960 B2 | 2/2009 | Leising et al. | |
| 7,726,929 B1 | 6/2010 | Orgeron | |
| 7,905,311 B2 | 3/2011 | Brown | |
| 7,946,795 B2 | 5/2011 | Orgeron | |
| 7,984,757 B2 | 7/2011 | Keast et al. | |
| 8,074,484 B2 | 12/2011 | Denkmeier et al. | |
| 8,191,637 B2 | 6/2012 | Havinga | |
| 8,210,269 B2 | 7/2012 | Hudson et al. | |
| 8,317,448 B2 | 11/2012 | Hankins et al. | |
| 8,504,206 B2 | 8/2013 | Fudaba et al. | |
| 8,550,761 B2 | 10/2013 | Belik et al. | |
| 8,690,508 B1 | 4/2014 | Orgeron | |
| 8,936,424 B1 | 1/2015 | Barnes et al. | |
| 9,133,968 B2 | 9/2015 | Elrick et al. | |
| 9,157,286 B2 | 10/2015 | Richardson et al. | |
| 9,291,010 B1 | 3/2016 | Barnes | |
| 9,388,923 B2 | 7/2016 | Romano | |
| 9,706,185 B2 | 7/2017 | Ellis | |
| 9,797,527 B2 * | 10/2017 | Dworak, Jr. | F16L 3/245 |
| 9,845,645 B2 | 12/2017 | Hughes et al. | |
| 10,047,908 B1 | 8/2018 | Bohle, II et al. | |
| 10,053,934 B2 | 8/2018 | Keogh et al. | |
| 10,190,374 B2 | 1/2019 | Bowley et al. | |
| 10,246,952 B2 | 4/2019 | Trydal et al. | |
| 10,384,907 B2 | 8/2019 | Upmeier et al. | |
| 10,612,322 B2 | 4/2020 | Doyon | |
| 10,794,126 B2 | 10/2020 | Magnuson | |
| 10,988,994 B2 | 4/2021 | Clarke et al. | |
| 10,995,564 B2 | 5/2021 | Miller et al. | |
| 11,035,183 B2 | 6/2021 | Donnally et al. | |
| 11,220,888 B2 | 1/2022 | Ocegueda-Hernandez et al. | |
| 11,274,508 B2 | 3/2022 | Mckenzie et al. | |
| 11,352,843 B2 | 6/2022 | Callaghan | |
| 11,365,592 B1 | 6/2022 | Moon et al. | |
| 11,613,932 B2 | 3/2023 | Saebo et al. | |
| 11,613,940 B2 | 3/2023 | Mckenzie et al. | |
| 11,834,914 B2 | 12/2023 | Mckenzie et al. | |
| 11,988,059 B2 | 5/2024 | Mckenzie | |
| 2002/0175519 A1 | 11/2002 | Mack et al. | |
| 2003/0159854 A1 | 8/2003 | Simpson et al. | |
| 2004/0057815 A1 | 3/2004 | Woolslayer et al. | |
| 2005/0055132 A1 | 3/2005 | Matsumoto et al. | |
| 2005/0113971 A1 | 5/2005 | Zhang et al. | |
| 2005/0126792 A1 | 6/2005 | Berry | |
| 2006/0081379 A1 | 4/2006 | Fehres et al. | |

(56) References Cited

U.S. PATENT DOCUMENTS

| | | |
|---|---|---|
| 2006/0104747 A1 | 5/2006 | Zahn et al. |
| 2006/0124316 A1 | 6/2006 | Pietras |
| 2006/0231344 A1 | 10/2006 | Drzewiecki |
| 2006/0249292 A1 | 11/2006 | Guidry |
| 2007/0062705 A1 | 3/2007 | Schats et al. |
| 2007/0114069 A1 | 5/2007 | Hooper et al. |
| 2007/0228671 A1 | 10/2007 | Norton |
| 2008/0136203 A1 | 6/2008 | Krijnen et al. |
| 2008/0202812 A1 | 8/2008 | Childers et al. |
| 2008/0238095 A1 | 10/2008 | Yater et al. |
| 2008/0296065 A1 | 12/2008 | Standal |
| 2009/0283324 A1 | 11/2009 | Konduc et al. |
| 2010/0163247 A1 | 7/2010 | Wright et al. |
| 2010/0193198 A1 | 8/2010 | Murray et al. |
| 2010/0303586 A1 | 12/2010 | Hankins et al. |
| 2011/0079434 A1 | 4/2011 | Belik et al. |
| 2011/0120730 A1 | 5/2011 | Clasen et al. |
| 2011/0147009 A1 | 6/2011 | Dupal et al. |
| 2011/0226485 A1 | 9/2011 | Seneviratne et al. |
| 2012/0000671 A1 | 1/2012 | Krohn et al. |
| 2012/0018222 A1 | 1/2012 | Hankins et al. |
| 2012/0259337 A1 | 10/2012 | Del Rio et al. |
| 2013/0075114 A1 | 3/2013 | Dekker et al. |
| 2013/0142607 A1 | 6/2013 | Ditzler |
| 2013/0146305 A1 | 6/2013 | Dupal et al. |
| 2013/0192817 A1* | 8/2013 | Fournier, Jr. ............ E21B 19/24 |
| | | 166/77.1 |
| 2013/0206478 A1 | 8/2013 | Selzer et al. |
| 2014/0050522 A1 | 2/2014 | Slaughter, Jr. et al. |
| 2014/0054089 A1 | 2/2014 | Sondervik |
| 2014/0090856 A1 | 4/2014 | Pratt et al. |
| 2014/0097027 A1 | 4/2014 | Marica et al. |
| 2014/0133939 A1 | 5/2014 | Richardson et al. |
| 2014/0145408 A1 | 5/2014 | Midas et al. |
| 2014/0202769 A1 | 7/2014 | Magnuson |
| 2014/0352978 A1 | 12/2014 | Eilertsen et al. |
| 2015/0016925 A1 | 1/2015 | Larkin |
| 2015/0053424 A1 | 2/2015 | Wiens et al. |
| 2015/0127152 A1 | 5/2015 | Nammoto et al. |
| 2015/0148952 A1 | 5/2015 | Shiratsuchi |
| 2015/0232272 A1 | 8/2015 | Magnuson |
| 2015/0272579 A1 | 10/2015 | Leimbach et al. |
| 2015/0273688 A1 | 10/2015 | Harada et al. |
| 2015/0275596 A1 | 10/2015 | Hickle |
| 2015/0283704 A1 | 10/2015 | Watanabe |
| 2015/0330162 A1 | 11/2015 | Magnuson et al. |
| 2016/0024852 A1 | 1/2016 | Kannegaard et al. |
| 2016/0060979 A1 | 3/2016 | Magnuson |
| 2016/0090786 A1 | 3/2016 | Roodenburg et al. |
| 2016/0102508 A1 | 4/2016 | Fox et al. |
| 2016/0115745 A1 | 4/2016 | Bisel |
| 2016/0145954 A1 | 5/2016 | Helms et al. |
| 2016/0160586 A1 | 6/2016 | Keogh et al. |
| 2016/0168929 A1 | 6/2016 | Magnuson et al. |
| 2016/0201408 A1 | 7/2016 | Little et al. |
| 2017/0067303 A1 | 3/2017 | Thiemann et al. |
| 2017/0172295 A1 | 6/2017 | Tropper |
| 2017/0204687 A1 | 7/2017 | Yorga et al. |
| 2017/0232620 A1 | 8/2017 | Kalb et al. |
| 2017/0234088 A1 | 8/2017 | Orr et al. |
| 2017/0268302 A1* | 9/2017 | Orr .......................... E21B 19/24 |
| 2018/0002987 A1 | 1/2018 | Kannegaard et al. |
| 2018/0171724 A1 | 6/2018 | Daigle et al. |
| 2018/0216405 A1 | 8/2018 | De Mul et al. |
| 2018/0238120 A1 | 8/2018 | Patterson et al. |
| 2018/0245408 A1 | 8/2018 | Keogh et al. |
| 2018/0328112 A1 | 11/2018 | Berry et al. |
| 2018/0334865 A1 | 11/2018 | Miller et al. |
| 2019/0017334 A1 | 1/2019 | Loeyning et al. |
| 2019/0063168 A1 | 2/2019 | Reddy et al. |
| 2019/0063649 A1 | 2/2019 | Snyder, II |
| 2019/0143532 A1 | 5/2019 | Cutkosky et al. |
| 2019/0145197 A1 | 5/2019 | Callaghan |
| 2019/0309585 A1 | 10/2019 | Miller et al. |
| 2019/0352982 A1 | 11/2019 | Arefi et al. |
| 2020/0032597 A1 | 1/2020 | Jorgic et al. |
| 2020/0040673 A1 | 2/2020 | Donnally et al. |
| 2020/0040674 A1 | 2/2020 | Mckenzie et al. |
| 2020/0115969 A1 | 4/2020 | De Mul et al. |
| 2021/0246738 A1 | 8/2021 | Mckenzie et al. |
| 2021/0301602 A1 | 9/2021 | Mckenzie et al. |
| 2022/0145704 A1 | 5/2022 | Mckenzie |
| 2022/0178215 A1 | 6/2022 | Donnally et al. |

FOREIGN PATENT DOCUMENTS

| | | | |
|---|---|---|---|
| CN | 202064839 | | 12/2011 |
| CN | 102979465 | | 3/2013 |
| CN | 103410458 | | 11/2013 |
| CN | 104976322 | | 10/2015 |
| CN | 105113983 | | 12/2015 |
| CN | 108266139 | A | 7/2018 |
| CN | 110792399 | A | 2/2020 |
| EP | 1510302 | | 3/2005 |
| EP | 1953334 | A2 | 8/2008 |
| EP | 3829823 | B1 | 9/2023 |
| GB | 2091788 | A | 8/1982 |
| GB | 2532267 | A | 5/2016 |
| GB | 2618742 | | 8/2024 |
| JP | H09137689 | A | 5/1997 |
| NO | 20151648 | A1 | 12/2015 |
| SA | 13499 | B1 | 8/2023 |
| WO | WO-8800274 | A2 | 1/1988 |
| WO | WO-9958811 | A1 | 11/1999 |
| WO | WO-0123701 | A1 | 4/2001 |
| WO | WO-2004018829 | A1 | 3/2004 |
| WO | 2007143842 | | 12/2007 |
| WO | WO-2013082172 | A1 | 6/2013 |
| WO | WO-2014179730 | A1 | 11/2014 |
| WO | WO-2015043740 | A1 | 4/2015 |
| WO | WO-2016024859 | A1 | 2/2016 |
| WO | WO-2016197255 | A1 | 12/2016 |
| WO | WO-2017039996 | A1 | 3/2017 |
| WO | WO-2017087200 | A1 * | 5/2017 ............ E21B 19/24 |
| WO | WO-2017087595 | A1 | 5/2017 |
| WO | WO-2017190120 | A1 | 11/2017 |
| WO | WO-2017193204 | A1 | 11/2017 |
| WO | WO-2019195651 | A1 | 10/2019 |
| WO | WO-2020028852 | A1 | 2/2020 |
| WO | WO-2020028853 | A1 | 2/2020 |
| WO | WO-2020028853 | A9 | 2/2020 |
| WO | WO-2020028856 | A1 | 2/2020 |
| WO | WO-2020028858 | A1 | 2/2020 |
| WO | 2020123399 | | 6/2020 |
| WO | WO-2020151386 | A1 | 7/2020 |
| WO | 2020160440 | | 8/2020 |
| WO | WO-2020172407 | A1 | 8/2020 |
| WO | WO-2021/203122 | A1 | 10/2021 |
| WO | 2021226622 | A1 | 11/2021 |
| WO | 2022016168 | A1 | 1/2022 |
| WO | 2022170302 | | 8/2022 |

OTHER PUBLICATIONS

"U.S. Appl. No. 17/248,669, Notice of Allowability mailed Feb. 3, 2022", 5 pgs.

"U.S. Appl. No. 16/431,533, Non Final Office Action mailed Feb. 14, 2022", 15 pgs.

"U.S. Appl. No. 17/248,669, 312 Amendment filed Mar. 2, 2022", 3 pgs.

"U.S. Appl. No. 17/248,669, PTO Response to Rule 312 Communication mailed Mar. 9, 2022", 2 pgs.

U.S. Appl. No. 16/098,160, filed Nov. 1, 2018.

U.S. Appl. No. 16/375,927, filed Apr. 5, 2019.

U.S. Appl. No. 16/431,533, filed Jun. 4, 2019.

U.S. Appl. No. 16/836,365, filed Mar. 31, 2020.

U.S. Appl. No. 16/431,540, filed Jun. 4, 2019.

U.S. Appl. No. 16/786,345, filed Feb. 10, 2020.

"U.S. Appl. No. 16/431,533, Final Office Action mailed Jul. 21, 2022", 13 pgs.

"U.S. Appl. No. 16/786,345, Final Office Action mailed Jul. 28, 2022", 9 pgs.

(56) References Cited

OTHER PUBLICATIONS

"European Application Serial No. 19758551.6, Response filed Aug. 25, 2022 to Communication Pursuant to Article 94(3) EPC mailed Apr. 28, 2022", 73 pgs.
"European Application Serial No. 19752902.7, Response filed Aug. 26, 2022 to Communication Pursuant to Article 94(3) EPC mailed May 3, 2022", 70 pgs.
"U.S. Appl. No. 16/431,533, Examiner Interview Summary mailed Sep. 14, 2022", 3 pgs.
"Saudi Arabia Application No. 521421154, Office Action Mailed Aug. 31, 2022", w o English translation, 10 pgs.
"U.S. Appl. No. 16/786,345, Response filed Sep. 27, 2022 to Final Office Action mailed Jul. 28, 2022", 6 pgs.
"U.S. Appl. No. 16/098,160, Advisory Action mailed Aug. 10, 2021", 4 pgs.
"U.S. Appl. No. 16/098,160, Non Final Office Action mailed Sep. 15, 2021", 8 pgs.
"U.S. Appl. No. 16/098,160, Response filed Aug. 27, 2021 to Advisory Action mailed Aug. 10, 2021", 8 pgs.
"U.S. Appl. No. 16/836,365, Notice of Allowance mailed Nov. 3, 2021", 7 pgs.
"U.S. Appl. No. 17/248,669, Non Final Office Action mailed Oct. 5, 2021", 8 pgs.
"International Application Serial No. PCT/US2020/019039, International Preliminary Report on Patentability mailed Sep. 2, 2021", 6 pgs.
"International Application Serial No. PCT/US2021/070488, International Search Report mailed Sep. 8, 2021", 4 pgs.
"International Application Serial No. PCT/US2021/070488, Written Opinion mailed Sep. 8, 2021", 6 pgs.
"International Application Serial No. PCT/US2021/070786, Invitation to Pay Additional Fees mailed Sep. 1, 2021", 2 pgs.
"U.S. Appl. No. 16/098,160, Corrected Notice of Allowability mailed Mar. 25, 2022", 4 pgs.
"U.S. Appl. No. 16/786,345, Non Final Office Action mailed Mar. 28, 2022", 13 pgs.
"International Application Serial No. PCT US2022 070377, International Search Report mailed Mar. 25, 2022", 5 pgs.
"International Application Serial No. PCT US2022 070377, Written Opinion mailed Mar. 25, 2022", 7 pgs.
"Saudia Arabian Application No. 521421161, Office Action mailed Mar. 31, 2022", (w English Summary), 6 pgs.
"U.S. Appl. No. 16/431,533, Response Filed May 16, 2022 to Non Final Office Action mailed Feb. 14, 2022", 11 pgs.
"U.S. Appl. No. 17/248,669, Corrected Notice of Allowability mailed May 18, 2022", 3 pgs.
"European Application Serial No. 19758551.6, Communication Pursuant to Article 94(3) EPC mailed Apr. 28, 2022", 4 pgs.
"European Application Serial No. 19752902.7, Communication Pursuant to Article 94(3) EPC mailed May 3, 2022", 5 pgs.
"International Application Serial No. PCT US2021 070319, International Preliminary Report on Patentability mailed May 10, 2022", 7 pgs.
"U.S. Appl. No. 16/786,345, Response filed Jun. 15, 2022 to Non Final Office Action mailed Mar. 28, 2022", 12 pgs.
"Chinese Application Serial No. 201811449262.0, Office Action mailed Jan. 19, 2023", w English Translation, 22 pgs.
"International Application Serial No. PCT US2022 070377, Written Opinion of the International Preliminary Search Authority mailed Jan. 12, 2023", 8 pgs.
"U.S. Appl. No. 16/786,345, Response filed Apr. 19, 2023 to Non Final Office Action mailed Jan. 19, 2023", 8 pgs.
"International Application Serial No. PCT US2022 070377, International Preliminary Report on Patentability mailed Apr. 4, 2023", 8 pgs.
"U.S. Appl. No. 17/310,672, Non Final Office Action mailed Apr. 25, 2023", 12 pgs.
"U.S. Appl. No. 16/786,345, Final Office Action mailed May 30, 2023", 7 pgs.
"U.S. Appl. No. 16/786,345, Final Office Action mailed Oct. 24, 2022", 8 pgs.
"U.S. Appl. No. 16/431,533, Response filed Oct. 21, 2022 to Final Office Action mailed Jul. 21, 2022", 9 pgs.
"U.S. Appl. No. 16/431,533, Notice of Allowance mailed Nov. 7, 2022", 8 pgs.
"U.S. Appl. No. 16/431,533, Corrected Notice of Allowability mailed Nov. 16, 2022", 2 pgs.
"U.S. Appl. No. 16/786,345, Advisory Action mailed Dec. 30, 2022", 3 pgs.
"U.S. Appl. No. 16/786,345, Non Final Office Action mailed Jan. 19, 2023", 7 pgs.
"U.S. Appl. No. 16/098,160, Final Office Action mailed May 27, 2021", 8 pgs.
"U.S. Appl. No. 16/098,160, Response filed Jul. 27, 2021 to Final Office Action mailed May 27, 2021", 9 pgs.
"U.S. Appl. No. 16/836,365, Final Office Action mailed May 4, 2021", 7 pgs.
"U.S. Appl. No. 16/836,365, Notice of Allowance mailed Jul. 27, 2021", 7 pgs.
"U.S. Appl. No. 16/836,365, Response filed Apr. 22, 2021 to Non-Final Office Action mailed Jan. 25, 2021", 8 pgs.
"U.S. Appl. No. 16/836,365, Response filed Jul. 2, 2021 to Final Office Action mailed May 4, 2021", 7 pgs.
"International Application Serial No. PCT/CN2019/124443, International Preliminary Report on Patentability mailed May 26, 2021", 4 pgs.
"International Application Serial No. PCT/US2021/070319, International Search Report mailed May 31, 2021", 5 pgs.
"International Application Serial No. PCT/US2021/070319, Written Opinion mailed May 31, 2021", 6 pgs.
"International Application Serial No. PCT/US2021/070488, Invitation to Pay Additional Fees mailed Jun. 28, 2021", 2 pgs.
"Moveit—Kinematic constraints: Visibility Constraint Class Reference", [online]. [retrieved Apr. 21, 2021]. Retrieved from the Internet: <URL: http://docs.ros.org/en/hydro/api/moveit_core/html/classkinematic_constraints_1_1VisibilityConstraint.html>, (2021), 8 pgs.
"Moveit—Moving robots into the future", [online]. [archived Dec. 4, 2020]. Retrieved from the Internet: <URL: https://web.archive.org/web/20201204224545/https://moveit.ros.org/>, (2020), 7 pgs.
"U.S. Appl. No. 16/786,345, Corrected Notice of Allowability mailed Sep. 20, 2023", 3 pgs.
"U.S. Appl. No. 16/786,345, Notice of Allowance mailed Aug. 31, 2023", 6 pgs.
"U.S. Appl. No. 16/786,345, Response filed Aug. 23, 2023 to Final Office Action mailed May 30, 2023", 7 pgs.
"U.S. Appl. No. 17/310,188, Non Final Office Action mailed Sep. 11, 2023", 14 pgs.
"U.S. Appl. No. 17/310,672, Final Office Action mailed Aug. 2, 2023", 13 pgs.
"U.S. Appl. No. 17/310,672, Response filed Jul. 18, 2023 to Non Final Office Action mailed Apr. 25, 2023", 8 pgs.
"European Application Serial No. 21719521.3, Communication Pursuant to Article 94(3) EPC mailed Jul. 17, 2023", 3 pgs.
"U.S. Appl. No. 16/098,160, Advisory Action mailed Jul. 22, 2020", 5 pgs.
"U.S. Appl. No. 16/098,160, Examiner Interview Summary mailed Jun. 23, 2020", 3 pgs.
"U.S. Appl. No. 16/098,160, Final Office Action mailed Apr. 30, 2020", 7 pgs.
"U.S. Appl. No. 16/098,160, Non Final Office Action mailed Sep. 30, 2019", 8 pgs.
"U.S. Appl. No. 16/098,160, Non Final Office Action mailed Oct. 6, 2020", 8 pgs.
"U.S. Appl. No. 16/098,160, Preliminary Amendment filed Nov. 1, 2018", 5 pgs.
"U.S. Appl. No. 16/098,160, Response filed Jan. 6, 2021 to Non Final Office Action mailed Oct. 6, 2020", 7 pgs.
"U.S. Appl. No. 16/098,160, Response filed Jan. 30, 2020 to Non Final Office Action mailed Sep. 30, 2019", 8 pgs.
"U.S. Appl. No. 16/098,160, Response filed Jun. 30, 2020 to Final Office Action mailed Apr. 30, 2020", 8 pgs.

(56) References Cited

OTHER PUBLICATIONS

"U.S. Appl. No. 16/098,160, Response filed Aug. 24, 2020 to Advisory Action mailed Jul. 22, 2020", 9 pgs.
"U.S. Appl. No. 16/375,927, Advisory Action mailed Aug. 11, 2020", 6 pgs.
"U.S. Appl. No. 16/375,927, Corrected Notice of Allowability mailed Jan. 26, 2021", 2 pgs.
"U.S. Appl. No. 16/375,927, Examiner Interview Summary mailed Apr. 24, 2020", 3 pgs.
"U.S. Appl. No. 16/375,927, Examiner Interview Summary mailed Dec. 7, 2020", 7 pgs.
"U.S. Appl. No. 16/375,927, Final Office Action mailed Jun. 5, 2020", 10 pgs.
"U.S. Appl. No. 16/375,927, Non Final Office Action mailed Feb. 28, 2020", 9 pgs.
"U.S. Appl. No. 16/375,927, Non Final Office Action mailed Sep. 24, 2020", 10 pgs.
"U.S. Appl. No. 16/375,927, Notice of Allowance mailed Jan. 1, 2021", 8 pgs.
"U.S. Appl. No. 16/375,927, Response filed May 27, 2020 to Non Final Office Action mailed Feb. 28, 2020", 10 pgs.
"U.S. Appl. No. 16/375,927, Response filed Aug. 3, 2020 to Final Office Action mailed Jun. 5, 2020", 11 pgs.
"U.S. Appl. No. 16/375,927, Response filed Sep. 8, 2020 to Advisory Action mailed Aug. 11, 2020", 10 pgs.
"U.S. Appl. No. 16/375,927, Response filed Dec. 16, 2020 to Non Final Office Action mailed Sep. 24, 2020", 8 pgs.
"U.S. Appl. No. 16/431,540, Examiner Interview Summary mailed Jan. 19, 2021", 3 pgs.
"U.S. Appl. No. 16/431,540, Final Office Action mailed Nov. 19, 2020", 10 pgs.
"U.S. Appl. No. 16/431,540, Non Final Office Action mailed Jun. 10, 2020", 13 pgs.
"U.S. Appl. No. 16/431,540, Response filed Jan. 19, 2021 to Final Office Action mailed Nov. 19, 2020", 11 pgs.
"U.S. Appl. No. 16/431,540, Response Filed Sep. 10, 2020 to Non Final Office Action mailed Jun. 10, 2020", 24 pgs.
"U.S. Appl. No. 16/836,365, Non Final Office Action mailed Jan. 25, 2021", 8 pgs.
"Canadian Application Serial No. 3,022,888, Voluntary Amendment filed Jul. 12, 2019", 10 pgs.
"International Application Serial No. PCT/CA2017/000125, International Preliminary Report on Patentability mailed Nov. 22, 2018", 6 pgs.
"International Application Serial No. PCT/CA2017/000125, International Search Report mailed Aug. 14, 2017", 3 pgs.
"International Application Serial No. PCT/CA2017/000125, Written Opinion mailed Aug. 14, 2017", 4 pgs.
"International Application Serial No. PCT/CN2019/124443, International Search Report mailed Mar. 5, 2020", 4 pgs.
"International Application Serial No. PCT/CN2019/124443, Written Opinion mailed Mar. 5, 2020", 4 pgs.
"International Application Serial No. PCT/US2019/025942, International Preliminary Report on Patentability mailed Oct. 30, 2020", 7 pgs.
"International Application Serial No. PCT/US2019/025942, International Search Report mailed Jun. 27, 2019", 4 pgs.
"International Application Serial No. PCT/US2019/025942, Response filed Feb. 5, 2020 to Written Opinion mailed Feb. 27, 2019", 14 pgs.
"International Application Serial No. PCT/US2019/025942, Response filed Apr. 23, 2020 to Written Opinion mailed Apr. 23, 2020", 14 pgs.
"International Application Serial No. PCT/US2019/025942, Response filed Sep. 22, 2020 to Written Opinion mailed Jul. 23, 2020", 4 pgs.
"International Application Serial No. PCT/US2019/025942, Written Opinion mailed Feb. 24, 2020", 8 pgs.
"International Application Serial No. PCT/US2019/025942, Written Opinion mailed Jun. 27, 2019", 9 pgs.
"International Application Serial No. PCT/US2019/025942, Written Opinion mailed Jul. 23, 2020", 5 pgs.
"International Application Serial No. PCT/US2019/044974, International Preliminary Report on Patentability mailed Nov. 11, 2020", 7 pgs.
"International Application Serial No. PCT/US2019/044974, International Search Report mailed Oct. 24, 2019", 6 pgs.
"International Application Serial No. PCT/US2019/044974, Response filed Jun. 2, 2020 to Written Opinion mailed Oct. 24, 2019", 13 pgs.
"International Application Serial No. PCT/US2019/044974, Response filed Aug. 18, 2020 to Written Opinion mailed Jun. 19, 2020", 4 pgs.
"International Application Serial No. PCT/US2019/044974, Written Opinion mailed Jun. 19, 2020", 7 pgs.
"International Application Serial No. PCT/US2019/044974, Written Opinion mailed Oct. 24, 2019", 6 pgs.
"International Application Serial No. PCT/US2019/044976, International Search Report mailed Oct. 18, 2019", 5 pgs.
"International Application Serial No. PCT/US2019/044976, Response filed Jun. 3, 2020 to Written Opinion mailed Oct. 18, 2019", 11 pgs.
"International Application Serial No. PCT/US2019/044976, Response filed Aug. 25, 2020 to Written Opinion mailed Jun. 26, 2020", 3 pgs.
"International Application Serial No. PCT/US2019/044976, Written Opinion mailed Jun. 26, 2020", 4 pgs.
"International Application Serial No. PCT/US2019/044976, Written Opinion mailed Oct. 18, 2019", 8 pgs.
"International Application Serial No. PCT/US2019/044976, Written Opinion mailed Nov. 6, 2020", 6 pgs.
"International Application Serial No. PCT/US2019/044979, International Preliminary Report on Patentability mailed Nov. 18, 2020", 7 pgs.
"International Application Serial No. PCT/US2019/044979, International Search Report mailed Oct. 22, 2019", 6 pgs.
"International Application Serial No. PCT/US2019/044979, Response filed Jun. 3, 2020 to Written Opinion mailed Oct. 22, 2019", 12 pgs.
"International Application Serial No. PCT/US2019/044979, Response filed Aug. 25, 2020 to Written Opinion mailed Jun. 26, 2020", 3 pgs.
"International Application Serial No. PCT/US2019/044979, Written Opinion mailed Jun. 26, 2020", 4 pgs.
"International Application Serial No. PCT/US2019/044979, Written Opinion mailed Oct. 22, 2019", 7 pgs.
"International Application Serial No. PCT/US2019/044983, International Search Report mailed Oct. 22, 2019", 5 pgs.
"International Application Serial No. PCT/US2019/044983, Written Opinion mailed Oct. 22, 2019", 6 pgs.
"International Application Serial No. PCT/US2019/124443, Response filed Nov. 24, 2020 to Written Opinion mailed Mar. 5, 2020", 10 pgs.
"International Application Serial No. PCT/US2020/019039, International Search Report mailed May 15, 2020", 2 pgs.
"International Application Serial No. PCT/US2020/019039, Written Opinion mailed May 15, 2020", 4 pgs.
"U.S. Appl. No. 16/431,540, Notice of Allowance mailed Feb. 11, 2021", 5 pgs.
"U.S. Appl. No. 16/431,540, Supplemental Notice of Allowability mailed Mar. 11, 2021", 2 pgs.
"International Application Serial No. PCT/US2019/044976, International Preliminary Report on Patentability mailed Mar. 9, 2021", 7 pgs.
"International Application Serial No. PCT/US2019/044983, International Preliminary Report on Patentability mailed Feb. 18, 2021", 8 pgs.
"International Application Serial No. PCT/US2021/070786, International Search Report mailed Nov. 9, 2021", 4 pgs.
"International Application Serial No. PCT/US2021/070786, Written Opinion mailed Nov. 9, 2021", 7 pgs.
"U.S. Appl. No. 16/098,160, Response filed Dec. 14, 2021 to Non Final Office Action mailed Sep. 15, 2021", 8 pgs.
"U.S. Appl. No. 17/248,669, Examiner Interview Summary mailed Dec. 17, 2021", 2 pgs.
"U.S. Appl. No. 17/248,669, Response filed Jan. 5, 2022 to Non Final Office Action mailed Oct. 5, 2021", 8 pgs.
"U.S. Appl. No. 17/248,669, Notice of Allowance mailed Jan. 25, 2022", 8 pgs.
U.S. Appl. No. 17/310,672, filed Aug. 17, 2021.
U.S. Appl. No. 17/310,188, filed Jul. 23, 2021.

(56) References Cited

OTHER PUBLICATIONS

U.S. Appl. No. 17/248,669, filed Feb. 2, 2021.
U.S. Appl. No. 17/305,299, filed Jul. 2, 2021.
"U.S. Appl. No. 17/310,188, Corrected Notice of Allowability mailed Dec. 6, 2023", 3 pgs.
"U.S. Appl. No. 17/310,188, Notice of Allowance mailed Nov. 1, 2023", 7 pgs.
"U.S. Appl. No. 17/310,188, Response filed Oct. 17, 2023 to Non Final Office Action mailed Sep. 11, 2023", 9 pgs.
"U.S. Appl. No. 17/310,672, Advisory Action mailed Oct. 18, 2023", 4 pgs.
"U.S. Appl. No. 17/310,672, Non Final Office Action mailed Nov. 15, 2023", 11 pgs.
"U.S. Appl. No. 17/310,672, Response filed Oct. 2, 2023 to Final Office Action mailed Aug. 2, 2023", 9 pgs.
"U.S. Appl. No. 17/310,672, Response filed Nov. 2, 2023 to Advisory Action mailed Oct. 18, 2023", 10 pgs.
"European Application Serial No. 21719521.3, Communication Pursuant to Article 94(3) EPC mailed Nov. 21, 2023", 4 pgs.
"European Application Serial No. 21719521.3, Response filed Oct. 29, 2023 to Communication Pursuant to Article 94(3) EPC mailed Jul. 17, 2023". 74 pgs.
"Norway Application Serial No. 20230923, Office Action mailed Apr. 5, 2024", 6 pgs.
"European Application Serial No. 21719521.3, Response Filed Feb. 9, 2024 to Communication Pursuant to Article 94(3) EPC mailed Nov. 21, 2023", 11 pgs.
"Saudi Arabian Application Serial No. 522440758, Response filed Jan. 28, 2024 to Substantive Examination Report mailed Sep. 28, 2023", w English claims, 6 pgs.
"Canadian Application Serial No. 3,107,969, Voluntary Amendment Filed Jun. 21, 2024", 8 pgs.
"Canadian Application Serial No. 3,107,772, Voluntary Amendment Filed Jul. 18, 2024", 66 pgs.

\* cited by examiner

END EFFECTORS FOR AUTOMATED PIPE HANDLING

CROSS-REFERENCE TO RELATED APPLICATIONS

This patent application is a U.S. National Stage Filing under 35 U.S.C. 371 from International Application No. PCT/US2019/044976, filed on Aug. 2, 2019, which claims the benefit of priority to U.S. application Ser. No. 16/431, 533, filed Jun. 4, 2019, and Ser. No. 16/431,540, filed Jun. 4, 2019, each of which claim priority to U.S. Provisional Application No. 62/797,042, entitled Hoist System Capable of Parking a Top Drive and Including an Elevator and a Claw Independently Operated and Automated Robotic Arms for Handling Tubulars on a Drilling Rig, and filed Jan. 25, 2019; Chinese Application No. 201811449262.0, entitled Hoist System Capable of Parking a Top Drive and Including an Elevator and a Claw Independently Operated for Handling Tubulars on a Drilling Rig, and filed Nov. 28, 2018; and Chinese Application No. 201810880362.2, entitled Hoist System Capable of Parking a Top Drive and Including an Elevator and a Claw Independently Operated and Automated Robotic Arms for Handling Tubulars on a Drilling Rig, and filed Aug. 3, 2018, the content of each of which is hereby incorporated by reference herein in its entirety.

FIELD OF THE INVENTION

The present disclosure relates to pipe handling operations. In particular, the present disclosure relates to automated pipe handling operations. More particularly, the present disclosure relates to pipe handling robots and end effectors therefore, the end effectors configured for restricting rotational movement of a pipe during handling operations.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Many pipe handling operations, such as drill pipe handling operations, are conventionally performed with workers performing manual operations. For example, drilling of wells involves tripping of the drill string, during which drill pipes are lowered into (tripping in) or pulled out of (tripping out) a well. Tripping may typically occur in order to change all or a portion of the bottom hole assembly, such as to change a drill bit. Where drill pipe is tripped into a well, stands or lengths of drill pipe may be supplied from a storage position in a setback area of the drill rig and connected end-to-end to lengthen the drill string in the well. Where drill pipe is tripped out of a well, stands or lengths of drill pipe may be disconnected from the drill string and may be positioned in the setback area.

As with other pipe handling operations, tripping has conventionally been performed with human operators. In particular, while an elevator or top drive may be used to carry the load of a stand of drill pipe during trip in and trip out operations, human operators may typically maneuver the drill pipe stands around the drill floor, such as between the well center and the setback area. For example, a first human operator may be positioned on the drill floor, at or near the well, to maneuver a lower end of drill pipe stands as they are tripped into or out of the well, while a second human operator may be positioned on or above the racking board to maneuver an upper end of drill pipe stands as the stands are moved between the well and the setback area. Operators often use ropes and/or other tools to maneuver the drill pipe stands on or above the drill floor. Such work is labor-intensive and can be dangerous. Moreover, trip in and trip out operations may be limited by the speed at which the human operators can maneuver the stands between well center and the setback area.

BRIEF SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

The present disclosure, in one or more embodiments, relates to a robot configured for pipe handling. The robot may include an articulated arm controllable by a controller and an end effector arranged at an end of the articulated arm. The articulated arm may include two pipe engaging jaws, each jaw having an inner contour configured for engaging a pipe section. At least one of the jaws may be a fixed jaw. Additionally, the end effector may be configured to restrict radial movement of the pipe section while permitting axial movement. The inner contours of the two jaws may be arranged on different plans in some embodiments. The inner contours may additionally be concave in opposing directions. The articulated arm may be configured to pivot the end effector about a central axis extending between, and parallel to, the planes of the inner contours. The articulated arm may be configured to pivot the end effector between an open configuration and a closed configuration by pivoting the end effector approximately 90 degrees. In some embodiments, the robot may be configured to pivot the end effector between an open configuration and a closed configuration using a mechanism that is independent to axis controls for the articulated arm.

The present disclosure, in one or more embodiments, additionally relates to an end effector for a robotic arm. The end effector may have two pipe engaging jaws, each jaw having an inner contour configured for engaging a pipe section. At least one jaw may be a fixed jaw. The end effector may be configured to restrict radial movement of the pipe section while permitting axial movement. In some embodiments, the inner contours of the two jaws may be arranged on different planes. The inner contours may additionally be concave in opposing directions. In some embodiments, both pipe engaging jaws may be fixed to, and may extend from, a backing plate. Each pipe engaging jaw may have a bracket portion and an extension portion, each of which may define a portion of the inner contour. In some embodiments, the inner contours may each have a V-shape with an inner corner. The inner corner may have an included angle of between approximately 60 degrees and approximately 120 degrees. The inner corner may be a radiused corner in some embodiments. In some embodiments, each jaw may additionally have a second inner contour arranged perpendicular to the first inner contour. At least one of the jaws may be adjustable. Moreover, the end effector may be configured to engage with a range of pipe sizes.

The present disclosure, in one or more embodiments, additionally relates to a method for automated pipe handling. The method may include arranging an end effector of a pipe handling robot in an open configuration with respect to a pipe section, the end effector having a pair of jaws and each jaw having an inner contour. The method may additionally include, with the end effector in an open configuration, causing the end effector to receive the pipe section between the jaws. The method may additionally include moving the end effector to a closed configuration with respect to the pipe section to position the pipe section within the inner contours of the jaws. In some embodiments, moving the end effector to a closed configuration may include pivoting the end effector about a central axis and/or actuating at least one jaw of the end effector to clamp around the pipe section. In some embodiments, the method may be performable using a first robot arranged near a first end of a pipe section, and the method may additionally include performing the method using a second robot arranged near a second end of the pipe section, such that the first robot receives and closes on the first end of the pipe section and the second robot receives and closes on the second end of the pipe section.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to devices, systems, and methods for automated pipe handling operations. In particular, the present disclosure relates to pipe handling robots and end effectors configured for use with pipe handling robots. Pipe handling operations may include drill pipe handling operations, such as trip in and trip out operations and/or stand building operations. Devices, systems, and methods of the present disclosure may be used during other pipe handling operations as well. A pipe handling robot may have an articulated arm and an end effector arranged at an end of the articulated arm. The end effector may have a pair of pipe engaging jaws. Each jaw may have an inner contour configured to receive and engage with a section, length, or stand of pipe. In some embodiments, the jaws may be arranged parallel to one another, with the inner contours of the two jaws arranged on different and parallel planes. The end effector may be configured to rotate or pivot between an open configuration and a closed configuration with respect to a pipe section. In an open configuration, the end effector may be configured to receive the pipe section between the two jaws, with a longitudinal axis of the pipe section arranged parallel to the two planes on which the inner contours are arranged. With the pipe section arranged between the two jaws, the end effector may be configured to rotate or pivot to a closed configuration where the two inner contours may each engage, or otherwise partially surround, the pipe section. In the closed configuration, the end effector may operate to restrict radial movement of the pipe section while permitting axial movement of the section. In some embodiments, one or both jaws may be actuatable. For example, one or both jaws may be actuatable at a hinged connection or pivot-type connection.

Figure 1:
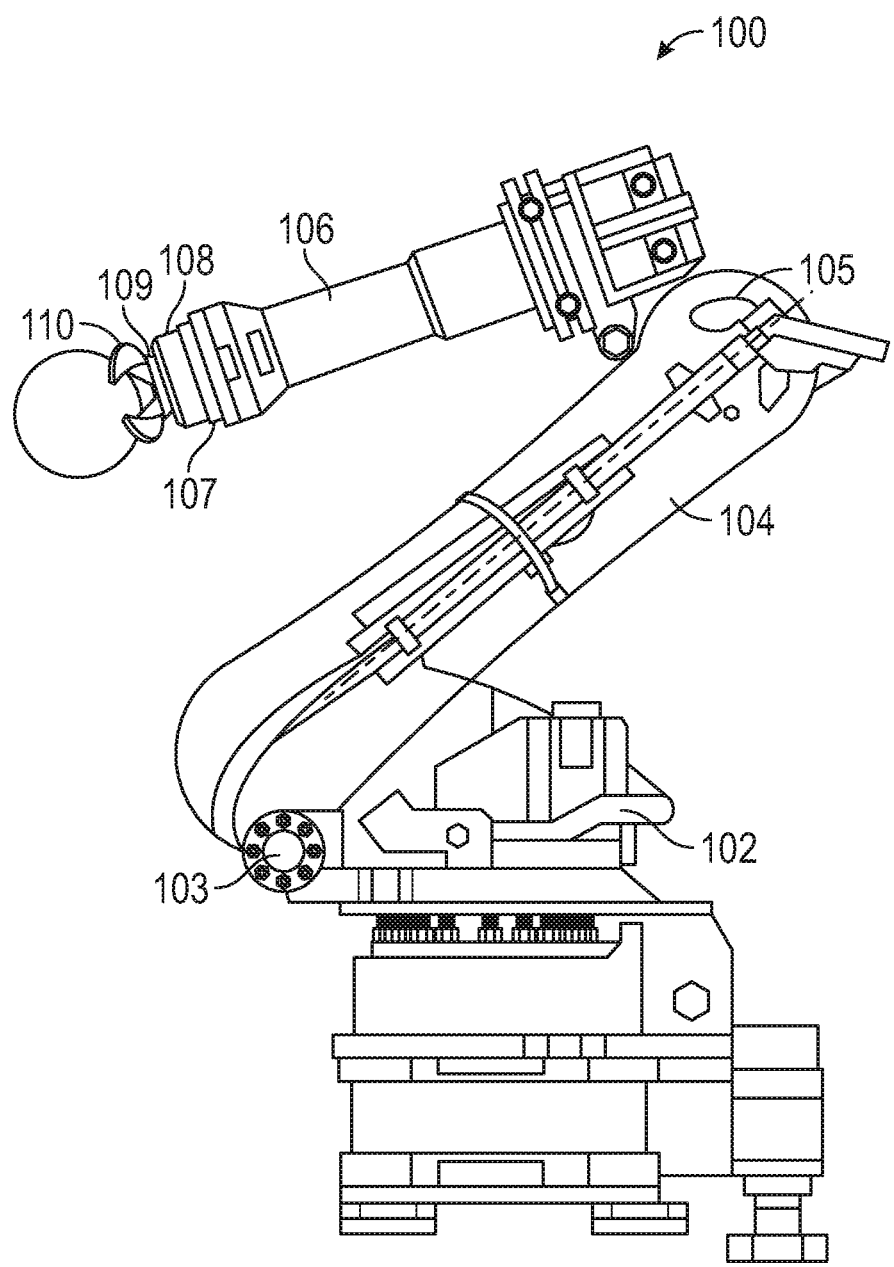
FIG. 1 is a side view of a pipe handling robot of the present disclosure, according to one or more embodiments.

Turning now to FIG. 1, a pipe handling robot 100 of the present disclosure is shown, according to one or more embodiments. The pipe handling robot 100 may be configured to manipulate lengths of pipe, such as drilling pipe or drill collar pipe. In some embodiments, the pipe handling robot 100 may be configured for manipulating stands of drill pipe, each stand comprising one, two, three, four, five, or any other suitable number of pipe lengths or sections. The robot 100 may be manually operable and/or may be programmable. In some embodiments, the robot 100 may be programmable with a finite state machine or other programming configured to perform a sequence of operations. As shown in FIG. 1, the robot 100 may include a base portion 102, a shoulder portion 104, an articulated arm 106, a wrist portion 108, and an end effector 110.

The base portion 102 may be configured to couple or fix the robot 100 to a surface, from which the robot may extend to perform operations. In some embodiments, the base portion 102 may provide a means of moving the robot 100 with respect to the surface from which it extends or is otherwise arranged or affixed. For example, the base portion 102 may have skids or rollers configured for sliding engagement with a track or rail. In other embodiments, the base portion 102 may have other movement means for moving the robot 100, such as wheels, treads, a walking mechanism, or other suitable movement means.

The shoulder portion 104 may couple, at a proximal end of the shoulder portion, to the base portion 102. The shoulder portion 104 may couple to the base portion 102 via a joint 103, which may be or include a swivel joint in some embodiments. The swivel joint 103 may allow the shoulder portion 104 to twist or rotate about a central axis with respect to the base portion 102. In some embodiments, the shoulder portion 104 may be configured to twist up to 360 degrees, up to 270 degrees, up to 180 degrees, up to 90 degrees, up to 45 degrees, or up to a different suitable degree of rotation. In other embodiments, the shoulder portion 104 may couple to the base portion 102 with a different joint, or the shoulder may couple to the base portion without a joint. The shoulder portion 104 may extend from the base portion 102 at an angle, such that a longitudinal axis of the shoulder portion may be offset from a longitudinal axis of the base portion by approximately 10, 15, 20, 25, 30, 35, 40, 45 degrees, or any other suitable degree of offset. The shoulder portion 104 may have a length of between approximately 12 inches and approximately 100 inches, or between approximately 18 inches and approximately 75 inches, or between approximately 24 inches and approximately 60 inches.

The articulated arm 106 may couple to the shoulder portion 104 at a distal end of the shoulder portion and a proximal end of the articulated arm. A joint or elbow 105, which may be or include a pitch joint, may be arranged between the articulated arm 106 and shoulder portion 104. The pitch joint 105 may allow the articulated arm 106 to pivot with respect to the shoulder portion 104 about an axis extending lateral to the shoulder portion and articulated arm. In some embodiments, the pitch joint 105 may allow the articulated arm 106 to pivot within a range of up to 360 degrees, up to 270 degrees, up to 180 degrees, up to 90 degrees, up to 45 degrees, or up to any other suitable degree of rotation. In other embodiments, the articulated arm 106 may couple to the shoulder portion 104 via a different joint or without a jointed connection. The articulated arm 106 may have a length of between approximately 20 inches and approximately 100 inches, or between approximately 28 inches and approximately 75 inches, or between approximately 35 inches and approximately 50 inches.

The wrist 108 may couple to the articulated arm 106 at a distal end of the articulated arm and a proximal end of the wrist. A joint 107 may be arranged between the wrist portion 108 and the articulated arm 106 and may provide for pivotable or rotational movement of the wrist with respect to the articulated arm about one or more axes. The joint 107 may be or include a pitch joint allowing for pivotable movement about a first lateral axis extending lateral to the articulated arm 106 and wrist 108, a yaw joint allowing for pivotable movement about a second lateral axis perpendicular to the first lateral axis, and/or a roll joint allowing for pivotable or rotational movement about an axis extending longitudinally through the wrist portion. The wrist portion 108 may have pivotable or rotational movement about each axis within a range of up to 360 degrees, up to 270 degrees, up to 180 degrees, up to 90 degrees, up to 45 degrees, or up to any other suitable degree of rotation. In other embodiments, the wrist portion 108 may couple to the articulated arm 106 via a different joint or without a jointed connection. The wrist 108 may be configured to provide a mechanical interface or mounting point for coupling an end effector 110 to the robot 100. In some embodiments, a joint 109, such as a pitch, yaw, and/or roll joint, may allow for pivotable movement of the end effector 110 with respect to the wrist portion 108. In some embodiments, the robot may have a mechanism, which may be a self-contained actuator mechanism that is electrically or hydraulically actuated, for example, configured to rotate or pivot the end effector. The actuator mechanism may be independent from axis controls for the articulated arm and/or other arm movement controls.

The end effector 110 may extend from a distal end of the wrist portion 108 and may be configured to provide an operational or tooling hand for various operations performed by the robot 100. The end effector 110 may couple to the wrist portion 108 using bolts, screws, threading, a snap-fit mechanism, and/or any other suitable mechanism. In some embodiments, the end effector 110 may be configured to be readily removable. In this way, a user may have an ability to interchange end effectors as desired or needed to accomplish varying operations or to accommodate varying sized piping, for example. In still other embodiments, an end effector may be configured to be permanently affixed to a wrist portion or other robot component.

Figure 2:
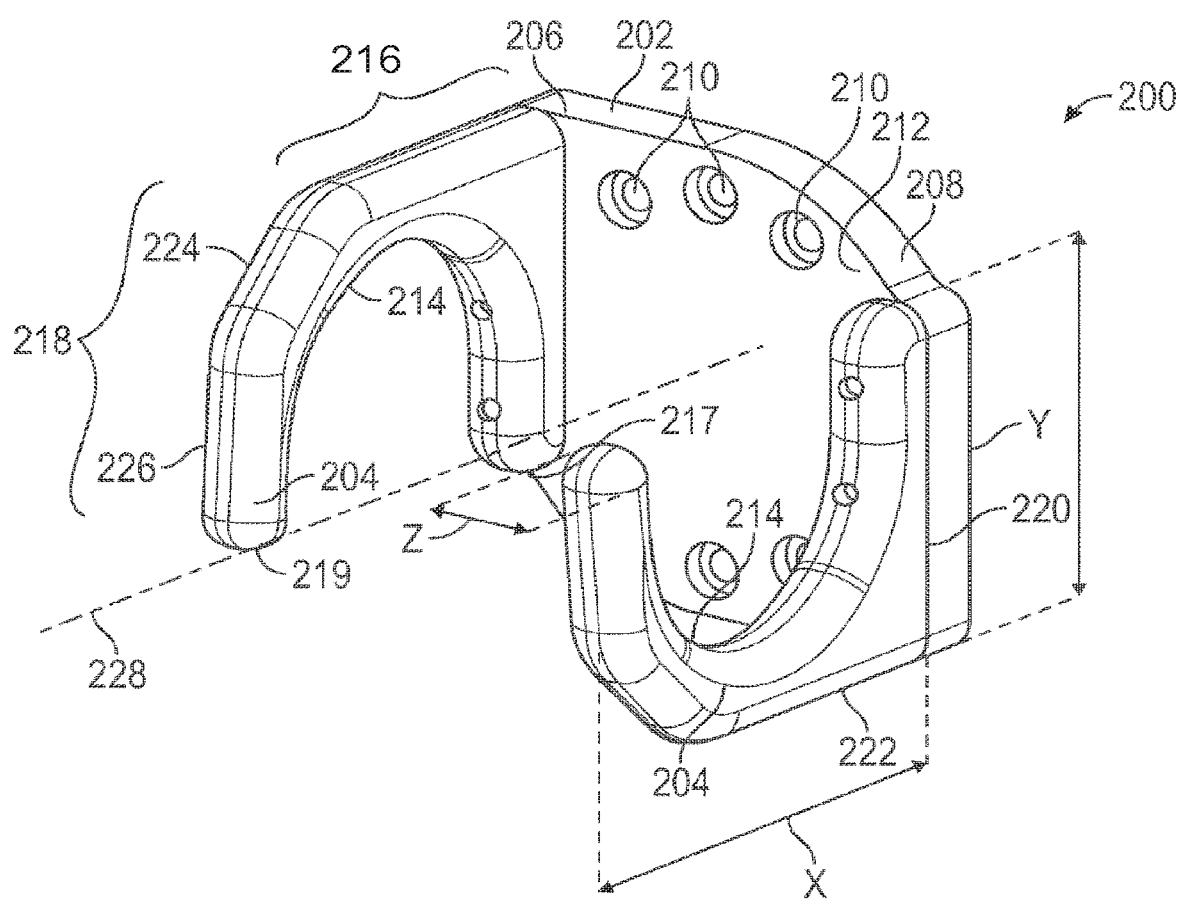
FIG. 2 is a perspective view of an end effector of the present disclosure, according to one or more embodiments.
Figure 3:
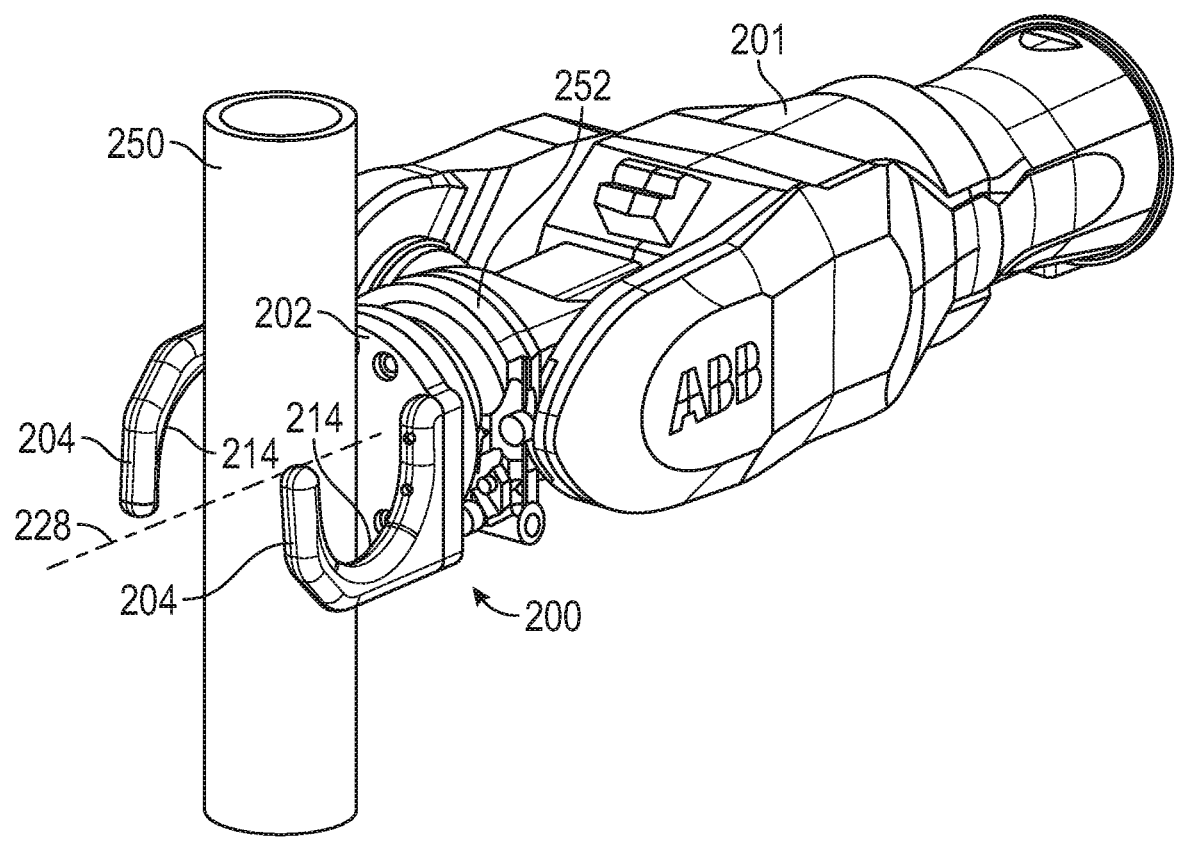
FIG. 3 is a perspective view of a portion of a pipe handling robot having an end effector of the present disclosure and with the end effector in an open configuration with respect to a pipe, according to one or more embodiments.
Figure 4:
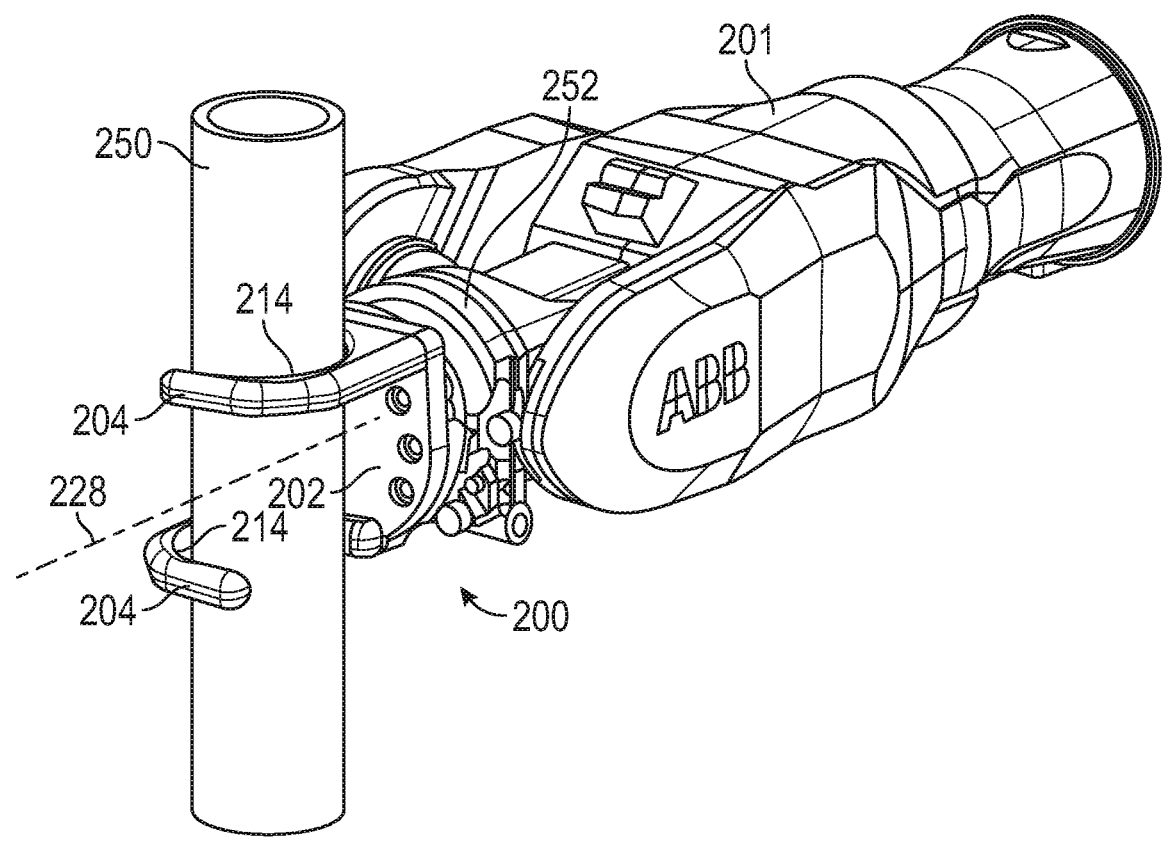
FIG. 4 is another perspective view of the pipe handling robot portion of FIG. 3 with the end effector pivoted to a closed configuration to engage with the pipe, according to one or more embodiments.

Turning now to FIG. 2, an end effector 200 of the present disclosure is shown, according to at least one embodiment. The end effector 200 may be configured for coupling to a robotic arm or other robotic device for manipulating piping or performing other operations. In some embodiments, the end effector 200 may have a backing plate 202 and a pair of pipe engaging jaws 204. FIGS. 3 and 4 illustrate the end effector 200 arranged on a robotic arm 201. In particular, as shown in FIGS. 3 and 4, the end effector 200 may be coupled to a wrist portion 252 configured for twisting or rotating the end effector 200 about an axis via a roll joint, for example.

With reference to FIG. 2, the backing plate 202 may be configured for coupling the end effector 200 to a robotic arm. The backing plate 202 may have a generally flattened circular, oval, square, rectangular, or other suitable shape. In some embodiments, the backing plate 202 may be sized and shaped similar to that of a coupling surface of a robotic arm or wrist portion thereof where the end effector 200 may attach. In at least one embodiment, as shown in FIG. 2, the backing plate 202 may have a generally square shape with four sides. The backing plate 202 shape may further have two angled corners 206, each having an angle of approximately 90 degrees, and two radiused corners 208. The backing plate 202 may have a diameter, width, or height of between approximately 2 inches and approximately 12 inches, or between approximately 3 inches and approximately 8 inches, or between approximately 4 inches and approximately 6 inches. In other embodiments, the backing plate 202 may have any other suitable diameter, height, or width. The backing plate 202 may have a height, width, or diameter configured to accommodate a height Y of the jaws 204. The backing plate 202 may have a thickness, orthogonal to the width, extending between a first or front surface 212 and a second or rear surface (not shown) of the backing plate. The thickness may be between approximately 0.1 inches and approximately 2 inches, or between approximately 0.4 inches and approximately 1.6 inches, or between approximately 0.7 inches and approximately 1.3 inch. In other embodiments, the backing plate 202 may have a different thickness.

The backing plate 202 may have one or more openings 210 configured for receiving a bolt or screw. The backing plate 202 may have a plurality of bolt openings 210 arranged in a pattern and configured to align with a bolt pattern of a robotic arm or a wrist portion thereof, for example. In some embodiments, the bolt openings 210 may be arranged in a circular or arced pattern. In other embodiments, the backing plate 202 may be configured to couple to a robotic arm using an alternative coupling mechanism.

With continued reference to FIG. 2, the pipe engaging jaws 204 may each extend laterally from the backing plate 202 and may be configured for engaging with a pipe section. Each jaw 204 may extend from the front surface 212 of the backing plate 202 or from a side edge, for example. The jaws 204 may each be fixed jaws, fixedly coupled to the backing plate 202. In some embodiments, the jaws 204 may each be coupled to the backing plate 202 using screws, bolts, pins, welding, an adhesive, and/or any other suitable coupling mechanism. In other embodiments, the jaws 204 and backing plate 202 may be integrally cast as a single component. Each jaw 204 may extend from the backing plate 202 with a width X, measured lateral to the front surface 212 of the backing plate. The width X may be between approximately 3 inches and approximately 15 inches, or between approximately 4 inches and approximately 11 inches, or between approximately 6 inches and approximately 8 inches. Each jaw 204 may additionally have a height Y measured along the front surface 212 of the backing plate 202. The height Y may be between approximately 3 inches and approximately 12 inches, or between approximately 4 inches and approximately 10 inches, or between approximately 5 inches and approximately 7 inches. In addition, each jaw 204 may have a thickness Z orthogonal to the width X and height Y. The thickness Z may be between approximately 0.5 inches and approximately 3 inches, or between approximately 0.7 inches and approximately 2 inches, or between approximately 1 inch and approximately 1.5 inches. In other embodiments, each jaw 204 may have any other suitable width, height, and thickness.

In some embodiments, each jaw 204 may generally have a hook shape and may define an inner contour 214. The inner contour may have a size and shape configured to engage with one or more pipe diameters, such that each jaw 204 may be configured to extend around at least a portion of an outer wall of a pipe. In some embodiments, the inner contour 214 may have a semi-circular, semi-oval, or otherwise rounded, curved, or concave shape, as shown in FIG. 2. The contour 214 may be defined with a diameter of between approximately 1 inch and approximately 12 inches, or between approximately 2 inches and approximately 10 inches, or between approximately 4 inches and approximately 6 inches. In some embodiments, each contour 214 may have a diameter sized to receive a particular pipe diameter or a range of pipe diameters. In at least one embodiment, each contour 214 may have a diameter of a corresponding pipe, plus approximately 0.25 inches. In other embodiments, the contours 214 may have any other suitable diameter.

In some embodiments, the hook shape of each jaw 204 may be defined by a bracket portion 216 extending from the backing plate 202 and an extension portion 218 extending from the bracket portion.

The bracket portion 216 may have a first outer edge 220 and a second outer edge 222. The first outer edge 220 may couple to, or otherwise be arranged along, the backing plate 202. The second outer edge 222 may extend perpendicular to the first outer edge 220 and lateral to the front surface 212 of the backer plate 202. In some embodiments, the first and second outer edges may form a corner, which may have an angle of approximately 90 degrees, or which may be a radiused corner in other embodiments. The bracket portion 216 may define a portion of the inner contour 214. In some embodiments, the bracket portion 216 may define approximately half or approximately ⅔ of the inner contour 214. In some embodiments, the bracket 216 may have a rounded tip 217 arranged at an end of the bracket and an end of the inner contour 214, where the bracket meets the backer plate 202.

For each jaw 204, the extension portion 218 may extend from the bracket portion 216. The extension portion 218 may have a first outer edge 224, and in some embodiments may have a second outer edge 226 with a radiused corner or knuckle therebetween. In some embodiments, one or both outer edges may have a curved shape. The extension portion 218 may have a circular or oval cross-sectional shape in some embodiments. In other embodiments, the extension portion 218 may have a square, rectangular, or other suitable cross-sectional shape. In some embodiments, the extension portion 218 may define approximately half or approximately ⅓ of the inner contour 214. The extension portion 218 may have a rounded tip 219 in some embodiments, arranged at an end of the extension portion and an end of the inner contour 214.

As indicated above, the end effector 200 may have two jaws 204. The jaws 204 may extend from opposing sides or ends of the front surface 212. The jaws 204 may extend laterally from the front surface 212 in a same direction and may be parallel to one another. The jaws 204 may be arranged in a parallel configuration such that the inner contours 214 of the two jaws are arranged on separate and parallel planes. Additionally, as shown in FIG. 2, the jaws 204 may be configured such that their inner contours 214 face opposing directions. For example, a first jaw 204 may be configured with its inner contour 214 concave open toward a first direction, and a second jaw may be configured with its inner contour concave open toward an opposing direction. As a particular example, FIG. 2 illustrates the end effector 200 with the inner contour 214 of one jaw 204 opening downward toward a bottom of the page, and a second inner contour of a second jaw opening upward toward a top of the page. The jaws 204 may additionally be configured and positioned such that a pipe section may be arranged in both inner contours 214 simultaneously. In particular, the jaws 204 may be arranged such that, when viewed along an axis extending through both inner contours 214 (i.e., perpendicular to the axis 228), the inner contours may together form what appears to be a closed loop. This may particularly be seen with respect to FIG. 8, and is described in more detail below.

The end effector 200 may have a gap or distance between the two jaws 204 sized to receive a pipe section therebetween. For example, the end effector 200 may have a distance between the two jaws of between approximately 1 inch and approximately 12 inches, or between approximately 2 inches and approximately 10 inches, or between approximately 4 inches and approximately 6 inches. In some embodiments, the gap between the two jaws 204 may be sized to receive a particular pipe diameter or range of pipe diameters. In at least one embodiment, the gap may include a diameter of a corresponding pipe, plus approximately 0.25 inches. In other embodiments, the end effector 200 may have any other suitable distance between the jaws 204.

In some embodiments, the end effector 200, including the backing plate 202 and jaws 204, may be constructed of one or more metals or metal alloys. For example, the end effector 200 may be constructed of steel. In other embodiments, at least some components of the end effector 200 may be constructed of one or more plastics or polymers. Still other materials may be used additionally or alternatively.

In use, the end effector 200 may be configured to rotate or pivot between an open configuration and a closed configuration with respect to a pipe section. To transition between an open configuration and a closed configuration, the end effector 200 may pivot about a central axis 228, as shown in FIG. 2. The central axis 228 may extend through a center of the backing plate 202 and may be arranged between the two jaws 204. In an open configuration, the end effector 200 may be configured to approach a pipe section with a jaw 204 arranged on each of two sides of the pipe section, such that the pipe section may be received with its longitudinal axis between the two jaws and adjacent the backing plate 202. As shown for example in FIG. 3, the end effector 200 may be arranged in an open configuration with respect to a pipe section 250 such that the pipe section may be received between the two jaws 204. The end effector 200 may be configured to rotate or pivot about its central axis 228 to a closed configuration so as to engage the pipe section 250 with the jaws 204. Rotation or pivoting of the end effector 200 may be performed by pivoting or rotating the wrist portion 252 or another component of the robotic arm 201 using a roll joint or other suitable joint.

As shown in FIG. 4, in a closed configuration, the pipe section 250 may be positioned within the inner contour 214 of each jaw 204. In particular, a first jaw 204 may extend around a first side of the pipe section 250, and a second jaw may extend around a second side of the pipe section. In this way, both jaws 204 may engage with the pipe section 250 in the closed configuration. Each jaw 204 may engage with the pipe section 250 at a different point along the longitudinal axis of the pipe section. That is, the two jaws 204 may extend around the pipe section 250 on different planes along the length of the pipe section, as shown in FIG. 4. To reach the closed configuration, the end effector 200 may be rotated or pivoted about the central axis 228 approximately 90 degrees in a first direction from the open configuration. To return to the open configuration, the end effector 200 may be rotated or pivoted about the central axis 228 approximately 90 degrees in a second direction, opposing the first direction.

It is to be appreciated that the open and closed configurations of the end effector 200 may be defined relative to a position or location of a pipe section. That is, in an open configuration, the end effector 200 may be configured to receive the pipe section between the two jaws, such that the jaws are arranged on either side of the pipe section without engaging the pipe section. Where the pipe is arranged such that its longitudinal axis is vertical, as shown for example in FIG. 3, the open configuration of the end effector may be achieved by positioning the end effector such that the heights Y of the jaws 204 are also vertical. However, for a pipe section arranged such that its longitudinal axis is horizontal, the open configuration of the end effector may be achieved by rotating the end effector 90 degrees, such that the heights Y of the jaws 204 are also horizontal.

Figure 5:
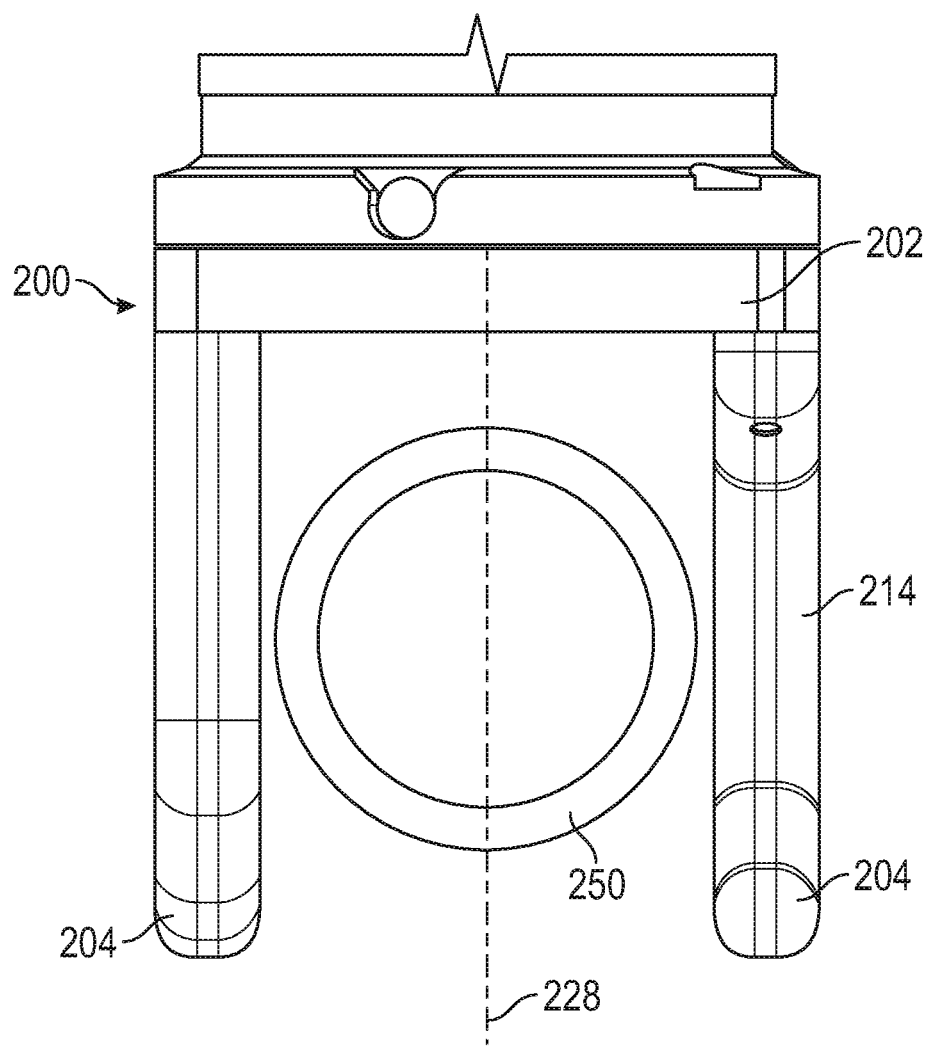
FIG. 5 is a top view of an end effector of the present disclosure in an open configuration adjacent a pipe, according to one or more embodiments.
Figure 6:
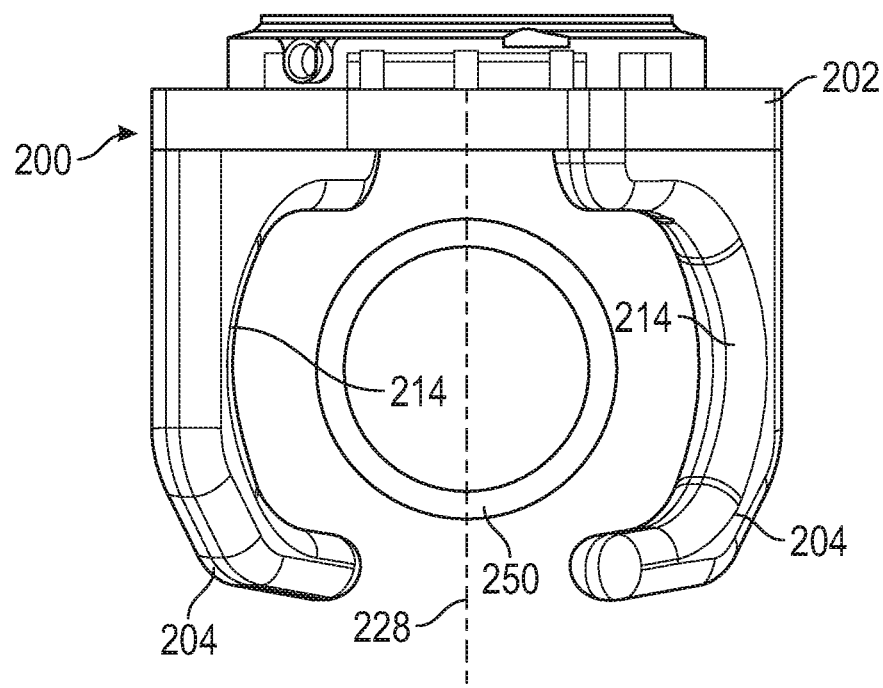
FIG. 6 is another top view of the end effector of FIG. 5 as the end effector begins to pivot from an open configuration to a closed configuration, according to one or more embodiments.
Figure 7:
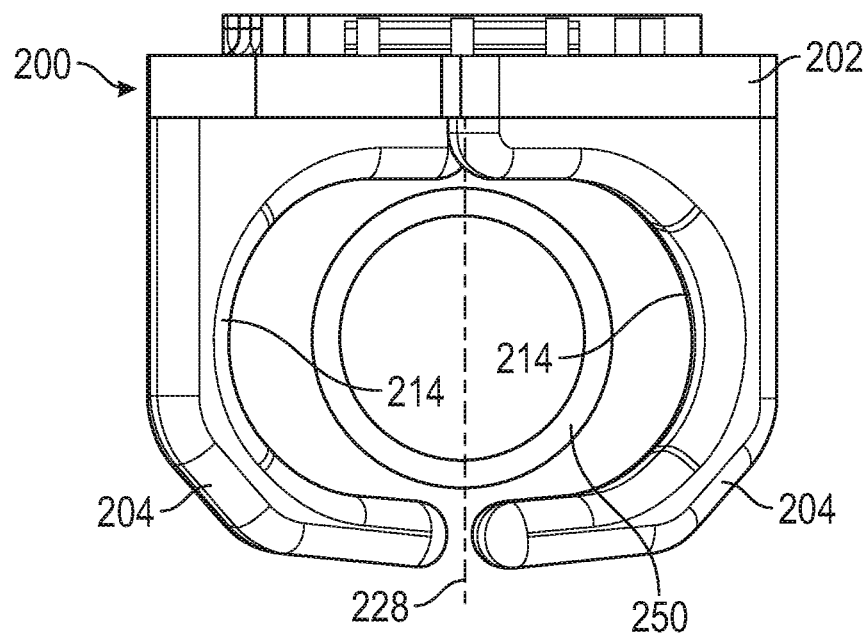
FIG. 7 is another top view of the end effector of FIG. 5 as the end effector continues to pivot from an open configuration to a closed configuration, according to one or more embodiments.

FIGS. 5-8 illustrate an axial view of the pipe section 250 as the end effector 200 pivots between an open configuration and a closed configuration with respect to the pipe section. FIG. 5 shows the end effector 200 in an open configuration with respect to the pipe section 250. As shown, the pipe section 250 may be positioned between, and parallel with, the two jaws 204. In this open configuration, the jaws may not be engaging with the pipe section 250 with their inner contours 214. In some embodiments, there may be clearance between the outer wall of the pipe section 250 and the jaws 204 in the open configuration. To reach a closed configuration with respect to the pipe section 250, the end effector 200 may rotate or pivot about its central axis 228, which may be arranged perpendicular to a longitudinal axis of the pipe section. As may be appreciated with respect to FIGS. 6 and 7, as the end effector 200 rotates or pivots from the open configuration to a closed configuration around the pipe section 250, the inner contours 214 of the jaws 204 may open toward the pipe section. As the end effector 200 continues its rotation toward the closed configuration, a gap between the pipe 250 and each inner contour 214 may close. As the rotation continues, the inner contours 214 of the two jaws 204 may approach opposing sides of the pipe section 250.

Figure 8:
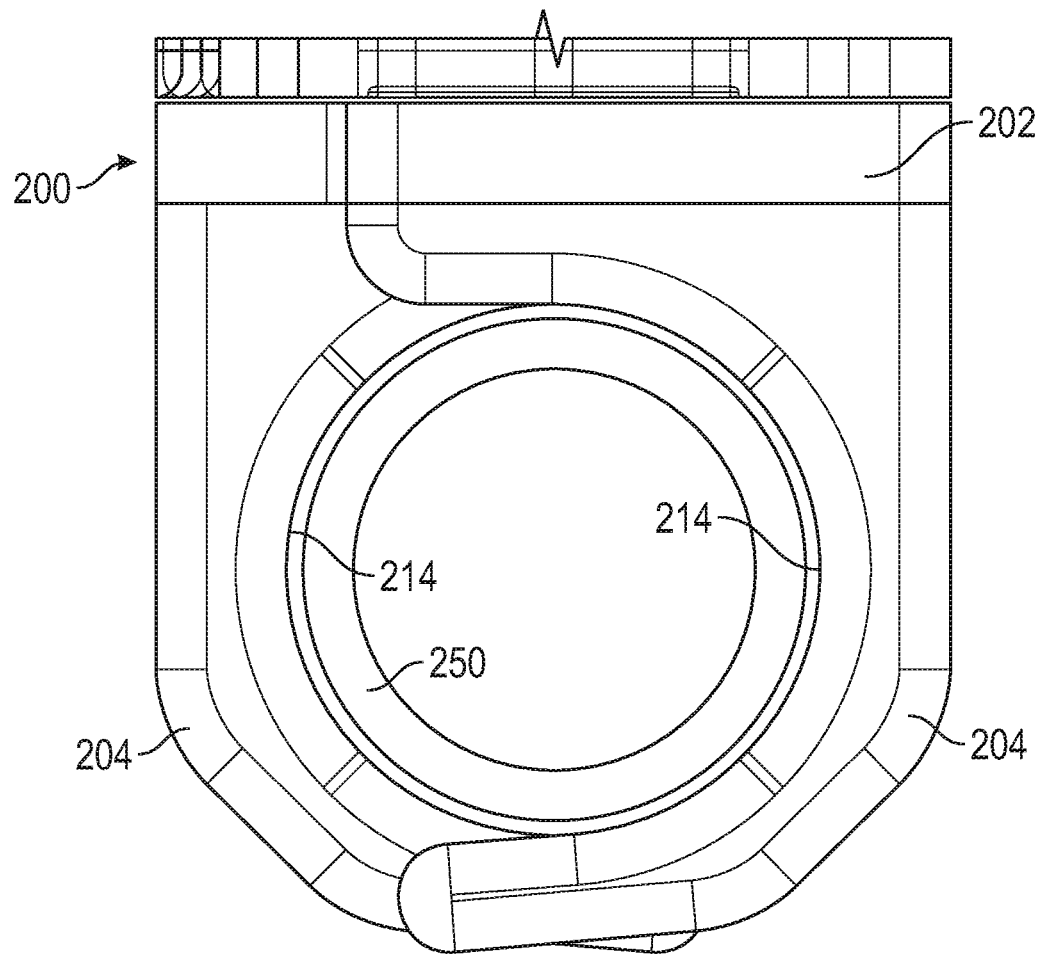
FIG. 8 is another top view if the end effector of FIG. 5 with the end effector in a closed configuration about the pipe, according to one or more embodiments.

FIG. 8 shows the end effector 200 in a closed configuration with respect to the pipe section 250. In the closed configuration, the pipe section 250 may be nestably arranged with the inner contours 214 of the two jaws 204. The inner contour 214 of a first jaw 204 may extend around one side of the pipe section 250, encircling approximately half or more than half of a circumference of the pipe section, and the inner contour of a second jaw may extend around an opposing side of the pipe section, encircling an opposing approximately half or more than half of the circumference of the pipe section. As shown in the axial view of FIG. 8, the two jaws 204 may together form an axial ring to encircle the cross section of the pipe 250, and engage with the full circumference, or substantially the full circumference, of the pipe. In some embodiments, the inner contours 214 of the jaws 204 may contact an outer surface of the pipe section 250. However, in other embodiments, as shown in FIG. 8, the end effector 200 may be configured to maintain clearance between an outer wall of the pipe section 250 and the inner contours 214.

In a closed configuration around the pipe section 250, the end effector 200 may operate to prevent or mitigate radial movement of the pipe. That is, the closed end effector 200 may prevent or mitigate the longitudinal axis of the pipe 250 from pivoting. While mitigating radial movement, the closed end effector 200 may permit axial movement of the pipe 250. In this way, the end effector 200 may be configured to encircle or close around the pipe 250 with a relatively loose grip so as to allow movement of the pipe along its longitudinal axis. Moreover, as shown in FIG. 8, in some embodiments, the end effector 200 may be configured to maintain a gap between the pipe section 250 and the inner contours 214, so as to restrict radial movement without limiting axial movement of the pipe section. The end effector 200 and robotic arm 201 may thus be configured to operate in conjunction with a lifting mechanism, such as a pipe elevator, operating to hold the weight of the pipe and/or to raise and lower the pipe. Although, it is to be appreciated that the jaws 204 may contact the pipe 250 in the closed configuration and friction between the jaws and pipe may restrict some axial movement.

While FIGS. 5-8 are described with respect to pivotable motion of the end effector 200 as a unit, wherein the backing plate 202 and fixed jaws 204 pivot together between an open and closed configuration, in other embodiments, the end effector may have a different mechanism for moving between an open and closed configuration. For example, in some embodiments, one or both jaws 204 may pivot with respect to the backing plate 202, while the backing plate remains in a fixed configuration with respect to a wrist portion or other portion of the robotic arm. In some embodiments, each jaw 204 may be configured to pivot approximately 90 degrees. In this way, while the backing plate remains fixed 202, the two jaws 204 may pivot about their connections to the backing plate between an open configuration, similar to that shown in FIG. 3 and a closed configuration, similar to that shown in FIG. 4. The jaws 204 may be actuated by an electric or hydraulic actuator.

The end effector 200 may be sized for the particular pipe section 250. That is, the inner contour 214 of the jaws 204 may be sized to nestably engage with the outer wall of the pipe section 250. Additionally, the jaws 204 may be spaced far enough apart on the backer plate 202 such that the diameter of the pipe 250 may be received between the two jaws in an open configuration. Further, each inner contour 214 may be configured to extend around approximately half the circumference of the pipe section 25, such that the jaws 204 may form a closed or substantially closed cross-sectional loop.

Figure 9:
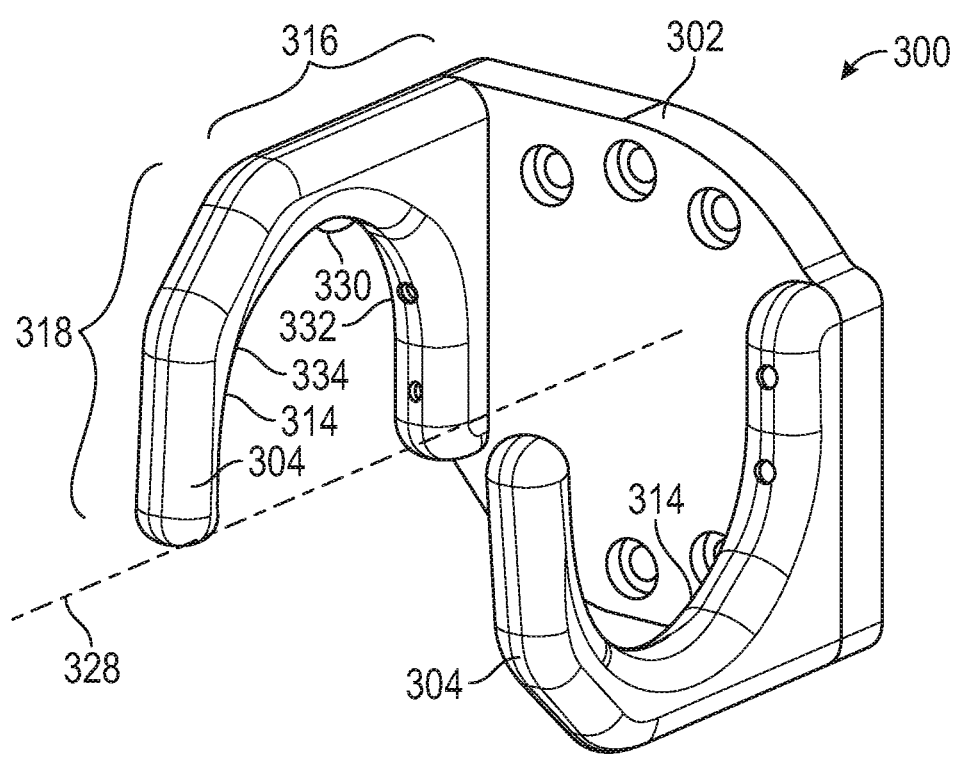
FIG. 9 is a perspective view of an end effector of the present disclosure, according to one or more embodiments.
Figure 10:
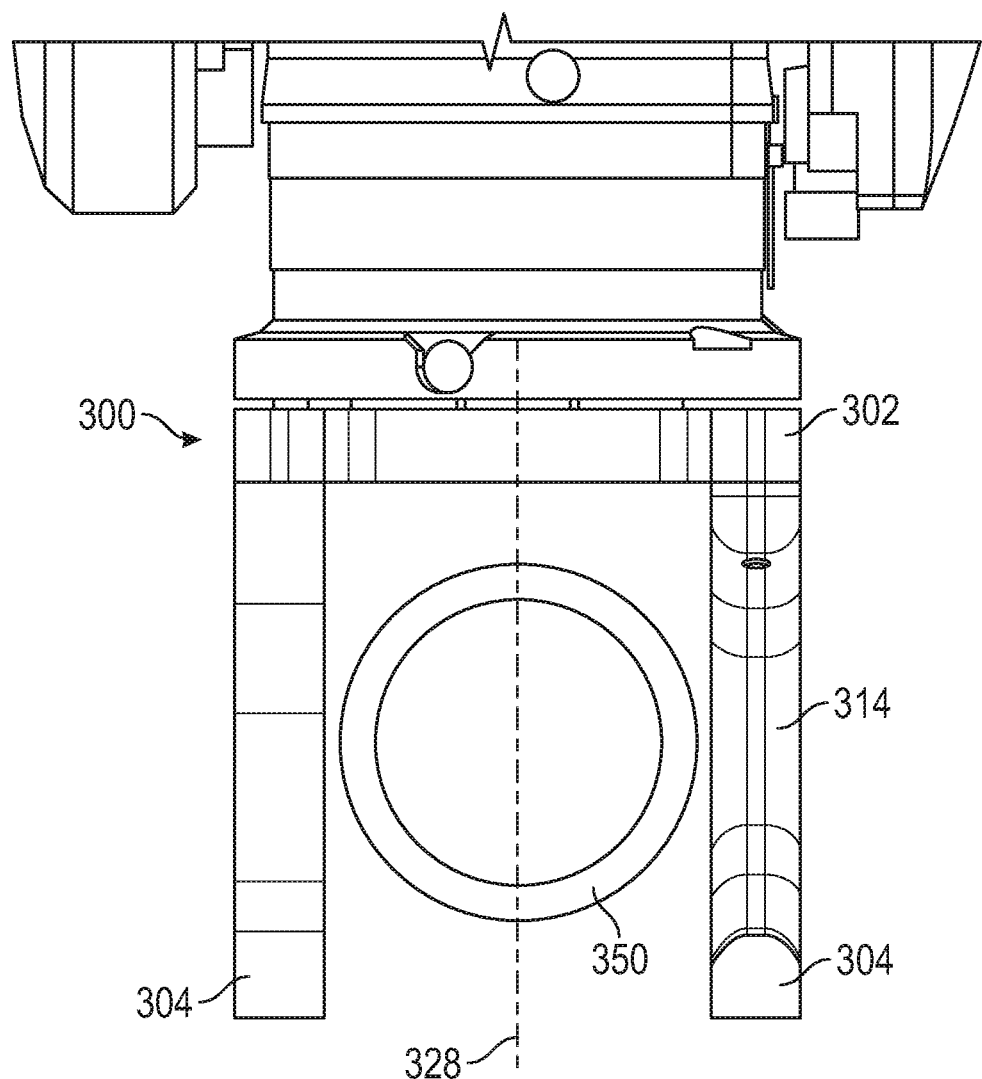
FIG. 10 is a top view of an end effector of the present disclosure in an open configuration adjacent a pipe, according to one or more embodiments.

In some embodiments, an end effector of the present disclosure may be configured for engaging with a range of pipe sizes. For example, FIG. 9 shows another embodiment of an end effector 300 of the present disclosure. The end effector 300 may have a backing plate 302 and a pair of jaws 304. The jaws 304 may be sized and may be arranged on the backing plate 304 similar to the sizing and arrangement of the jaws 204 described above with respect to the end effector 200. Moreover, each jaw 304 may have an inner contour 314 sized and configured to receive a pipe having a diameter within a range of diameter sizes. However, the inner contour 314 of each jaw 304 may have a V-shape with an angled corner 330 at or near a midpoint of the contour. The corner 330 may have an angle of between approximately 40 degrees and approximately 140 degrees, or between approximately 60 degrees and approximately 120 degrees, or between approximately 80 degrees and approximately 100 degrees. In some embodiments, the corner 330 may have an angle of 90 degrees or approximately 90 degrees. In other embodiments, the corner 330 may have any other suitable angle. The corner 330 may be a radiused corner in some embodiments. In particular, the corner 330 may have a radius sized to receive an outer wall of a particular pipe size. Where the end effector 300 is configured to accommodate a range of pipe sizes, a radius of the corner 330 may be equal or slightly larger than a radius of a smallest pipe size of the range of pipe sizes. For each contour 314, the corner 330 may be arranged between two sidewalls 332, 334. A first sidewall 332 may be arranged on a bracket portion 316 of the jaw 304, and a second sidewall 334 may be arranged on an extension portion 318 of the jaw. The sidewalls 332, 334 may be straight or curved. In some embodiments, the two sidewalls 332, 334 may have a same radius of curvature.

Figure 11:
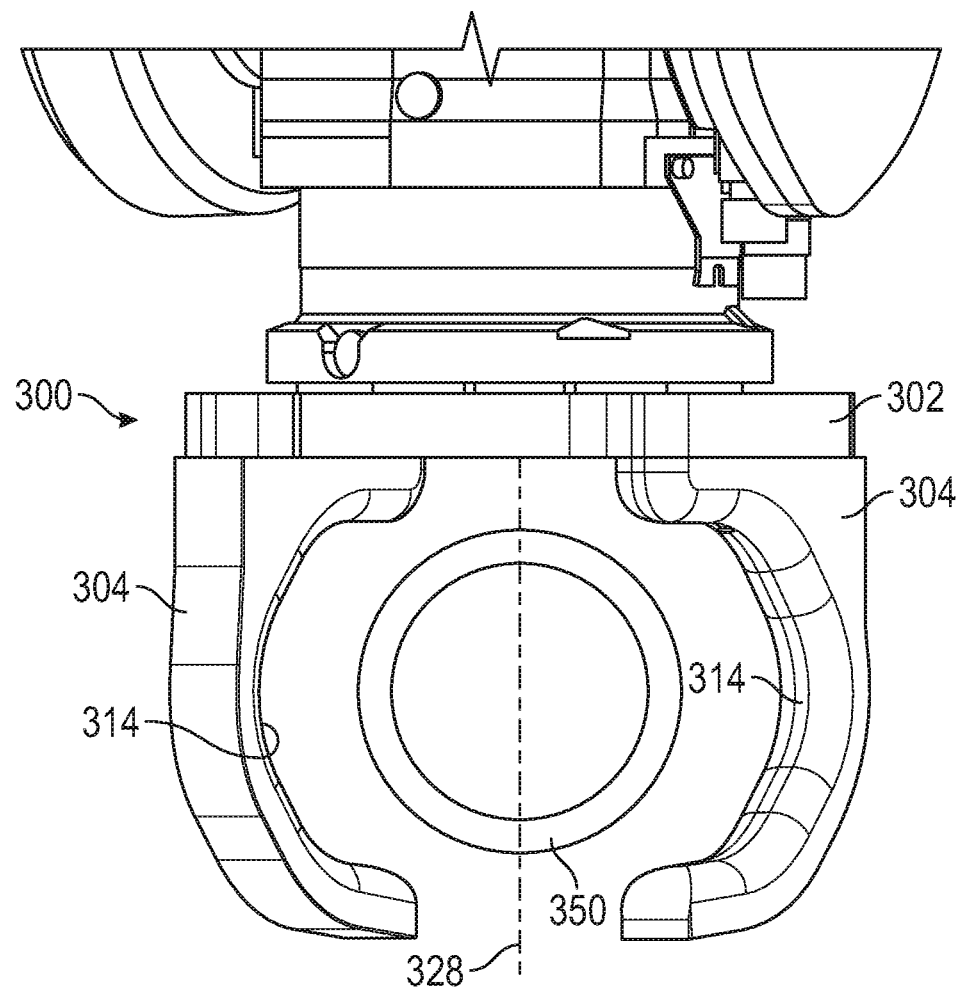
FIG. 11 is another top view of the end effector of FIG. 10 as the end effector begins to pivot from an open configuration to a closed configuration, according to one or more embodiments.
Figure 12:
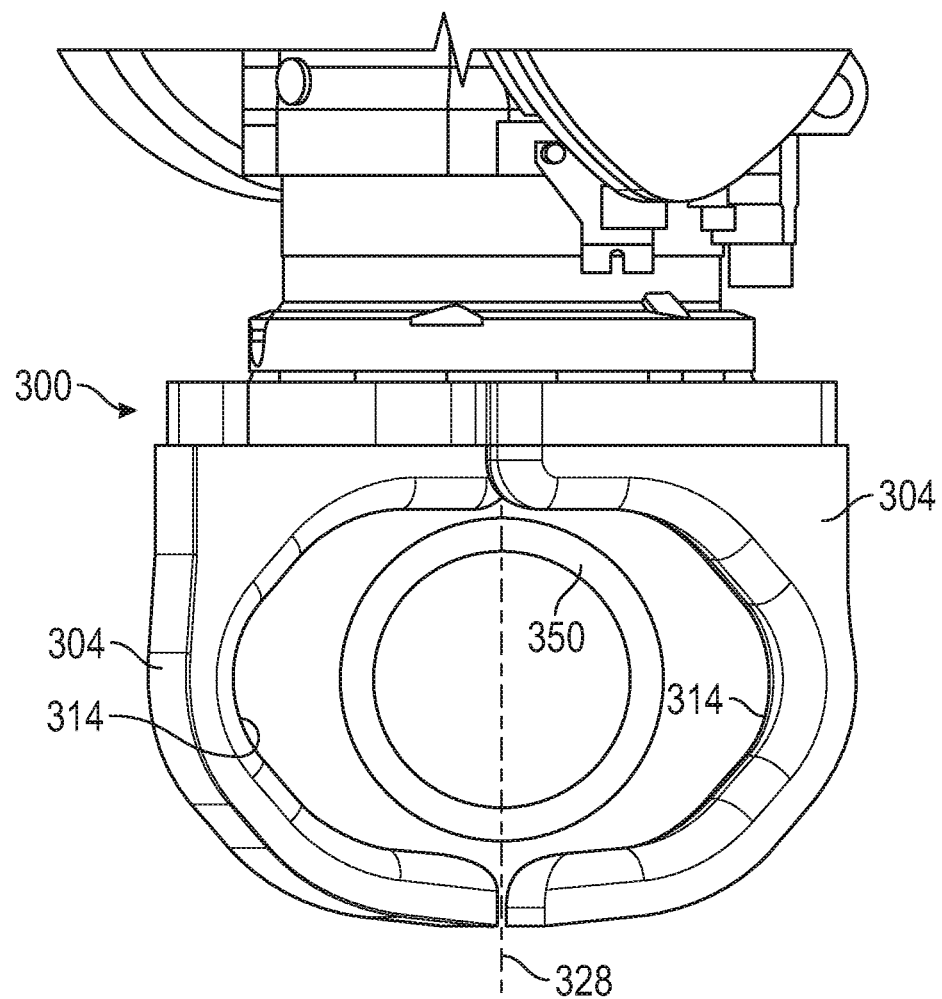
FIG. 12 is another top view of the end effector of FIG. 10 as the end effector continues to pivot from an open configuration to a closed configuration, according to one or more embodiments.
Figure 13:
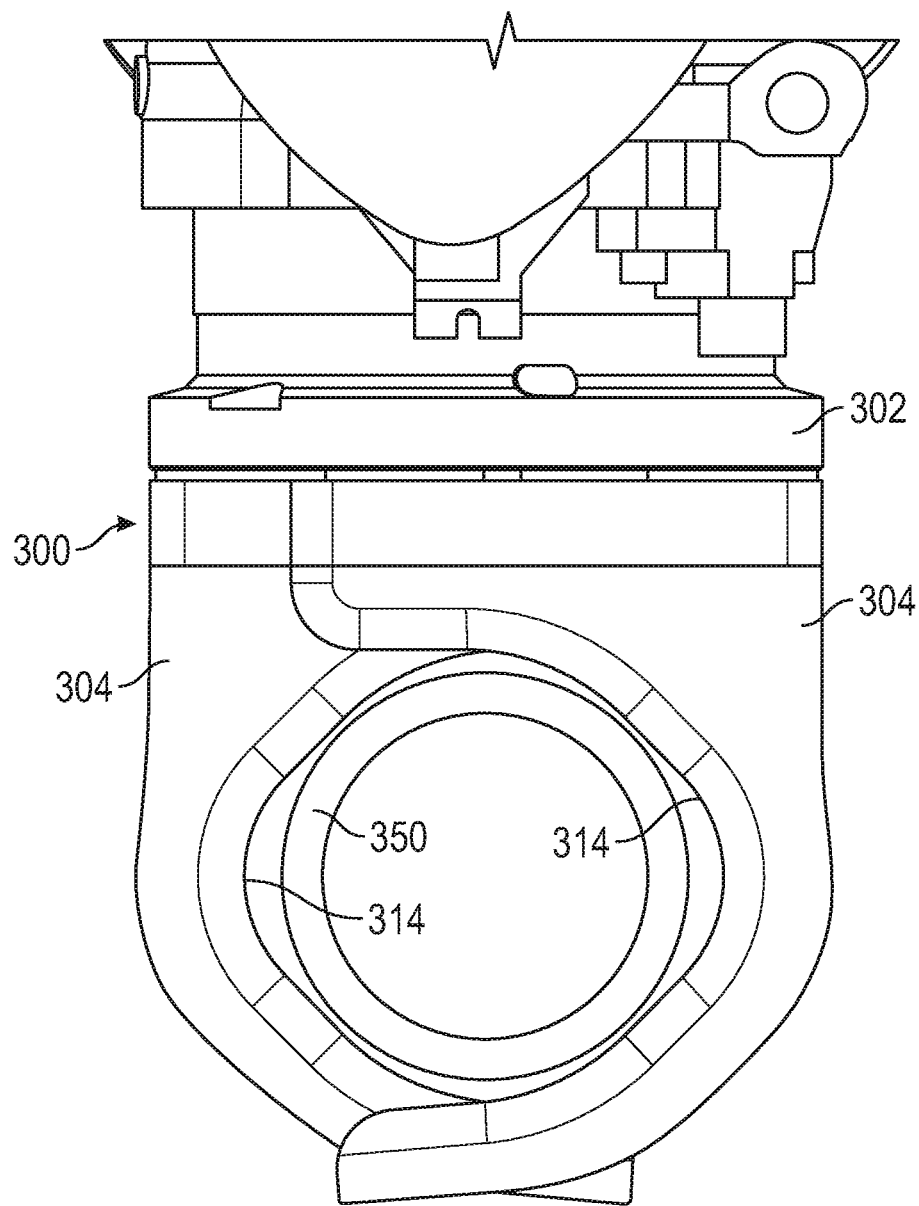
FIG. 13 is another top view of the end effector of FIG. 10 as the end effector continues to pivot from an open configuration to a closed configuration, according to one or more embodiments.
Figure 14:
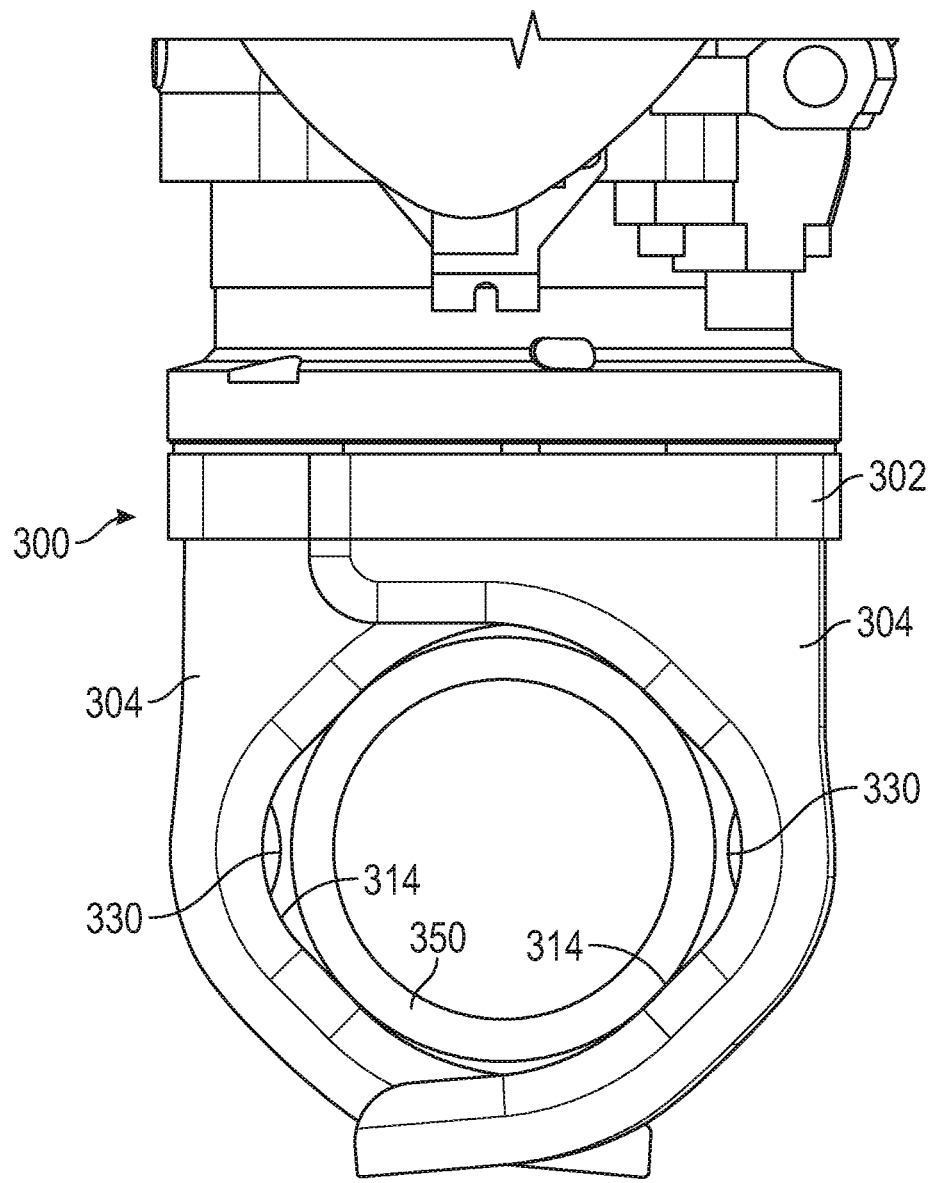
FIG. 14 is another top view if the end effector of FIG. 10 with the end effector in a closed configuration about the pipe, according to one or more embodiments.

The end effector 300 may be configured to pivot or rotate between an open configuration and a closed configuration with respect to a pipe section. FIGS. 10-14 illustrate an axial view of a pipe section 350 as the end effector 300 pivots between an open configuration and a closed configuration with respect to the pipe section. FIG. shows the end effector 300 in an open configuration with the pipe section 350 received between the jaws 304. FIGS. 11-13 illustrate the rotation of the end effector 300 about its central axis 328. In the closed configuration shown in FIG. 14, the inner contours 314 may contact the pipe section 350. In particular, the sidewalls 332, 334 of the two inner contours 314 may contact the pipe section 350 and operate to restrain radial movement of the pipe. In some embodiments, the end effector 300 may be configured to rotate toward a closed configuration until contact between the sidewalls 332, 334 and the pipe section 350 is made. While the sidewalls 332, 334 may contact the pipe section 350, there may be a gap between the pipe section and the inner corner 330 of each jaw 304.

Figure 15:
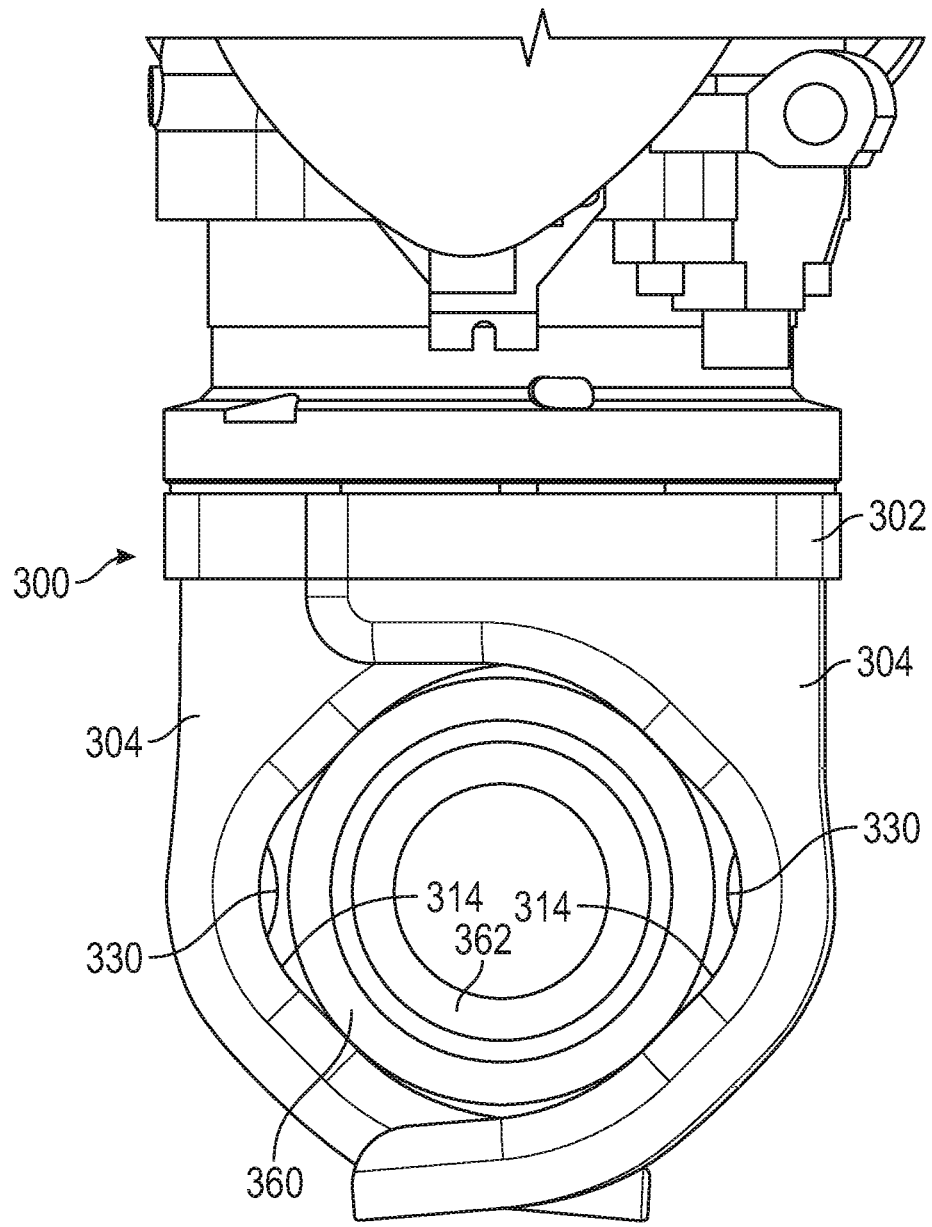
FIG. 15 is a top view of an end effector of the present disclosure in a closed configuration with respect to a first pipe size in comparison to a second pipe size, according to one or more embodiments.
Figure 16:
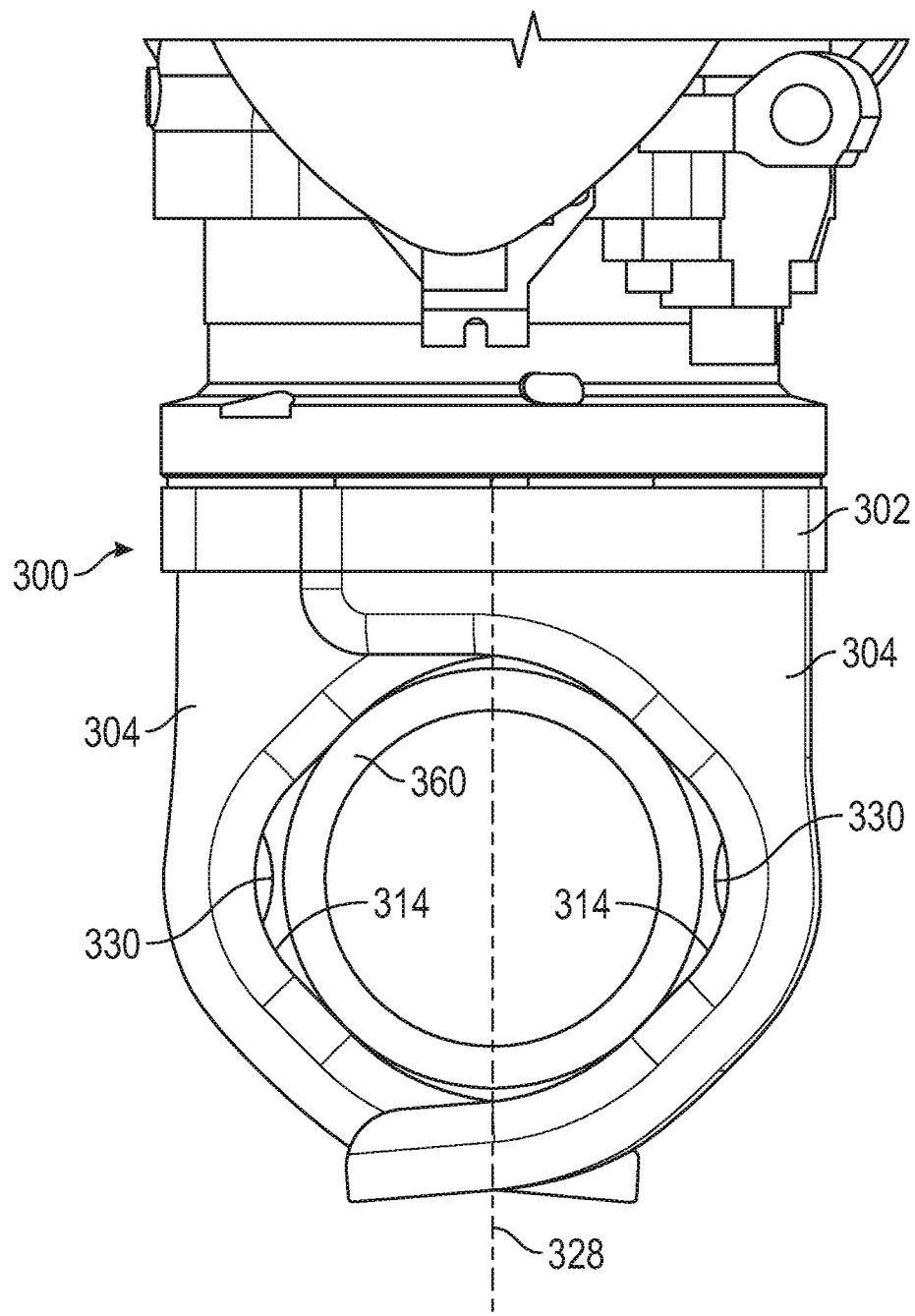
FIG. 16 is a top view of the end effector of FIG. 15 in a closed configuration with respect to the first pipe size, according to one or more embodiments.
Figure 17:
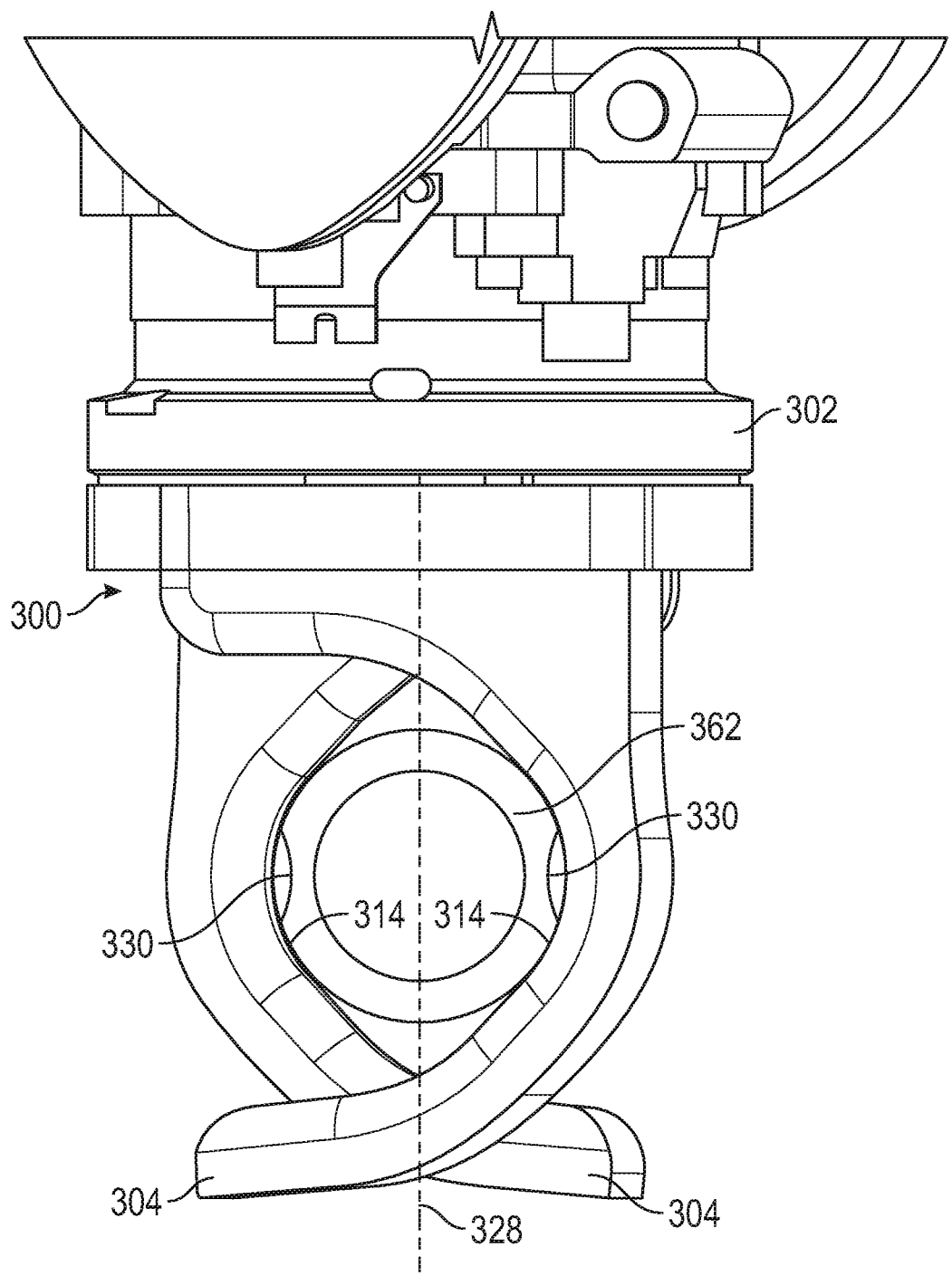
FIG. 17 is a top view of the end effector of FIG. 15 in a closed configuration with respect to the second pipe size, according to one or more embodiments.

The end effector 300 may be configured to engage with a range of pipe sizes. In particular, the angled corners 330 within the inner contours 314 of the end effector 300 may allow the end effector to engage with a range of pipe sizes. For example, FIG. 15 illustrates two different pipe sections 360, 362 having differing diameters that may be accommodated by the V-shaped jaws 304 of the end effector 300. The end effector 300 may engage with the differing pipe sizes by rotating to different degrees of rotation between an open configuration and a closed configuration. For example, FIG. 16 shows the end effector 300 in a closed configuration with respect to the larger of the two pipe sections 360. As shown, where the pipe 362 has a radius larger than a radius of the corner 330, the end effector 300 may reach a closed configuration when the sidewalls 332, 334 contact an outer wall of the pipe section. In the closed configuration shown in FIG. 16, there may be a gap between an outer wall of the pipe section and the radiused corners 330. FIG. 17 shows the end effector 300 in a closed configuration with respect to the smaller of the two pipe sections 362. As shown, where the pipe section 362 has a radius similar to that of the radiused corners 330, the pipe section may be nestably arranged within the radiused corners in the closed configuration. It is to be appreciated that the end effector 300 may rotate further about its central axis 328 to reach the closed configuration with respect to the smaller pipe section 362 of FIG. 17, as compared with the larger pipe section 360 of FIG. 16. For example, to transition from an open configuration to a closed configuration, the end effector may be rotated between approximately 80 and 95 degrees with respect to the pipe section 360 of FIG. 16, and may be rotated between 85 and 100 degrees with respect to the pipe section 362 of FIG. 17. The end effector 300 with the V-shaped jaws 304 may be configured to engage with pipe having a range of diameters. In some embodiments, the end effector 300 may be configured to engage with a pipe diameter as small as 3 inches, 2 inches, 1.5 inches, 1 inch, 0.5 inches, or smaller. The end effector 300 may be configured to engage with a pipe diameter as large as 5 inches, 6 inches, 7 inches, 8 inches, 10 inches, or 12 inches, or more.

It is to be appreciated that, in order to constrain radial movement of a pipe section, an end effector of the present disclosure may be configured to have at least two or at least three points of contact, or near contact, with the pipe section.

Figure 18:
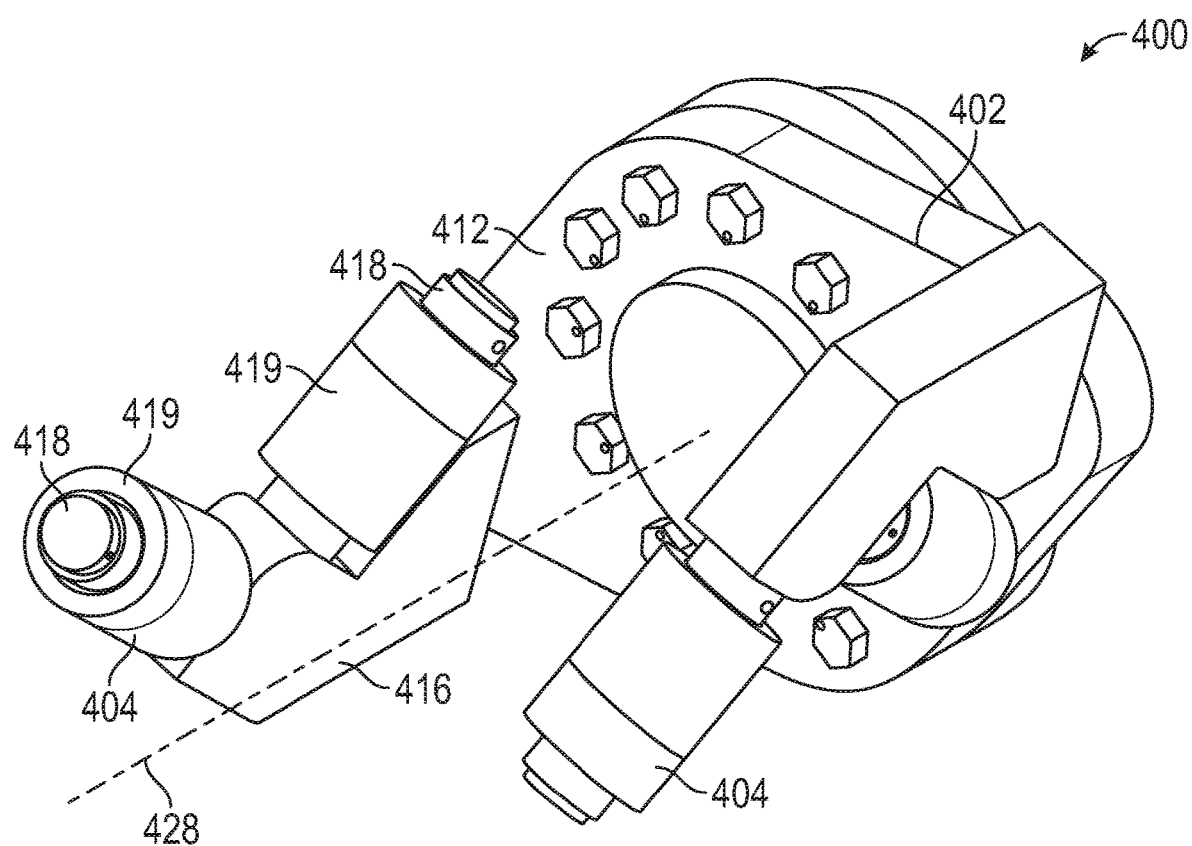
FIG. 18 is a perspective view of an end effector of the present disclosure, according to one or more embodiments.

FIG. 18 shows another embodiment of an end effector 400 of the present disclosure. The end effector 400 may have a backing plate 402 and a pair of jaws 404 extending laterally from a front surface 412 of the backing plate. Each jaw 404 may have a bracket portion 416 and a pair of extension portions 418 extending from the bracket portion and configured to engage with a pipe section. The extension portions 418 may have a round cross-sectional shape in some embodiments. The bracket portion 416 may be shaped and configured to position the two extension portions 418 in a V-shape. In particular, the extension portions 418 may extend from the bracket portion 416 with an angle between them of between approximately 80 degrees and approximately 100 degrees, or an angle of approximately 90 degrees. The V-shape defined by the two extension portions 418 of each jaw 404 may provide an inner contour 414 for engaging with a pipe section. The end effector 400 may be configured to rotate or pivot about a central axis 428 extending through the backing plate 402 and between the two jaws 404 so as to transition between an open configuration and a closed configuration with respect to a pipe section.

Figure 19:
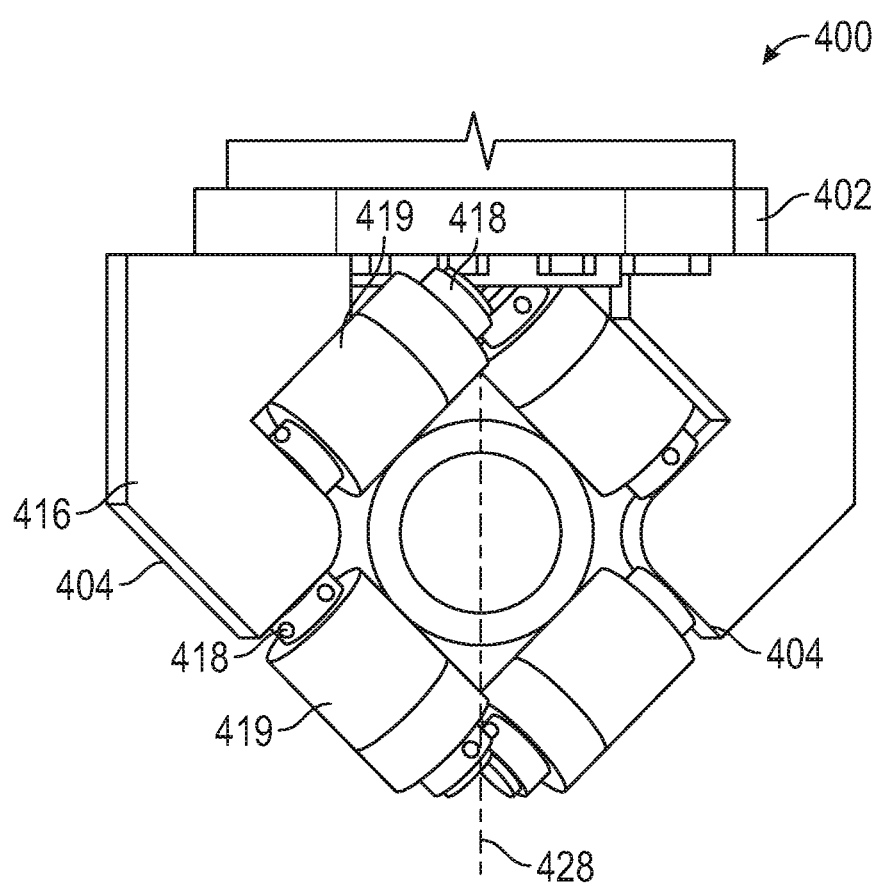
FIG. 19 is a top view of the end effector of FIG. 18, the end effector in a closed configuration about a pipe, according to one or more embodiments.

FIG. 19 shows an axial view of a pipe section 450 and the end effector 400 in a closed configuration with respect to the pipe section. As shown, in the closed configuration, the four extension portions 418 may form a closed loop around a cross section of the pipe 450. In some embodiments, each of the four extension portions 418 may contact an outer surface of the pipe 450. In some embodiments, the extension portions 418 may each have a roller 419 arranged thereon and configured to reduce friction between the end effector 400 and the pipe section 450, thus allowing for axial movement of the pipe section.

Figure 20:
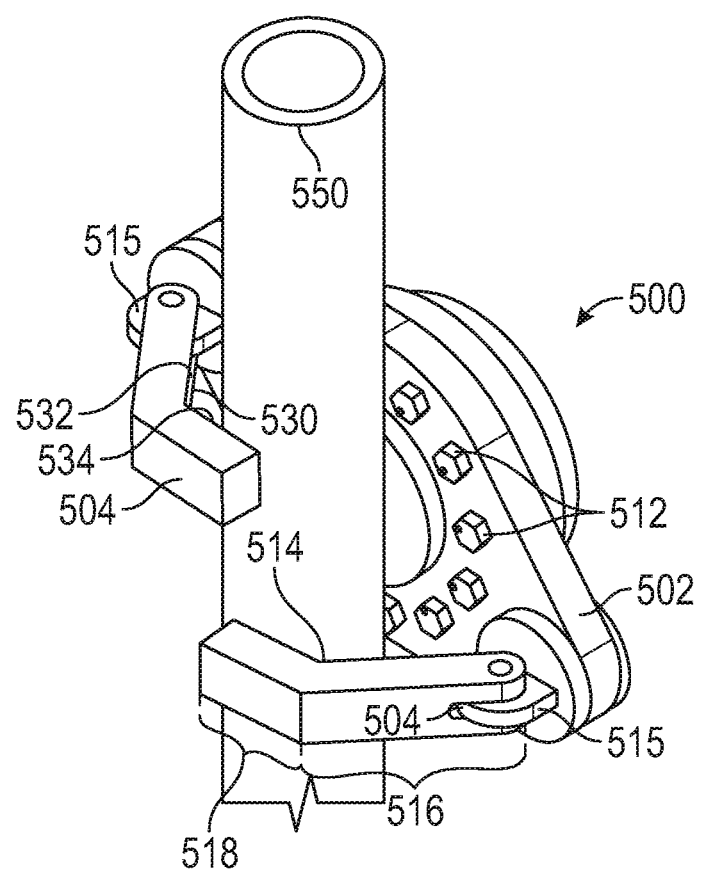
FIG. 20 is a perspective view of an end effector of the present disclosure in a closed configuration about a pipe, according to one or more embodiments.

FIG. 20 shows another end effector 500 of the present disclosure. The end effector 500 may have a backing plate 502 and a pair of jaws 504 extending laterally from a front surface 412 thereof. The end effector 500 may be configured to rotate or pivot about a central axis between an open configuration and a closed configuration with respect to a pipe section. FIG. 20 shows the end effector 500 in a closed configuration with respect to a pipe section 550. The end effector 500 may additionally be configured to accommodate a range of pipe sizes. In particular, the jaws 504 may be configured such that an angle between each jaw and the backing plate 502 may be adjusted.

In some embodiments, each jaw 504 may be or include a bracket 516, which may be an angled bracket. Two inner sidewalls 532, 534 of the bracket 516 may define an inner contour 514, and may meet at an inner corner 530. The inner corner 530 may have an angle of between approximately 45 degrees and approximately 155 degrees. In some embodiments, each bracket 516 may couple to the backing plate 505 with a hinge 515. The hinge 515 may be configured such that the brackets 516 may be positioned and maintained at a desired angle. For example, the hinges 515 may have ratcheting teeth in some embodiments or may be positionable using a pin. In other embodiments, other mechanisms may be used for adjusting an angle of the jaws 504 with respect to the backing plate 502.

Figure 21:
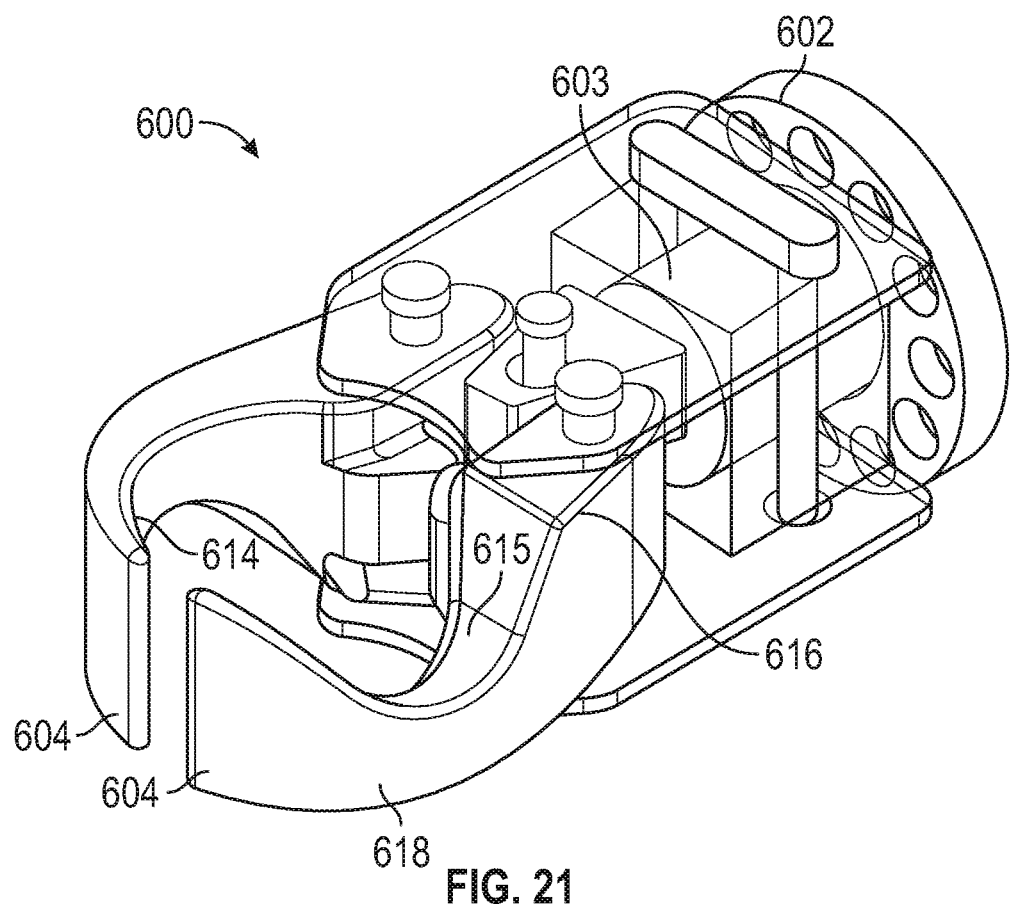
FIG. 21 is a perspective view of an end effector of the present disclosure, according to one or more embodiments.

In some embodiments, an end effector of the present disclosure may have actuatable jaws. For example, FIG. 21 shows an embodiment of an end effector 600 having a pair of hinged jaws 604 that may be controllable by an actuator 603. The actuator 603, which may be hydraulic, pneumatic, or another type of actuator, may be arranged between the jaws 604 and a backing plate 602. Each jaw 604 may have a bracket portion 616 having a hinged connection to the actuator 603. Each jaw 604 may additionally have an extension portion 618. For each jaw 604, the extension portion 618 may have a curved shape defining a first inner contour 614 sized and configured to receive a pipe section. Each jaw 604 may additionally have a second inner contour 615, arranged perpendicular to the first inner contour 614, and which may also be sized and configured to receive a pipe section. The end effector 600 may be configured to transition between an open configuration and a closed configuration with respect to a pipe section.

Figure 22A:
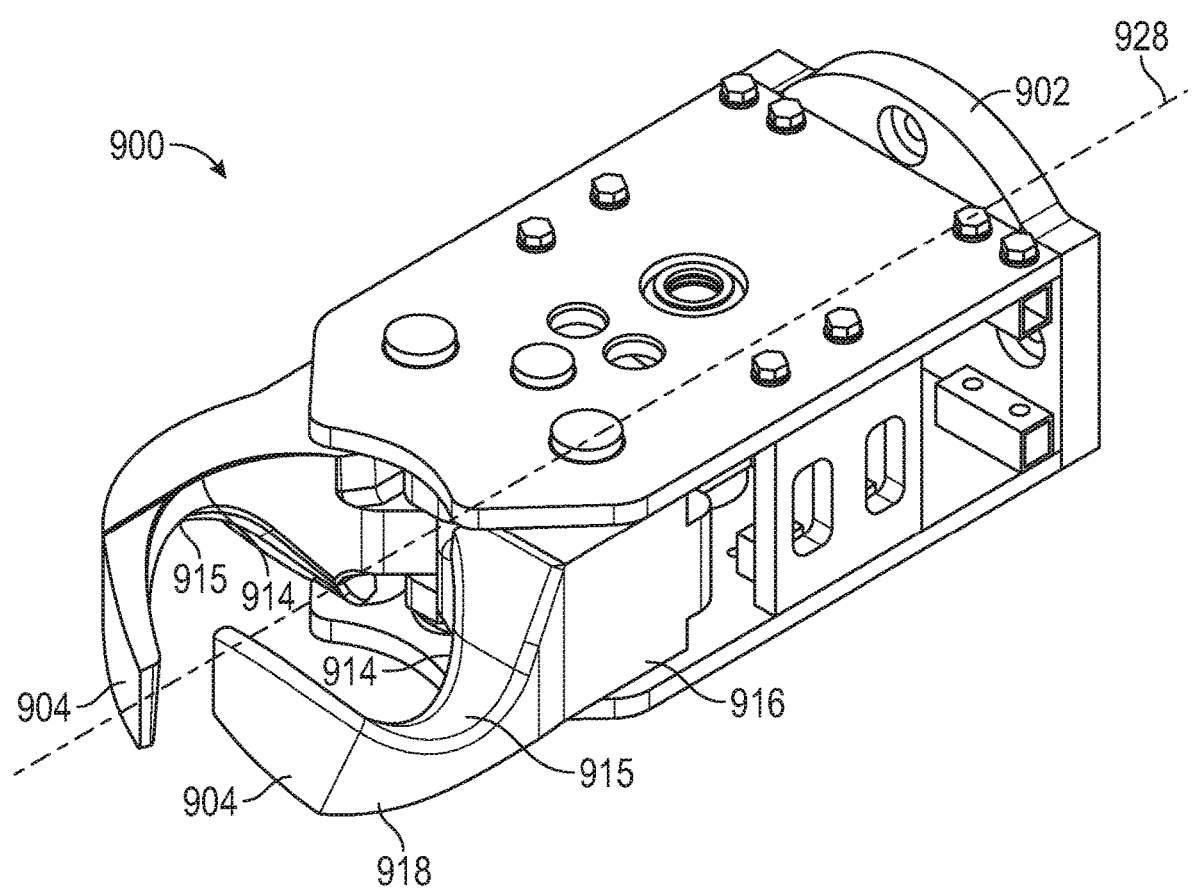
FIG. 22A is a perspective view of an end effector of the present disclosure, according to one or more embodiments.
Figure 22B:
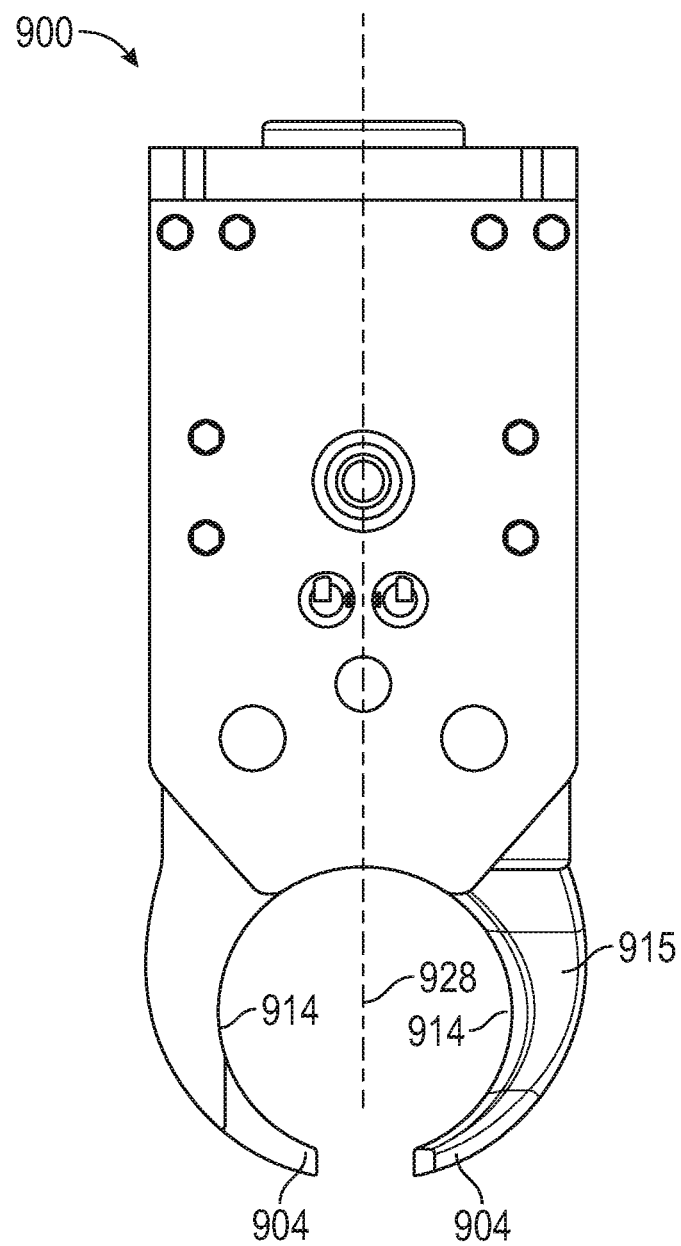
FIG. 22B is a top view of the of the end effector of FIG. 22A, according to one or more embodiments.
Figure 22C:
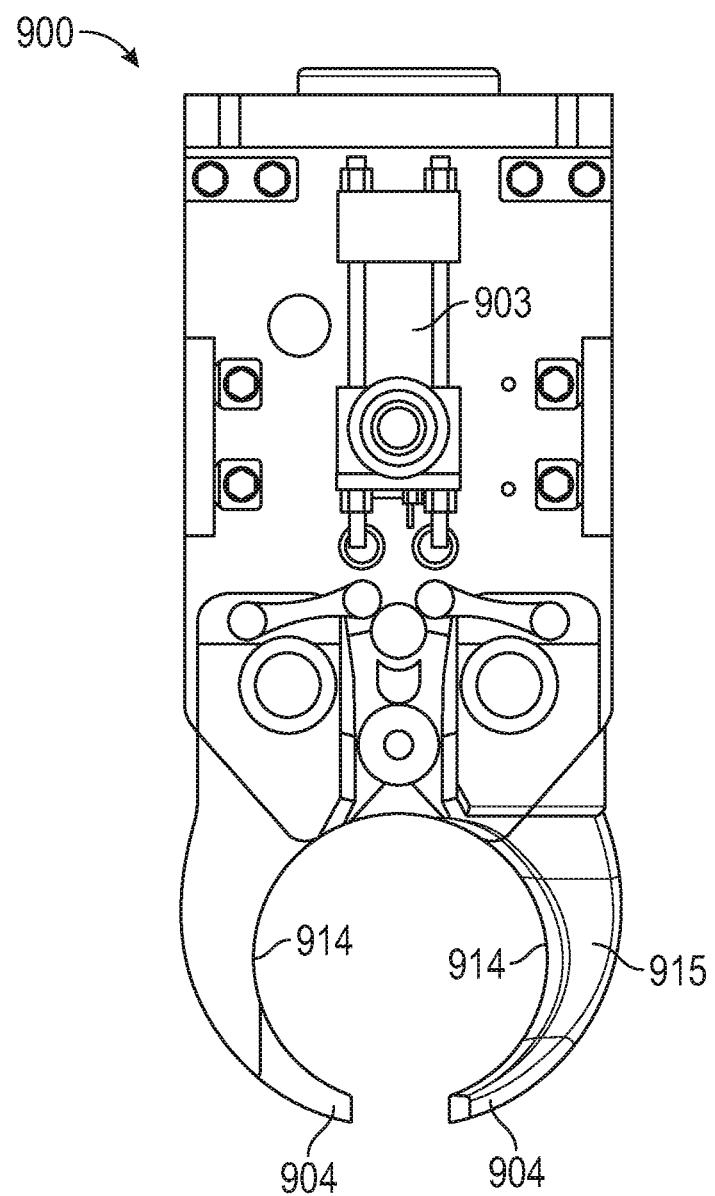
FIG. 22C is an internal top view of the end effector of FIG. 22A, according to one or more embodiments.
Figure 22D:
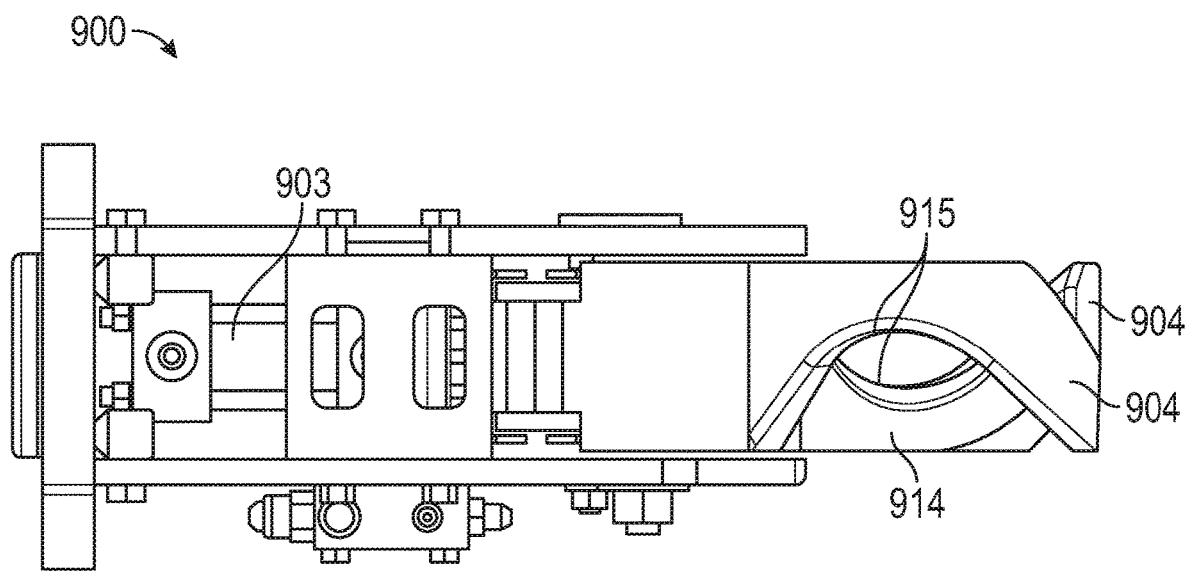
FIG. 22D is a side view of the end effector of FIG. 22A, according to one or more embodiments.
Figure 22E:
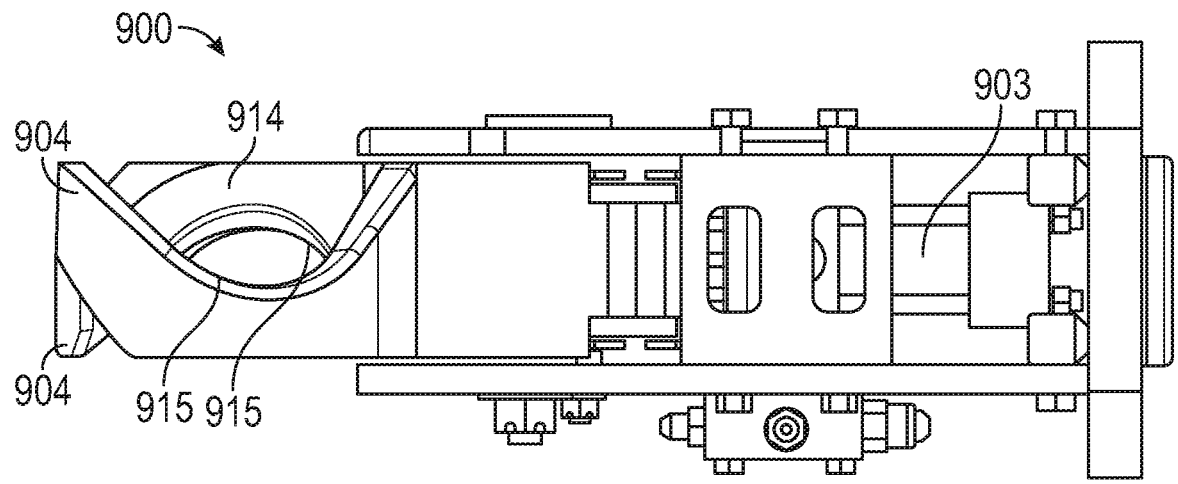
FIG. 22E is another side view of the end effector of FIG. 22A, according to one or more embodiments.
Figure 22F:
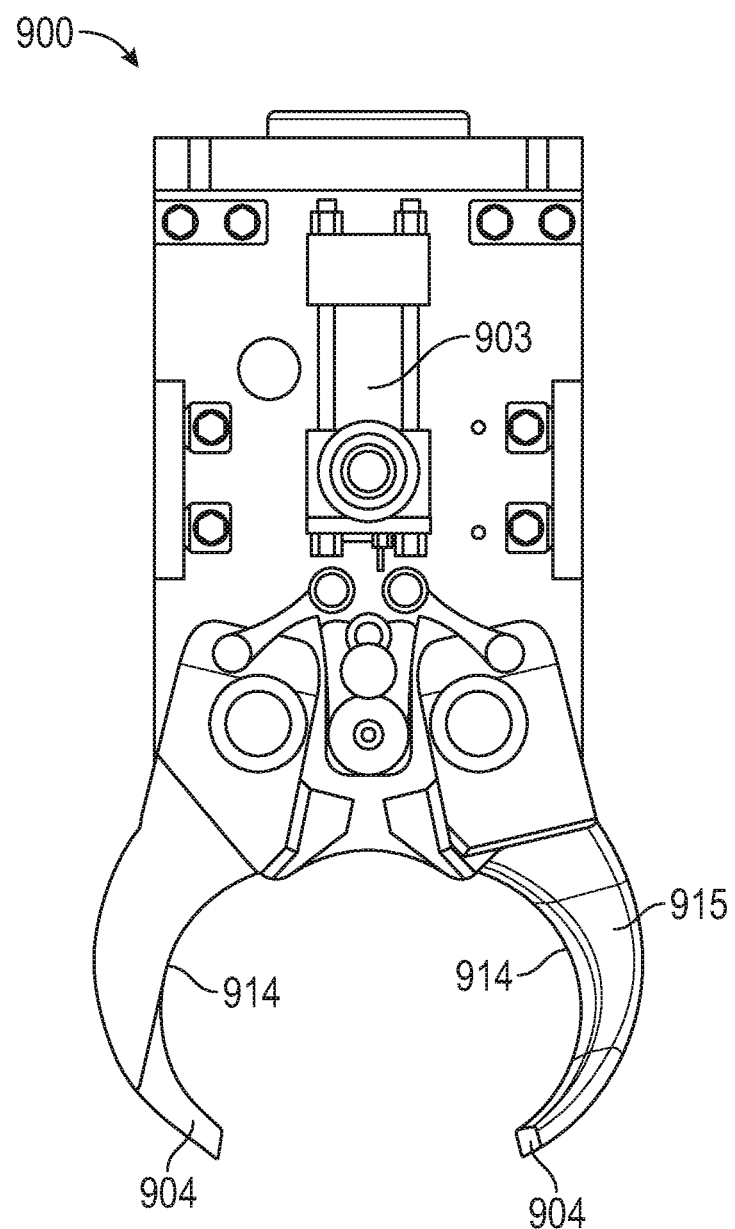
FIG. 22F is an internal top view of the end effector of FIG. 22A in an open configuration, according to one or more embodiments.
Figure 22G:
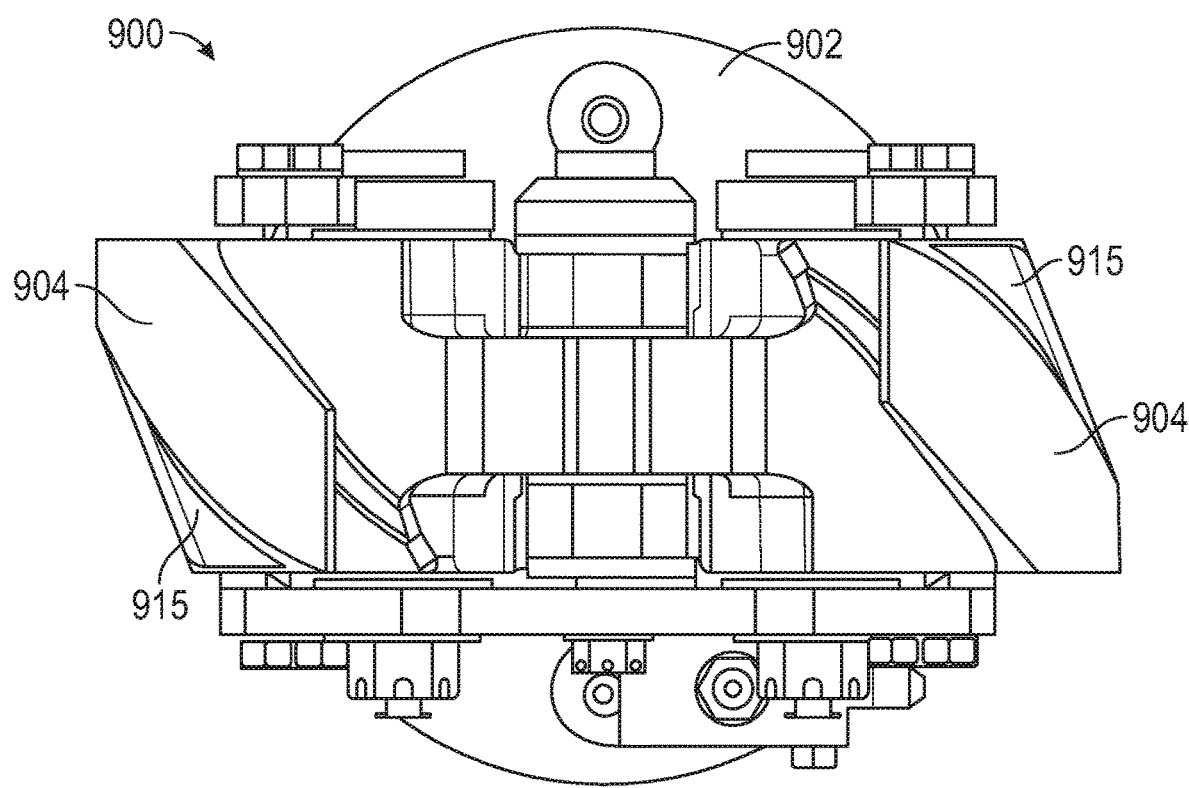
FIG. 22G is a front view of the end effector of FIG. 22A in an open configuration, according to one or more embodiments.
Figure 22H:
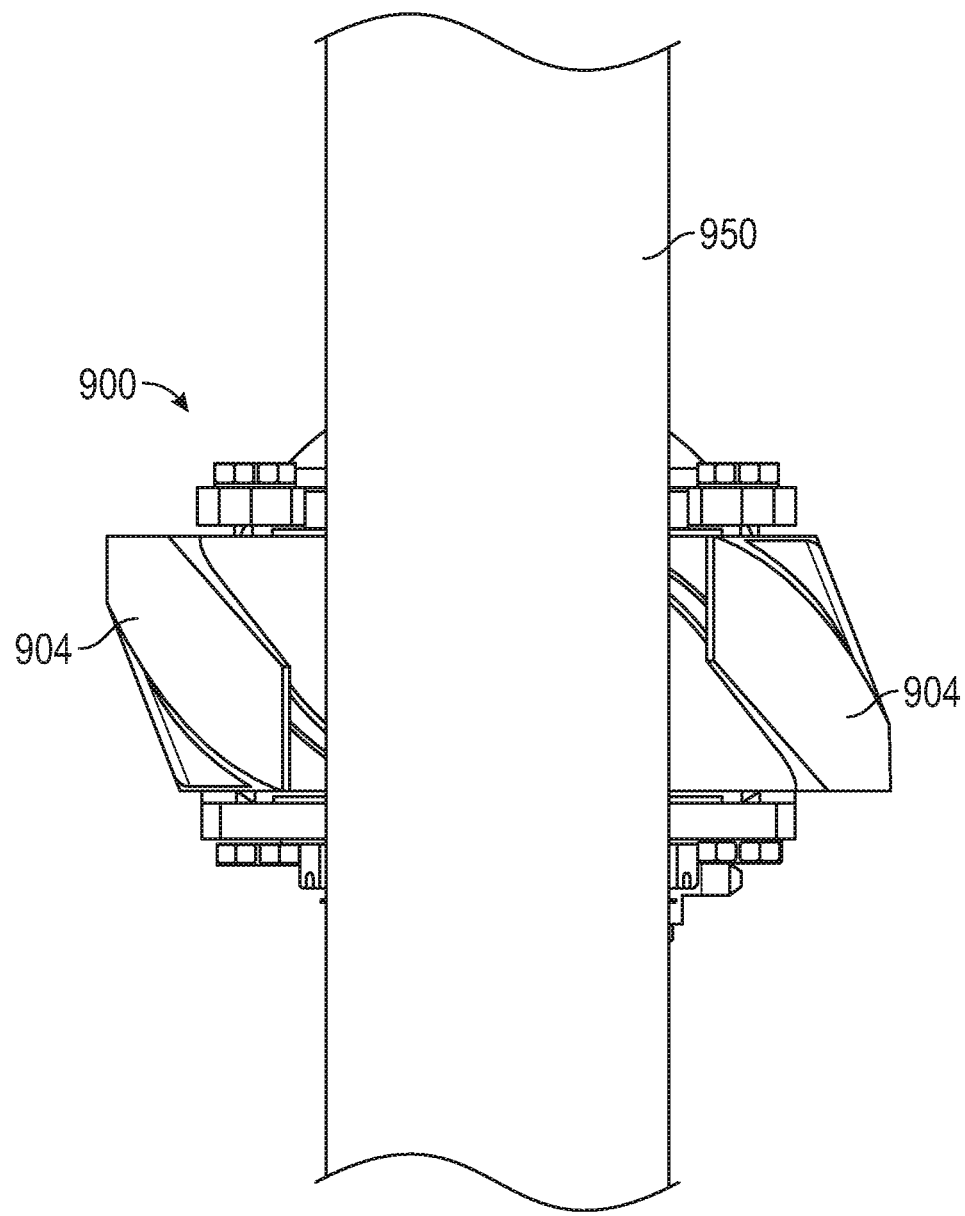
FIG. 22H is a front view of the end effector of FIG. 22A in an open configuration with respect to a pipe section, according to one or more embodiments.
Figure 22I:
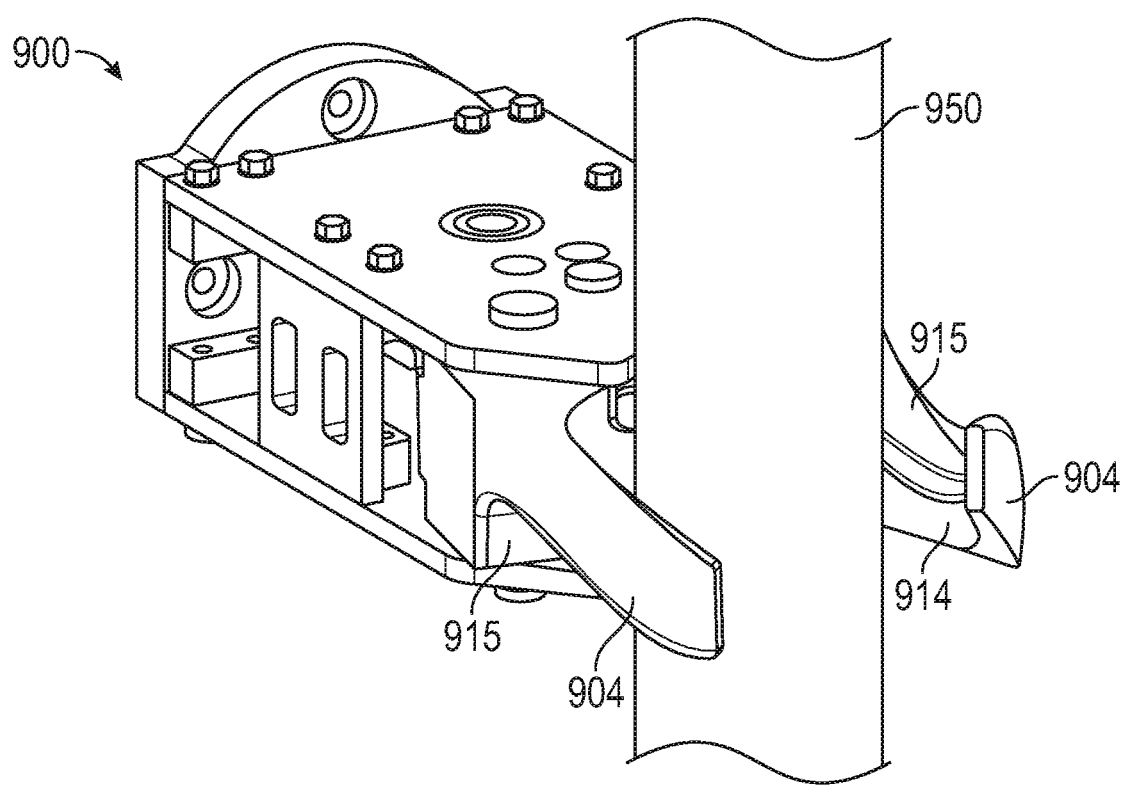
FIG. 22I is a perspective view of the end effector of FIG. 22A in an open configuration with respect to a pipe section, according to one or more embodiments.
Figure 22J:
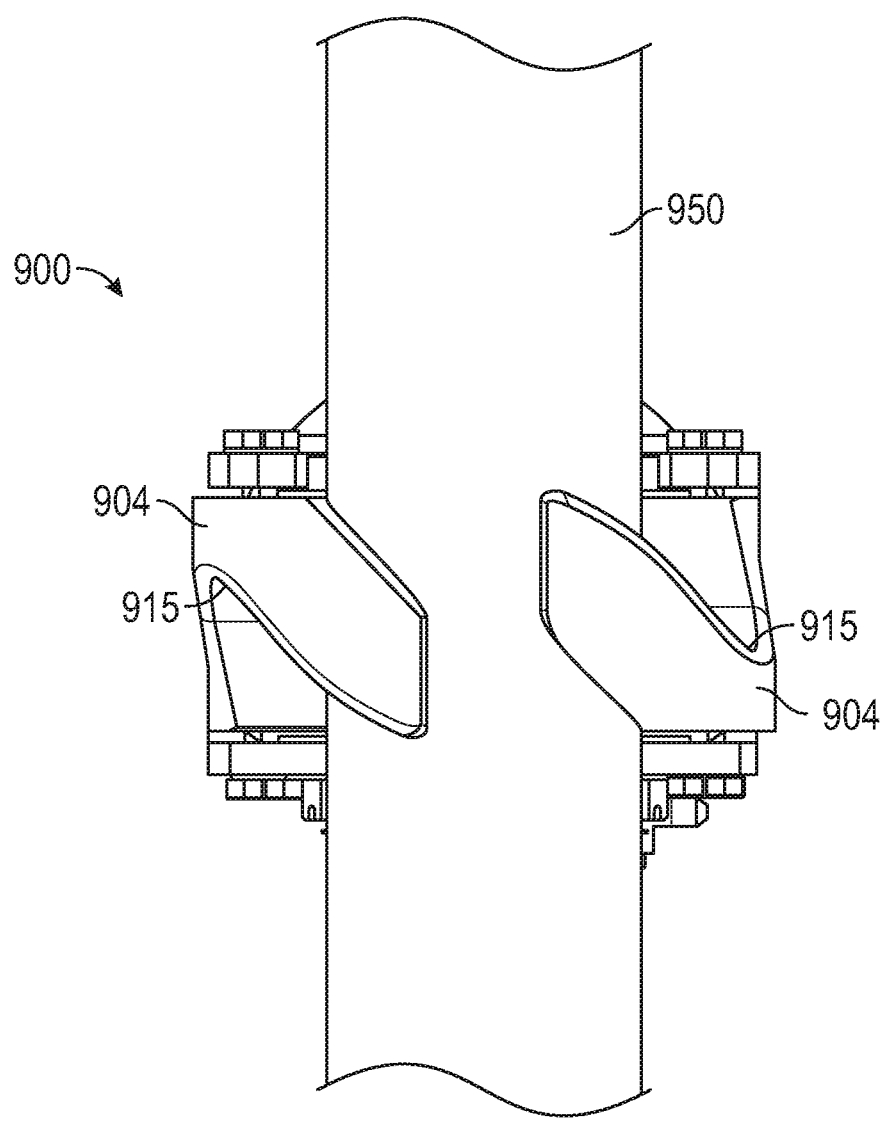
FIG. 22J is a front view of the end effector of FIG. 22A in a transition between an open and closed configuration with respect to a pipe section, according to one or more embodiments.
Figure 22K:
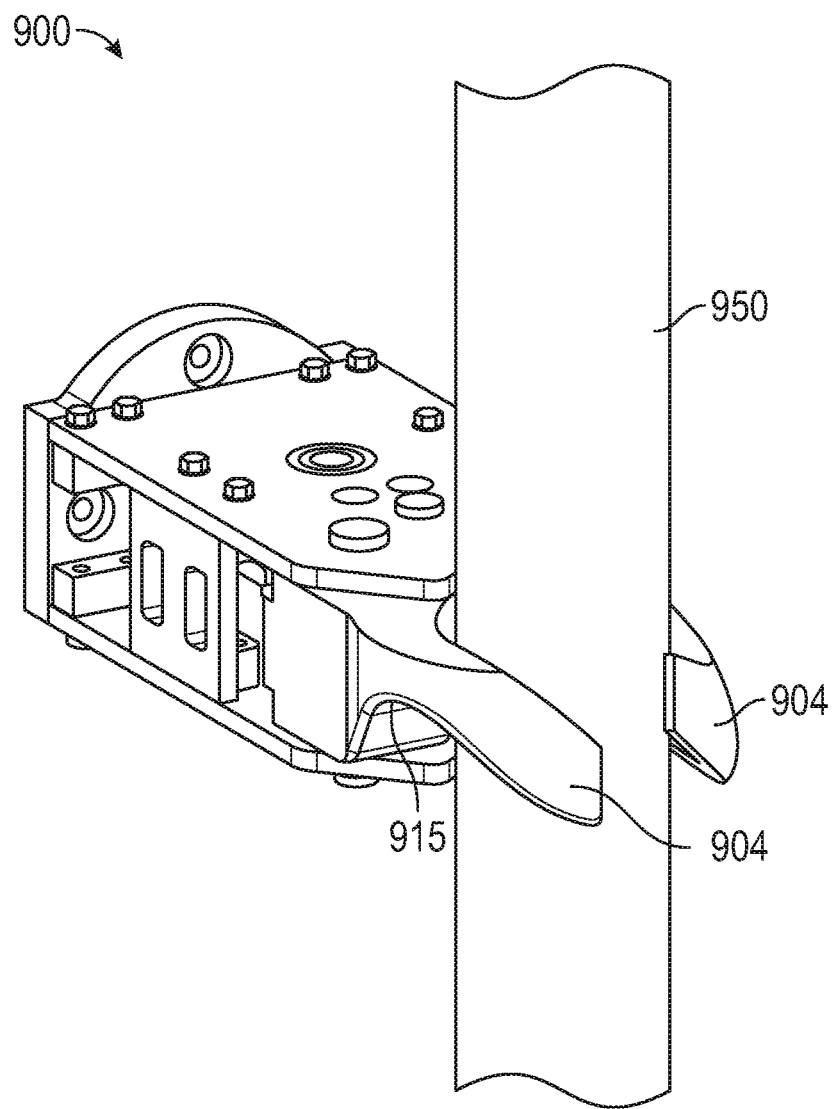
FIG. 22K is a perspective view of the end effector of FIG. 22A in a transition between an open and closed configuration with respect to a pipe section, according to one or more embodiments.
Figure 22L:
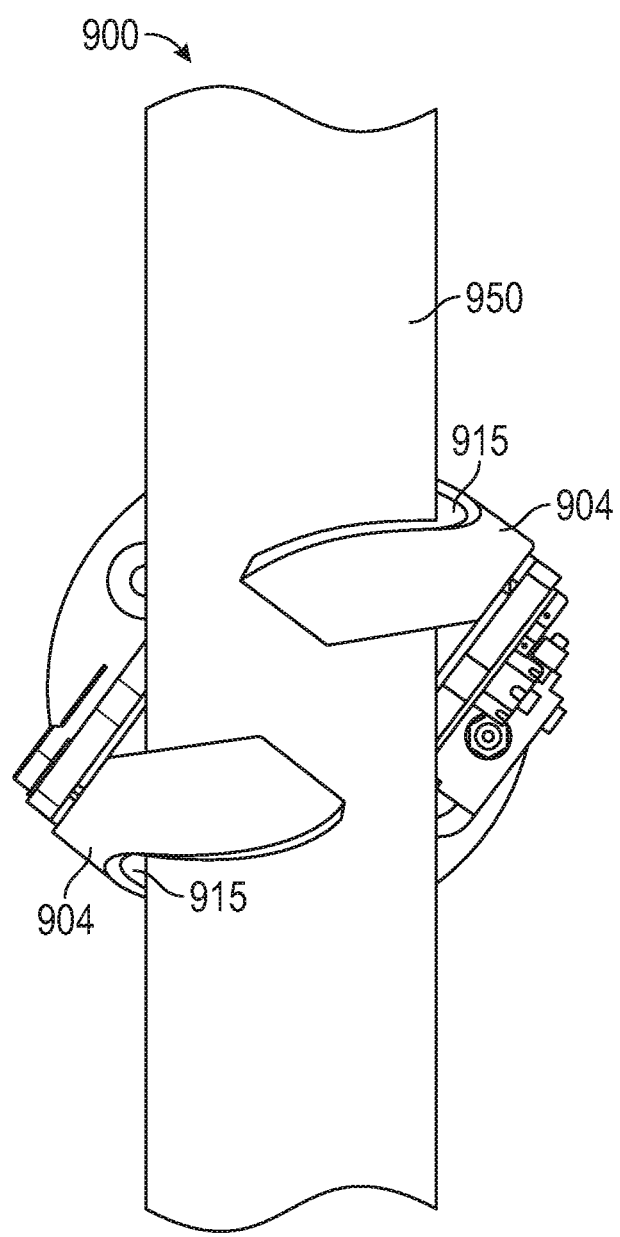
FIG. 22L is a front view of the end effector of FIG. 22A in a closed configuration with respect to a pipe section, according to one or more embodiments.
Figure 22M:
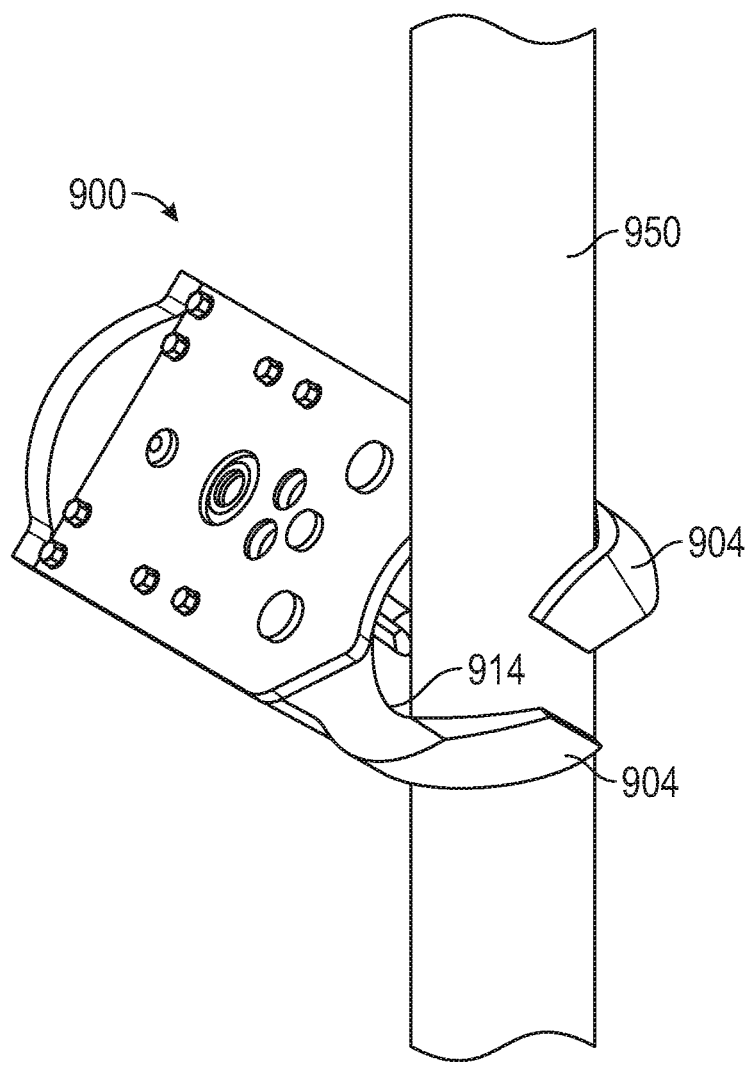
FIG. 22M is a perspective view of the end effector of FIG. 22A in a closed configuration with respect to a pipe section, according to one or more embodiments.
Figure 22N:
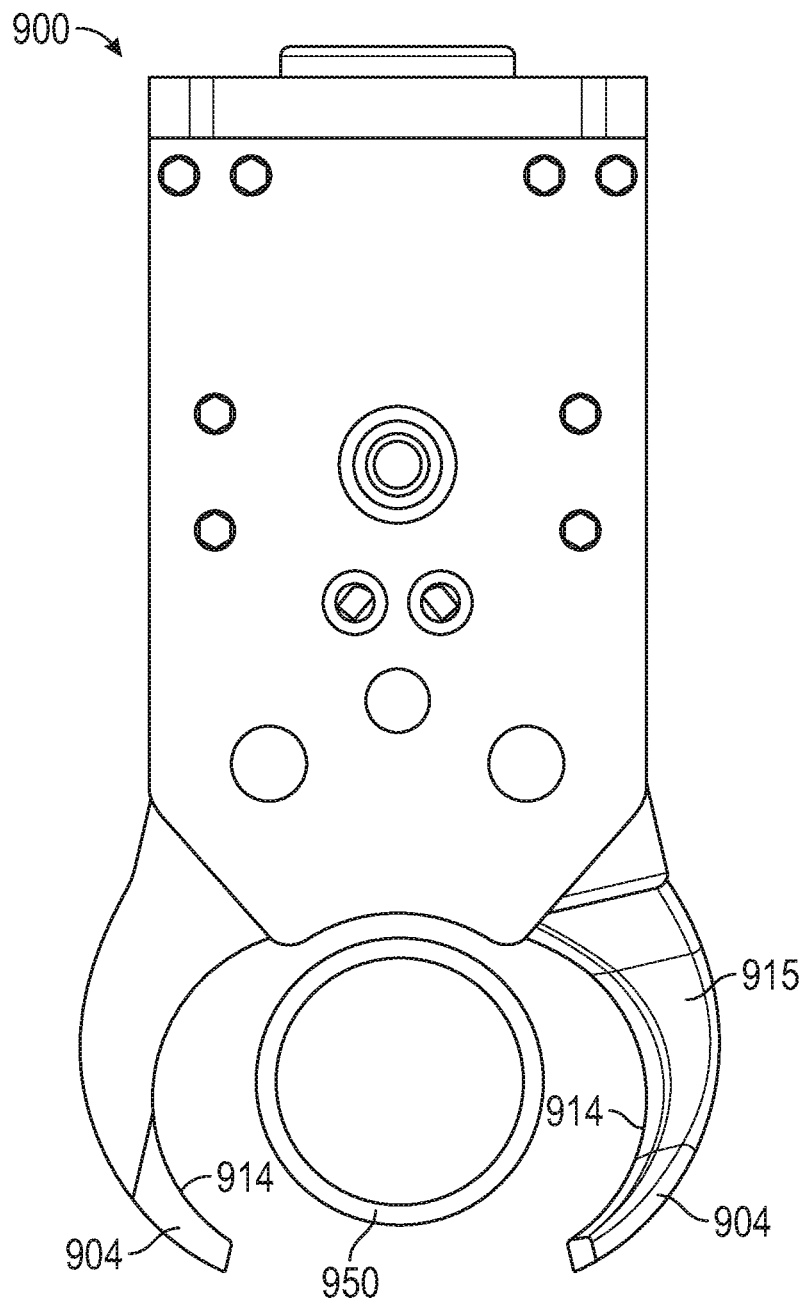
FIG. 22N is a top view of the end effector of FIG. 22A in an open configuration with respect to a pipe section, according to one or more embodiments.
Figure 22O:
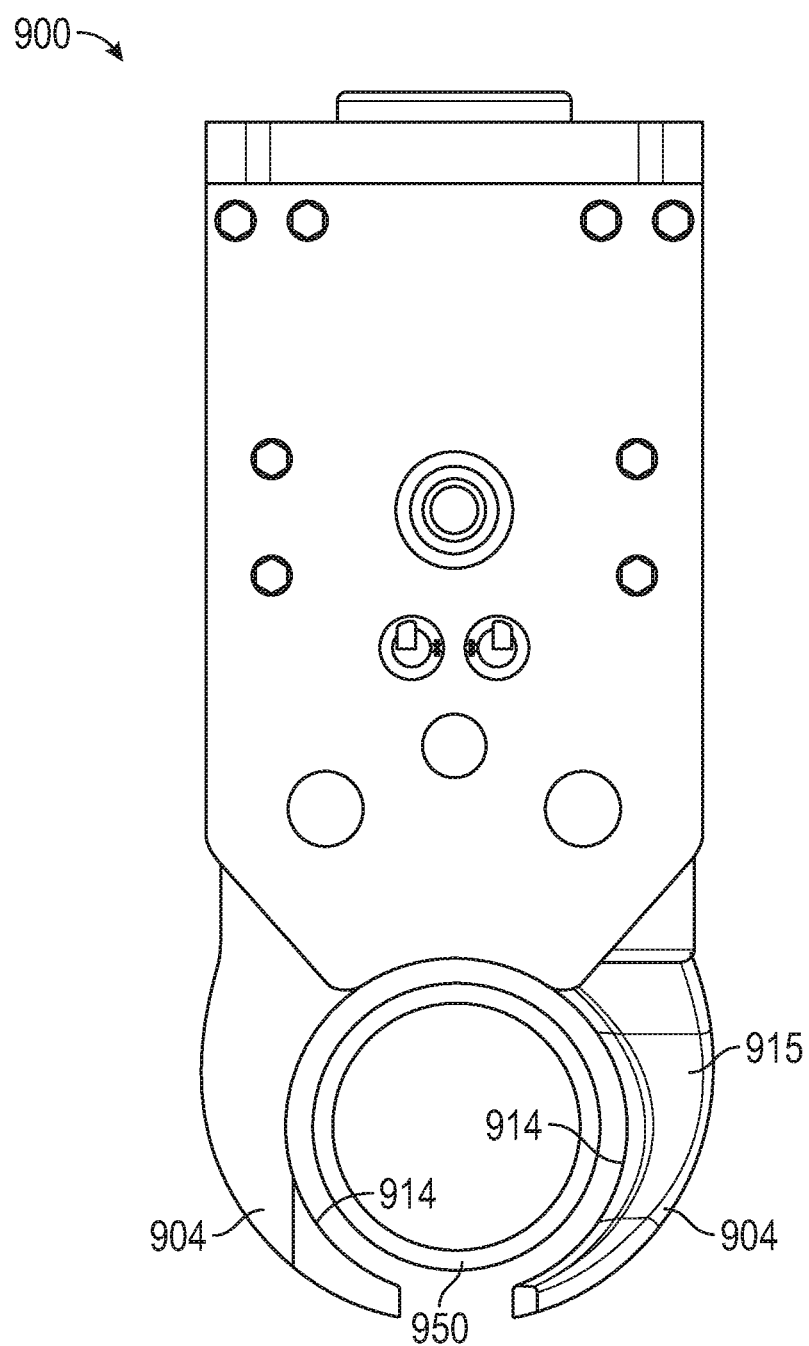
FIG. 22O is a top view of the end effector of FIG. 22A in a transition between an open and closed configuration with respect to a pipe section, according to one or more embodiments.
Figure 22P:
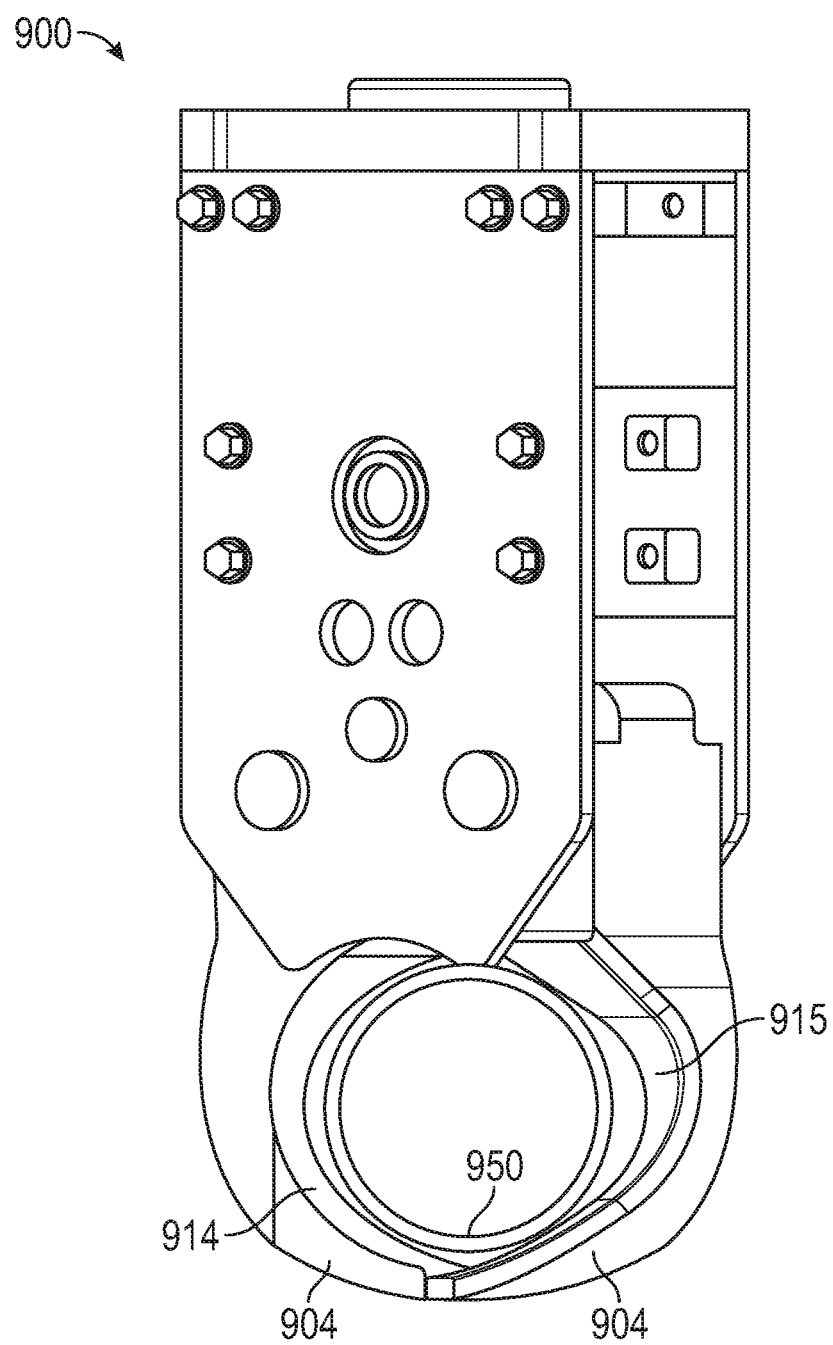
FIG. 22P is a top view of the end effector of FIG. 22A in a transition between an open and closed configuration with respect to a pipe section, according to one or more embodiments.
Figure 22Q:
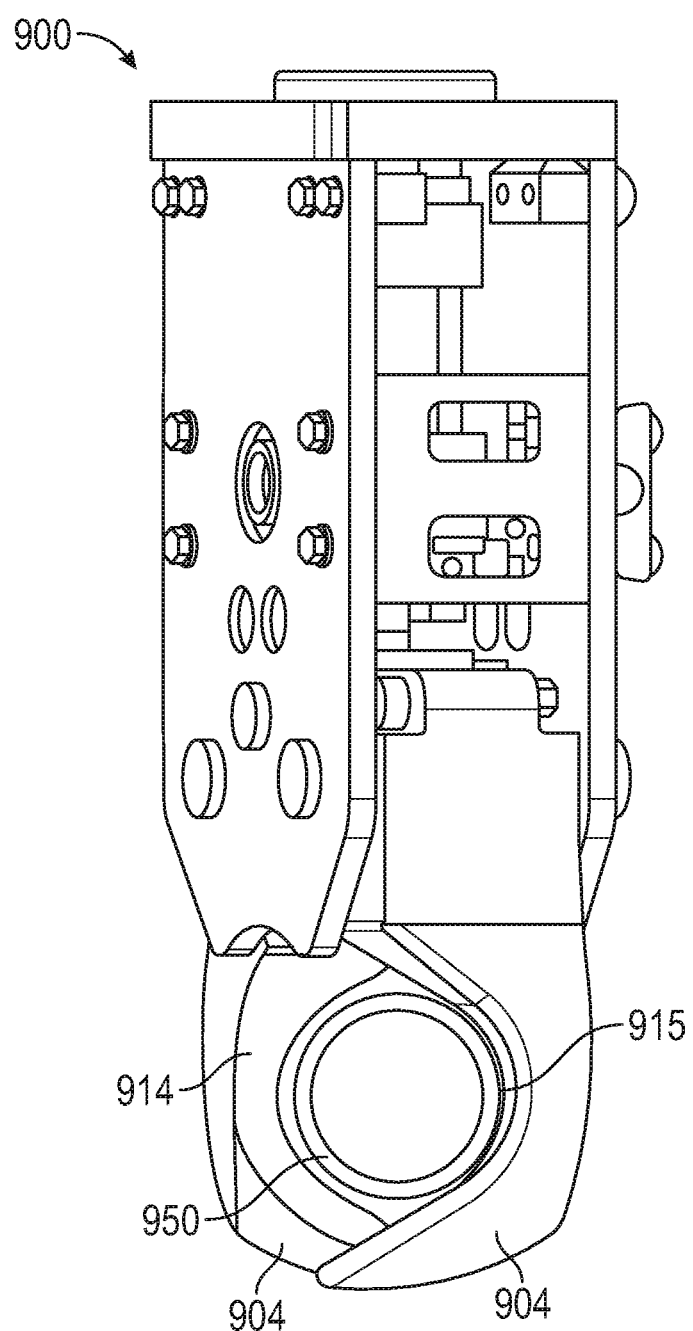
FIG. 22Q is a top view of the end effector of FIG. 22A in a closed configuration with respect to a pipe section, according to one or more embodiments.

FIGS. 22A-22Q show an additional embodiment of an end effector 900 having a pair of hinged jaws 904 that may be controllable by an actuator 903, similar to the end effector 600 of FIG. 21. Each jaw 904 may have a curved shape defining a first inner contour 914 sized and configured to receive a pipe section. Each jaw 904 may additionally have a second inner contour 915, arranged on a surface of the jaw perpendicular to a surface on which the first inner contour 914 is arranged, and which may also be sized and configured to receive a pipe section. The first inner contours 914 of the jaws 904 may be arranged to be concave in opposing directions to one another. This may be seen, for example, with respect to FIG. 22A-22C. Additionally, the second inner contours 915 of the jaws 904 may be arranged to be concave in opposing directions to one another. This may be seen, for example, with respect to FIGS. 22D and 22E.

The end effector 900 may be configured to transition between an open configuration and a closed configuration with respect to a pipe section. In an open configuration, the actuator 903 may operate to separate the jaws 904 away from one another, such that a pipe section may be received between the jaws. To transition to a closed configuration, the actuator 903 may operate to move the jaws 904 toward one another, so as to position the first inner contours 914 of the two jaws around the pipe section. Additionally, to move to a closed configuration, the end effector 900 may pivot or twist about a central axis 928 so as to position the second inner contours 915 of the two jaws 904 around the pipe section. These operations may be appreciated with respect to FIGS. 22F-22Q.

FIG. 22F shows the end effector 900 in an open configuration, according to at least one embodiment. As shown, the actuator 903 may operate to pivot the two jaws 904 away from one another, so as to widen a distance between the inner contours 914. In the open position, the end effector 900 may be configured to receive a pipe section between the two jaws 904. FIG. 22G shows a front view of the end effector 900 in an open configuration. FIG. 22H shows a front view of the end effector 900 in an open configuration as the end effector approaches a pipe section 950. FIG. 22I shows a perspective view of the end effector 900 in an open configuration as the end effector approaches the pipe section 950. Once the pipe section is positioned between the two jaws and generally aligned with the first contours 914, the actuator 903 may operate to close the two end jaws by bringing them closer to one another, thereby reducing a distance between the first inner contours 914. This may position the first inner contours adjacent or along an outer surface of the pipe section 950. FIG. 22J shows a front view, and FIG. 22K shows a perspective view, of the end effector 900 in this transition state between open and closed configurations, with the first contours 914 enclosed around an outer surface of the pipe section 950. To move to a closed configuration, the end effector may pivot or twist about a central axis 928, which may be arranged perpendicular to a longitudinal axis of the pipe section 950. The end effector 900 may pivot or twist between approximately 45 degrees and approximately 90 degrees. FIG. 22L shows a front view, and FIG. 22M shows a perspective view, of the end effector 900 in a closed configuration with respect to the pipe section 950. In the closed configuration, the second inner contours 915 may be arranged adjacent or along an outer surface of the pipe section 950. FIGS. 22N-22Q show top views of the end effector 900 in an open configuration (FIG. 22N), in transition between an open and closed configuration (FIGS. 22O and 22P), and in a closed configuration (FIG. 22Q) with respect to the pipe section 950.

Figure 23A:
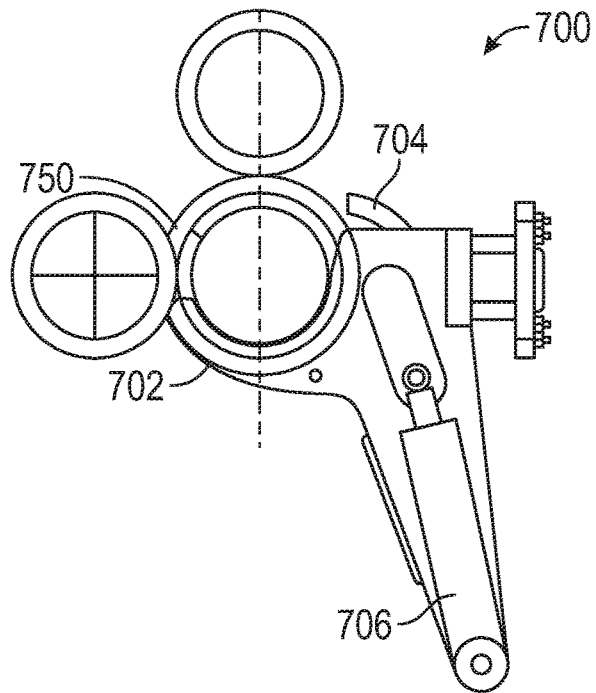
FIG. 23A is a top view of an end effector of the present disclosure in an open configuration and adjacent a pipe, according to one or more embodiments.
Figure 23B:
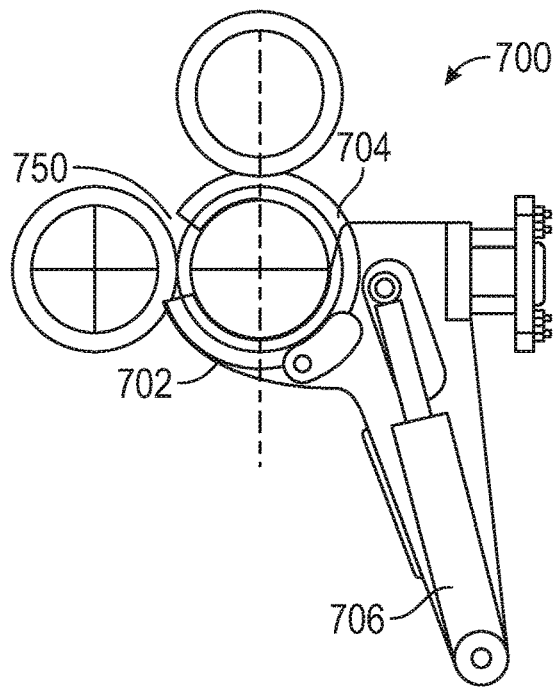
FIG. 23B is another top view of the end effector of FIG. 23A, with the end effector in a closed configuration about a pipe, according to one or more embodiments.

FIGS. 23A and 23B show another end effector 700 of the present disclosure, according to one or more embodiments. The end effector 700 may have a first jaw 702, which may be a fixed or stationary jaw, and a second jaw 704, which may be a movable jaw. Each of the jaws 702, 704 may have a curved shape with an inner contour sized and configured to receive a pipe section. Inner contours of the two jaws 702, 704 may have a same radius of curvature for receiving a same pipe size or range of pipe sizes. Additionally, the fingers 702, 704 may be arranged with their inner contours on a same plane, such that the fingers may engage with a pipe section at a same cross-sectional position along the pipe section. In some embodiments, the jaws 702, 704 may have differing lengths. For example, the fixed jaw 702 may have a length shorter than that of the movable jaw 704. The movable jaw 704 may have a hinged connection to the fixed jaw 702. The movable jaw 704 may be configured to pivot between an open configuration and a closed configuration. In an open configuration, as shown in FIG. 23A, the movable jaw 704 may pivot away from the fixed jaw 702 such that a pipe section 750 may be received between the two jaws. In a closed configuration, the jaws 702, 704 may be configured to form a closed loop or partially closed loop, so as to close around an outer wall of a pipe section. An actuator 706, such as a hydraulic cylinder, lead screw mechanism, ball screw mechanism, or other actuator may operate to pivot the movable jaw 704 with respect to the fixed jaw 702.

FIG. 23A shows the end effector 700 in an open configuration, with the actuator 706 operating to pivot the movable jaw 704 away from the fixed jaw 702. In an open configuration, the end effector 700 may be configured to receive a pipe section 750. In some embodiments, the end effector 132 may be configured to engage with one pipe section 750 at a time without disturbing, or substantially without disturbing, adjacent or nearby pipes. For example, the movable jaw 704 may have a thickness or width configured to slide between a pair of pipes 750 stored in a racking board so as to close around a single pipe without disturbing an adjacent pipe. As shown in FIG. 23A, the end effector 700 may approach the pipe 750 its movable jaw 704 in an open configuration. With the movable jaw 704 in an open configuration, the fixed jaw 702 may be positioned around the pipe 750 such that the pipe is nestably arranged within the inner contour of the fixed jaw, and the movable jaw 704 may be closed as shown in FIG. 23B. The movable jaw 704 may slide between the pipe 750 and an adjacent pipe.

In some embodiments, the end effector 700 may be configured to engage with one pipe section 750 at a time without disturbing, or substantially without disturbing, adjacent or nearby pipe stands. For example, the movable jaw 704 may have a thickness or width configured to slide between a pair of pipe sections or pipe stands stored in close proximity to one another, such as in a racking board of a drill rig, so as to close around a single pipe stand without disturbing an adjacent pipe stand. This may be seen with particular reference to FIGS. 23A-23B. As shown in FIG.

23A, the end effector 700 may approach the pipe section 750 with its movable finger 704 in an open configuration. With the movable finger 704 in an open configuration, the robot may position the fixed finger 702 around the pipe section 750, and may then close the movable finger around the pipe section, as shown in FIG. 23B. The movable finger 704 may slide between the pipe section 750 and an adjacent pipe section. In this way, it is to be appreciated that the end effector 700 may also be configured to position a pipe section or stand into a position with relative close proximity to other pipe stands without disturbing, or substantially without disturbing, adjacent pipes.

In some embodiments, an end effector of the present disclosure may be reversible, such that it may be configured to engage pipe sections arranged generally on either lateral side of the pipe handling robot. For example, a roll joint or other suitable joint may be arranged between the end effector and the wrist portion or another portion of the robot, such that the end effector may rotate or pivot up to 360, up to 270, up to 180, or up to another suitable degree of rotation.

In some embodiments, an end effector of the present disclosure may have a coating on one or more surfaces to facilitate handling operations. For example, an end effector may have a low-friction coating arranged on an inner contour of one or more jaws. A low-friction coating may include wearable fluoro-plastic or another relatively low-friction metallic alloy having a static coefficient of friction against pipe steel of less than 0.2, for example. Other relatively low-friction coatings or materials may be used as well. Such a low-friction coating may facilitate sliding engagement of the end effector with a pipe, for example. In this way, a pipe section may be free to move axially along its longitudinal axis while the end effector operates to restrict radial movement of the pipe section. In other embodiments, the end effector may have a high-friction coating or surface to facilitate gripping operations. Other coatings may be used as well.

Figure 24:
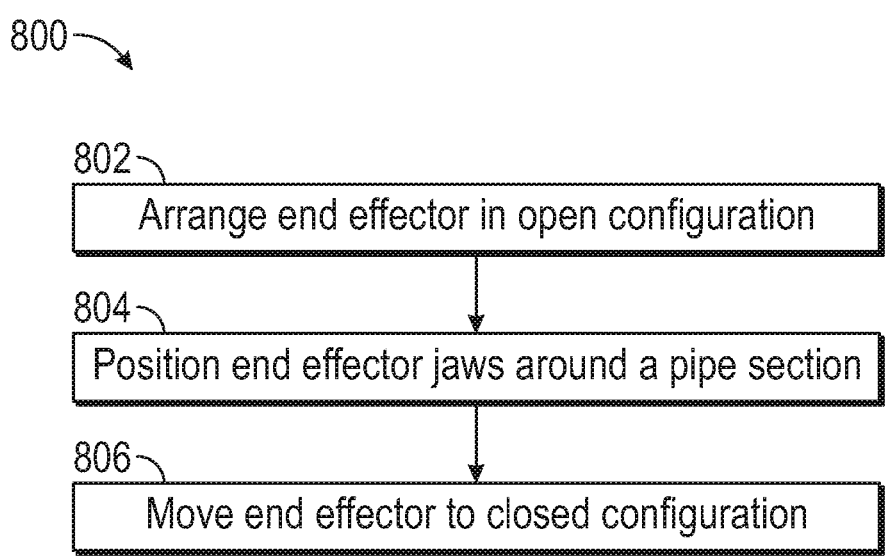
FIG. 24 is a flow diagram of a method of the present disclosure, according to one or more embodiments.

Turning now to FIG. 24, a method 800 for automated pipe handling is shown, according to one or more embodiments. The method 800 may be performed using an end effector of the present disclosure, which may be arranged on a pipe handling robot. For example, an end effector of the present disclosure may be arranged on an end of a pipe handling arm, as described above. The method 800 may include arranging an end effector in an open configuration 802, positioning jaws of the end effector around a pipe section 804; and moving the end effector to a closed configuration 806. In some embodiments, the method 800 may include additional or alternative steps.

Arranging the end effector in an open configuration 802 may include positioning the end effector to receive a pipe section. For example, where the end effector comprises two parallel fixed jaws extending from a backing plate, such as those described with respect to FIGS. 2-19 (or adjustable jaws as described with respect to FIG. 20), the end effector may be rotated or pivoted such that the pipe section may be received between the two fixed jaws with a longitudinal axis of the pipe section parallel to inner contours of the two jaws. As described above, the rotational position of the open configuration of an end effector may depend on a location or positioning of the pipe section to be engaged. For example, where the pipe section is arranged with its longitudinal axis positioned vertically, the end effector may be positioned such that the jaws are also positioned vertically so as to be arranged adjacent opposing sides of the vertical pipe section. A pipe handling robot or robotic arm may be used to position the end effector in the open configuration with respect to a pipe section. For example, a roll joint arranged on a robotic arm or wrist portion thereof may be used to rotate or pivot an end effector into an open configuration. Where the end effector comprises one or more actuatable jaws configured to actuate the one or more jaws toward the pipe section, such as those described above with respect to FIGS. 21-23, arranging the end effector in an open configuration may include opening the one or more actuatable jaws such that the pipe section may be positioned between the jaws.

With the end effector in an open configuration, the jaws of the end effector may be positioned around the pipe section 804. For example, the arm of a pipe handling robot may be directed to move the end effector toward a pipe section so as to position the pipe section between the two jaws of the end effector.

With the pipe section positioned between the jaws of the end effector, the end effector may be moved to a closed configuration with respect to the pipe section 806 in order to restrict radial movement of the pipe section. Where an end effector comprises two parallel fixed jaws, as described above with respect to FIGS. 2-19 (or adjustable jaws as described with respect to FIG. 20), the end effector may be rotated or pivoted to a closed configuration. In particular, the end effector may be rotated or pivoted to direct the inner contours of both jaws toward an outer wall of the pipe section. The end effector may be pivoted between approximately 75 and approximately 105 degrees to reach the closed configuration, or between approximately 80 degrees and approximately 100 degrees, or between approximately 85 degrees and approximately 95 degrees, or approximately 90 degrees. In some embodiments, the end effector may be rotated or pivoted until one or both inner contours make contact with the pipe section.

Where the end effector comprises one or more actuatable jaws configured to actuate the one or more jaws toward the pipe section, such as those described above with respect to FIGS. 21-23, arranging the end effector in a closed configuration may include closing the one or more actuatable jaws around the pipe section to constrain the pipe section between the inner contours of both jaws. In some embodiments, moving the end effector to a closed configuration may include actuating one or more jaws to close around the pipe section and additionally rotating or pivoting the end effector to position the pipe section within second inner contours of the jaws, as described above with respect to FIG. 21. In some embodiments, moving the end effector to a closed configuration may include additional or alternative operations.

While described herein with respect to circular pipe sections, it is to be appreciated that pipe handling robots and end effectors of the present disclosure may be configured to engage with a variety of pipe shapes and sizes. For example, an inner contour of an end effector jaw may have one or more straight sides and one or more corners configured to engage with a pipe section having a square cross-sectional shape.

In some embodiments, a method of automated pipe handling may be performed using multiple pipe handling robots or robotic arms. For example, when handling a pipe stand having one, two, three, four or more length of pipe, a first pipe handling robot may be positioned and configured to manipulate a first end of the pipe stand, and a second pipe handling robot may be positioned and configured to manipulate a second end of the pipe stand. In some embodiments, more than two pipe handling robots or robotic arms may be used for pipe handling operations.

In some embodiments, a method of the present disclosure may be performable by a controller controlling one or more pipe handling robots. In particular, a method of the present disclosure may be encoded as computer-readable instructions performable by a controller controlling one or more pipe handling robots. The controller may control movement of one or more robotic arms and movement of one or more end effectors arranged thereon.

In some embodiments, a pipe handling robot of the present disclosure may be arranged on a drilling rig, such as an on-shore or off-shore oil drilling rig. For example, a first robot may be arranged on or near the drill floor or such a rig, and a second robot may be arranged on or near a racking board of the rig. The robot(s) may operate to manipulate drill pipe during stand building, trip in, trip out, and/or other operations, as described in U.S. application Ser. No. 16/431,533, entitled Devices, Systems, and Methods for Robotic Pipe Handling, filed Jun. 4, 2019, the content of which is incorporated by reference herein in its entirety.

In some embodiments, an end effector of the present disclosure may have one or more sensors or feedback devices. For example, a proximity sensor or other electromagnetic sensor may be arranged on or about a jaw or backing plate for detecting a presence of a pipe or other object positioned within the end effector. Additionally or alternatively, a contact switch or other position sensor may be arranged on or about the end effector for detecting the presence of a pipe section and/or an open or closed configuration of the end effector. A pipe handling robot of the present disclosure may have other sensors and/or feedback devices, such torque feedback devices, proximity sensors, position sensors, and/or other devices or sensors configured to indicate other movements or conditions.

End effectors of the present disclosure may provide improvements over conventional robotic end effectors. In particular, an end effector of the present disclosure having at least one fixed jaw may be relatively less expensive as compared with conventional actuatable end effectors. By having at least one, and in some embodiments two, fixed jaws, an end effector of the present disclosure may have fewer moving parts than some conventional end effectors. Thus, an end effector of the present disclosure may additionally require lower maintenance as compared with some conventional end effectors. Moreover, while some conventional robotic end effectors may be configured to grip a pipe or other object, thus interfering with axial movement, end effectors of the present disclosure may be configured to allow free axial movement of a pipe while the pipe is engaged or closed within the end effector. This may be particularly beneficial where another device, such as a pipe elevator or other lifting device, may be used to raise or lower a drill pipe while one or more pipe handling robots fitted with an end effector operates to manipulate a position of the drill pipe.

It is to be appreciated that, while the present disclosure is described with respect to particular embodiments, feature described with respect to one embodiment are not necessarily restricted to that embodiment. That is, features of the various embodiments may be combined with features of other embodiments. For example, the rollers of the end effector described with respect to FIGS. 18 and 19 may be combined with other end effector embodiments described in the present disclosure. Other features of other embodiments may be combined or interchanged with other embodiments as well.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A robot configured for pipe handling, the robot comprising:
an articulated arm controllable by a controller, and
an end effector arranged at an end of the articulated arm and comprising:
a backing plate; and
two fixed pipe engaging jaws extending from the backing plate, each jaw comprising an inner contoured surface that is stationary relative to the backing plate and configured for engaging a pipe section,
wherein:
the articulated arm is operable to selectively rotate the end effector between an open configuration and a closed configuration; and
while in the closed configuration, the end effector is configured to restrict radial movement of the pipe section while permitting free rotational movement relative to the inner contoured surface and free longitudinal axial movement relative to the inner contoured surface.

2. The robot of claim 1, wherein the inner contoured surfaces of the two jaws are arranged on different parallel planes.

3. The robot of claim 2, wherein the inner contoured surfaces of the two jaws are concave in opposing directions.

4. The robot of claim 2, wherein the articulated arm is configured to pivot the end effector about a central axis extending between, and parallel to, the planes of the inner contoured surfaces.

5. The robot of claim 4, wherein the articulated arm is configured to pivot the end effector between an open configuration and a closed configuration by pivoting the end effector approximately 90 degrees.

6. An end effector for a robotic arm, the end effector comprising:
a backing plate; and
two fixed pipe engaging jaws extending from the backing plate, each jaw comprising an inner contoured surface that is stationary relative to the backing plate and configured for engaging a pipe section;
wherein:
the end effector is configured to be selectively activated between an open configuration and a closed configuration by rotating the end effector; and
while in the closed configuration, the end effector is configured to restrict radial movement of the pipe section while permitting free rotational movement relative to the inner contoured surface and free longitudinal axial movement relative to the inner contoured surface.

7. The end effector of claim 6, wherein the inner contoured surfaces of the two jaws are arranged on different planes.

8. The end effector of claim 6, wherein the inner contoured surfaces of the two jaws are concave in opposing directions.

9. The end effector of claim 6, wherein each pipe engaging jaw comprises a bracket portion and an extension portion, each of the bracket portion and extension portion defining a portion of the inner contoured surface.

10. The end effector of claim 6, wherein each inner contoured surface comprises a V-shape with an inner corner.

11. The end effector of claim 10, wherein the inner corner has an included angle of between approximately 60 degrees and approximately 120 degrees.

12. The end effector of claim 11, wherein the inner corner is a radiused corner.

13. The end effector of claim 6, wherein the inner contoured surfaces of each jaw are first inner contoured surfaces and wherein each jaw further comprises a second inner contoured surface arranged perpendicular to the first inner contoured surface.

14. The end effector of claim 6, wherein the end effector is configured to engage with a range of pipe sizes.

15. A method for automated pipe handling, the method comprising:
arranging an end effector of a pipe handling robot in an open configuration with respect to a pipe section, the end effector having:
a backing plate; and
a pair of fixed jaws extending from the backing plate, each jaw having an inner contoured surface that is stationary relative to the backing plate;
with the end effector in an open configuration, causing the end effector to receive the pipe section between the jaws; and
moving the end effector to a closed configuration with respect to the pipe section to position the pipe section within the inner contoured surfaces of the jaws,
wherein, moving the end effector to a closed configuration comprises pivoting the end effector about a central axis; and
wherein, while in the closed configuration, the end effector is configured to restrict radial movement of the pipe section while permitting free rotational movement relative to the inner contoured surface and free longitudinal axial movement relative to the inner contoured surface.

16. The method of claim 15, wherein the pipe handling robot is a first robot and wherein a first end of the pipe section is received between the jaws of the end effector and positioned within the inner contoured surfaces of the jaws, the method further comprising:
arranging an end effector of a second pipe handling robot in an open configuration with respect to the pipe section, the end effector of the second robot having a pair of jaws, each jaw having an inner contoured surface;
with the end effector of the second robot in an open configuration, causing the end effector of the second robot to receive a second end of the pipe section between the jaws; and
moving the end effector of the second robot to a closed configuration with respect to the pipe section to position the second end of the pipe section within the inner contoured surfaces of the jaws.

17. The robot of claim 2, wherein the inner contoured surface is configured to engage the pipe section across an angle of over 90 degrees.

18. The robot of claim 17, wherein the inner contoured surface is configured to engage the pipe section across an angle of approximately 180 degrees or more.

19. The robot of claim 1, wherein the end effector is configured to maintain a gap between the pipe section and the inner contoured surfaces while in the closed configuration.

* * * * *

UNITED STATES PATENT AND TRADEMARK OFFICE
CERTIFICATE OF CORRECTION

| | | |
|---|---|---|
| PATENT NO. | : 12,215,554 B2 | Page 1 of 1 |
| APPLICATION NO. | : 17/250548 | |
| DATED | : February 4, 2025 | |
| INVENTOR(S) | : Carnegie et al. | |

It is certified that error appears in the above-identified patent and that said Letters Patent is hereby corrected as shown below:

In the Claims

In Column 21, Line 24, in Claim 6, delete "activated" and insert --actuated-- therefor Signed and Sealed this
Twenty-fifth Day of November, 2025

John A. Squires
*Director of the United States Patent and Trademark Office*